(12) United States Patent
Takagi et al.

(10) Patent No.: US 7,898,942 B2
(45) Date of Patent: Mar. 1, 2011

(54) RING NETWORK SYSTEM, FAILURE RECOVERY METHOD, FAILURE DETECTION METHOD, NODE AND PROGRAM FOR NODE

(75) Inventors: Kazuo Takagi, Tokyo (JP); Masahiro Sakauchi, Tokyo (JP); Daisaku Ogasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 513 days.

(21) Appl. No.: 11/887,289

(22) PCT Filed: Mar. 31, 2006

(86) PCT No.: PCT/JP2006/307410
§ 371 (c)(1),
(2), (4) Date: Sep. 27, 2007

(87) PCT Pub. No.: WO2006/104285
PCT Pub. Date: Oct. 5, 2006

(65) Prior Publication Data
US 2009/0052317 A1 Feb. 26, 2009

(30) Foreign Application Priority Data
Mar. 31, 2005 (JP) ............................. 2005-101254

(51) Int. Cl.
*H04L 12/42* (2006.01)
*H04L 12/437* (2006.01)
*H04L 12/56* (2006.01)
(52) U.S. Cl. ...................... 370/222; 370/258; 370/405; 370/406
(58) Field of Classification Search ......... 370/221–224, 370/258, 403–406, 424, 452, 460, 909
See application file for complete search history.

(56) References Cited

U.S. PATENT DOCUMENTS
6,639,893 B1 * 10/2003 Chikenji et al. ............. 370/217

(Continued)

FOREIGN PATENT DOCUMENTS
CA    2 392 942    1/2003

(Continued)

OTHER PUBLICATIONS

"IEEE Draft P802.17/D3.3 Part 17: Resilient Packet Ring (RPR) Access Method & Physical Layer Specifications," IEEE (Institute of Electrical and Electronics Engineers, Inc), "IEEE Draft P802.17/D3.3 p. 74, Apr. 21, 2004".

*Primary Examiner*—Tri H Phan
(74) *Attorney, Agent, or Firm*—Scully, Scott, Murphy & Presser, P.C.

(57) ABSTRACT

In a multi-ring network with a plurality of rings to which RPR is applied connected, high-speed failure recovery is enabled when a failure occurs between the rings. The contact nodes 700-1 and 700-3 connected to the living inter-link 505 periodically transmit and receive a KeepAlive signal to/from each other. Then, when a KeepAlive signal fails to arrive for a fixed time period, determination is made that the inter-link 505 develops a fault to broadcast-transmit an inter-link failure notification RPR-MAC frame indicative of failure occurrence on the inter-link to each node. A contact node as a transmission source of the inter-link failure notification RPR-MAC frame and each node having received the inter-link failure notification RPR-MAC frame immediately flush learning contents of their own learning data bases. A contact node connected to the spare inter-link 506 switches the spare inter-link 506 to a forwarding state.

20 Claims, 20 Drawing Sheets

U.S. PATENT DOCUMENTS

| | | | |
|---|---|---|---|
| 7,054,264 B2 * | 5/2006 | Mor | 370/223 |
| 7,242,861 B2 * | 7/2007 | Sato et al. | 398/19 |
| 7,274,656 B2 * | 9/2007 | Lee et al. | 370/223 |
| 7,324,440 B2 * | 1/2008 | Takagi et al. | 370/222 |
| 7,711,270 B2 * | 5/2010 | Ooi et al. | 398/175 |
| 2003/0012129 A1 | 1/2003 | Lee et al. | |
| 2005/0226265 A1 * | 10/2005 | Takatori | 370/452 |
| 2005/0243845 A1 | 11/2005 | Higashitaniguchi et al. | |
| 2007/0104093 A1 * | 5/2007 | Li et al. | 370/223 |
| 2009/0022168 A1 * | 1/2009 | Sakauchi et al. | 370/406 |
| 2009/0323521 A1 * | 12/2009 | Tochio | 370/225 |

FOREIGN PATENT DOCUMENTS

| | | |
|---|---|---|
| EP | 1 328 090 | 7/2003 |
| JP | 10-004424 | 1/1998 |
| JP | 2003-174458 | 6/2003 |
| JP | 2003-258822 | 9/2003 |
| JP | 2003258822 A * | 9/2003 |
| JP | 2004-242194 | 8/2004 |
| JP | 2005-159546 | 6/2005 |
| JP | 2006-12907118 | 5/2006 |
| WO | WO 2004/073262 | 8/2004 |

* cited by examiner

RING NETWORK SYSTEM, FAILURE RECOVERY METHOD, FAILURE DETECTION METHOD, NODE AND PROGRAM FOR NODE

TECHNICAL FIELD

The present invention relates to a ring network system, and a failure recovery method, a failure detection method, a node and a program for a node which are applied to a ring network system

BACKGROUND ART

With the increase in a volume of data system packet traffic whose representative is IP, efficient transmission of data is demanded also of related art communication service providers (carriers) which provide transmission service mainly for voice. Along with the demand, a highly reliable protection method similar to SONET (Synchronous Optical Network) is required also in a data transmission network. Among failure recovery methods in a packet transmission network is an RPR (Resilient Packet Ring) disclosed in Literature 5.

In RPR, an RPR-MAC frame is transferred between nodes in a packet ring (hereinafter simply referred to as a ring). An RPR-MAC frame has a format including a frame as a payload, to which frame, a transmission destination RPR-MAC address, a transmission source RPR-MAC address and the like are added. Frame to be a payload in an RPR-MAC frame is called a user MAC frame. In the following, a user MAC frame will be denoted to as a U-MAC frame. When a node in a ring is to receive a frame from a terminal outside the ring, the node receives a U-MAC frame. Then, the node adds a transmission destination RPR-MAC address, a transmission source RPR-MAC address and the like to the U-MAC frame to generate an RPR-MAC frame and transfers the generated frame within the ring. In the following description, a transmission destination address in a U-MAC frame will be denoted as a transmission destination U-MAC address. Similarly, a transmission source address in a U-MAC frame will be denoted as a transmission source U-MAC address.

In the following, a failure protection method using a related RPR will be described.

FIG. 20 shows an example of an RPR network using a single ring. The ring has an inner ring 101 and an outer ring 102. The inner ring 101 and the outer ring 102 are paths for transferring packets in reverse directions to each other. In addition, the RPR network illustrated in FIG. 20 comprises six RPR nodes 300-1~300-6 in the ring. To the RPR node 300-1, a terminal 110 is connected and to the RPR node 300-4, a terminal 111 is connected. First, description will be made of operation of transferring a U-MAC frame from the terminal 110 to the terminal 111 when a failure is yet to occur (in a normal state) in the RPR network shown in FIG. 20. RPR-MAC addresses of the RPR nodes 300-1~300-6 are assumed to be 300-1~300-6, respectively.

The RPR node 300-1 having received a U-MAC frame transferred from the terminal 110 solves the RPR-MAC address 300-4 of a transmission destination RPR node from a transmission destination U-MAC address of the U-MAC frame. With a learning data base provided in which a correspondence between a U-MAC address and an RPR-MAC address is stored, each node searches an RPR-MAC address corresponding to a transmission destination U-MAC address to solve an RPR-MAC address of a transmission destination RPR node. Subsequently, the RPR node 300-1 adds an RPR-MAC header with a transmission destination RPR-MAC address as 300-4 and a transmission source RPR-MAC address as 300-1 to the U-MAC frame to generate an RPR-MAC frame. Furthermore, the RPR node 300-1 determines to which of an outer ring and an inner ring, the RPR-MAC frame should be transferred to send out the RPR-MAC frame. Assume here that the RPR-MAC frame is to be sent to the outer ring 102.

The RPR node 300-6 having received the RPR-MAC frame refers to a transmission destination RPR-MAC address of the RPR-MAC frame. The RPR node 300-6, since the transmission destination RPR-MAC address (300-4) fails to coincide with the address (300-6) of the node itself, determines that it is not a frame to be dropped by the node itself to transfer the RPR-MAC frame to the subsequent RPR node 300-5. Similarly to the RPR node 300-6, the RPR node 300-5 transfers the RPR-MAC frame to the subsequent RPR node 300-4.

The RPR node 300-4, since the transmission destination RPR-MAC address of the received RPR-MAC frame coincides with the address of the node itself, takes in the RPR-MAC frame and removes an RPR-MAC overhead to transfer the obtained frame as a U-MAC frame to the terminal 111. Thus, the U-MAC frame is transferred from the terminal 110 to the terminal 111.

Next, description will be made of operation executed when a failure occurs in the ring. FIG. 21 is a diagram for use in explaining operation of the ring executed when a failure occurs in the ring. Assume here that the inner ring 101 and the outer ring 102 between the RPR 300-5 and 300-6 develop a fault. A path indicated by a dotted line in FIG. 21 is the same path as a frame transfer path in a normal state shown in FIG. 20.

The RPR nodes 300-5 and 300-6 adjacent to a failure occurrence position sense occurrence of the failure. Then, the RPR nodes 300-5 and 300-6 each transfer a failure notification RPR-MAC frame including its own node RPR-MAC address to the inner ring 101 and the outer ring 102. The RPR nodes 300-5 and 300-6 apply an identifier indicative of being a failure notification RPR-MAC frame as a transmission destination RPR-MAC address of the failure notification RPR-MAC frame. Thus, there occurs a case where to a transmission destination RPR-MAC address of an RPR-MAC frame, an identifier for control is applied. The controlling identifier may be denoted as [reserved RPR-MAC address] in some cases. Controlling identifier does not indicate an RPR-MAC address of a specific RPR node.

Upon receiving a failure notification RPR-MAC frame from both the inner ring 101 and the outer ring 102, each of the RPR nodes 300-1~300-6 locates a failure position from topology information and failure detection node information. Then, the node switches a transfer direction of an RPR-MAC frame passing through the failure position. For example, the RPR node 300-1 switches a sending-out ring of an RPR-MAC frame with the RPR node 300-4 as a transmission destination from the outer ring 102 to the inner ring 101. The RPR node 300-1, upon receiving a U-MAC frame from the terminal 110 similarly to the case described in FIG. 20, sends an RPR-MAC frame with a header added to the U-MAC frame to the inner ring 101. The RPR-MAC frame is transferred to the RPR node 300-4 through the RPR nodes 300-2 and 300-3. The RPR node 300-4 removes an RPR-MAC overhead from the received RPR-MAC frame and transfers the obtained frame as a U-MAC frame to the terminal 111. Failure recovery is executed as described in the foregoing to transfer a frame from the terminal 110 to the terminal 111 even at failure occurrence.

Next, a structure of an RPR node will be described. FIG. 22 is a block diagram showing an example of a structure of a related RPR node. The RPR node comprises a packet switch 310, a frame conversion circuit 320, a forwarding engine 330, a ring topology information collection circuit 340, a ring failure information collection circuit 350, an inside ring path determination circuit 360 and an ADM (Add-Drop Multiplexer) 370. The node further comprises a learning data base 321 which stores a correspondence relationship between a U-MAC address and an RPR-MAC address. The node further comprises a forwarding data base 331 which stores a correspondence relationship between a transmission destination RPR-MAC address and an output ring (either one or both of an inner ring and an outer ring).

The packet switch 310, which is a UNI (User Network Interface), executes transmission/reception of a U-MAC frame to/from the terminals through UNI ports 301 and 302. Upon receiving a U-MAC frame through the respective UNI ports 301 and 302, the packet switch 310 concentrates U-MAC frames from the UNI ports 301 and 302 and transfers the frames to the frame conversion circuit 320. In addition, when a U-MAC frame is transferred from the frame conversion unit 320, the packet switch 310 outputs (transmits) the U-MAC frame through an appropriate UNI port (UNI port connected to a terminal as a transmission destination).

When the packet switch 310 receives a U-MAC frame from the terminal and the U-MAC frame is transferred from the packet switch 310, the frame conversion circuit 320 refers to the learning data base 321 to specify a transmission destination RPR-MAC address in the ring based on a transmission destination U-MAC address of the U-MAC frame (i.e. solve the transmission destination RPR-MAC address). Subsequently, the frame conversion circuit 320 adds a header with the RPR-MAC address as a transmission destination RPR-MAC address and its own node address as a transmission source RPR-MAC address (RPR-MAC overhead) to the U-MAC frame to generate an RPR-MAC frame and transfers the RPR-MAC frame to the forwarding engine 330.

In addition, when the ADM 370 receives an RPR-MAC frame within the ring and the RPR-MAC frame is transferred from the ADM 370, the frame conversion circuit 320 removes the RPR-MAC overhead from the RPR-MAC frame to convert the frame into a U-MAC frame. Then, the circuit transfers the U-MAC frame to the packet switch 310.

The forwarding engine 330 determines based on the transmission destination RPR-MAC address of the RPR-MAC frame transferred from the frame conversion circuit 320 whether the RPR-MAC frame is to be sent to the inner ring 101 or the outer ring 102, or to both of the inner ring 101 and the outer ring 102. At this time, the forwarding engine 330 only needs to refer to the forwarding data base 331 to search an output ring (either the inner ring 101 or the outer ring 102 or both) corresponding to the transmission destination RPR-MAC address. Thereafter, the forwarding engine 330 transfers the RPR-MAC frame to the ADM 370 and notifies the ADM 370 of the determined sending-out destination ring.

In the following, information will be referred to as output ring information which indicates that an RPR-MAC frame is to be sent out to the inner ring 101, that an RPR-MAC frame is to be sent out to the outer ring 102, or that an RPR-MAC frame is to be sent out to both the inner ring 101 and the outer ring 102.

The ring topology information collection circuit 340 generates a topology discovery RPR-MAC frame for comprehending an RPR node structure in the ring to transfer the frame to the ADM 370 together with output ring information. When the ADM 370 receives a topology discovery RPR-MAC frame from inside the ring and the topology discovery RPR-MAC frame is transferred from the ADM 370, the ring topology information collection circuit 340 notifies the inside ring path determination circuit 360 of topology information indicated by the topology discovery RPR-MAC frame.

When the ADM 370 receives a failure notification RPR-MAC frame from inside the ring and the failure notification RPR-MAC frame is transferred from the ADM 370, the ring failure information collection circuit 350 notifies the inside ring path determination circuit 360 of failure detection node information indicated by the failure notification RPR-MAC frame. Thereafter, the ring failure information collection circuit 350 outputs the failure notification RPR-MAC frame to the ADM 370 and causes the ADM 370 to send out the failure notification RPR-MAC frame within the ring.

Adjacent RPR nodes transmit/receive failure notification RPR-MAC frames not including failure detection node information to/from each other. When none of failure notification RPR-MAC frames without including failure detection node information is transferred for a fixed time period, the ring failure information collection circuit 350 determines that a failure is detected. Then, the circuit generates a failure information notification RPR-MAC frame with its own node as a failure detection node and outputs the failure information notification RPR-MAC frame and the output ring information to the ADM 370 to cause the ADM 370 to send out the failure information notification RPR-MAC frame within the ring. In addition, in this case, the ring failure information collection circuit 350 transfers information that its own node is a failure detection node to the inside ring path determination unit 360.

Based on topology information notified from the ring topology information collection circuit 340 and failure information notified from the ring failure information collection circuit 350, the inside ring path determination circuit 360 correlates output ring information with a transmission destination RPR-MAC address and registers the correlation in the forwarding data base 331.

The ADM 370 refers to a transmission destination RPR-MAC address of an RPR-MAC frame input from the outer ring 102 to determine whether the RPR-MAC frame should be terminated or not. When determining to terminate the frame, the ADM 370 transfers the RPR-MAC frame to any one of the forwarding engine 330, the ring topology information collection circuit 340 and the failure information collection circuit 350 (to which circuit the transfer should be made depends on a kind of RPR-MAC frame). When determining not to terminate the frame, the ADM 370 sends out the RPR-MAC frame to the same ring as the ring to which the frame is input (the inner ring or the outer ring).

In addition, when an RPR-MAC frame and output ring information are transferred from the forwarding engine 330, the ring topology information collection circuit 340 or the ring failure information collection circuit 350, the ADM 370 sends out the RPR-MAC frame to either the inner ring 101 or the outer ring 102 (or both of them) according to the output ring information.

Such an RPR node realizes such failure recovery as shown in FIG. 21.

Literature reciting techniques related to a ring network include Literature 1 through 4 and the like. Recited in Literature 1 is the technique of making ring soundness known to all the nodes by using a KAB (keep alive bit). Recited in Literature 2 is the technique that when a link between a node inside a ring and a node outside the ring develops a fault, the node inside the ring sends out a frame with a flooding bit set within the ring. Recited in Literature 3 is necessity of notifying a serving node of occurrence of line cut-off. Recited in Literature 4 is deleting an unnecessary transfer table when among a plurality of contact nodes belonging to two rings, an active contact code is switched.

Literature 1: Japanese Patent Laying-Open No. 2003-174458 (paragraphs 0029-0048).

Literature 2: Japanese Patent Laying-Open No. 2004-242194 (paragraphs 0030-0031).

Literature 3: Japanese Patent Laying-Open No. 10-4424 (paragraph 0006).

Literature 4: Japanese Patent Laying-Open No. 2003-258822 (paragraphs 0022-0085).

Literature 5: "IEEE Draft P802.17/D3.3 Part 17: Resilient Packet Ring (RPR) Access Method & Physical Layer Specifications)", IEEE (Institute of Electrical and Electronics Engineers, Inc), "IEEE Draft P802.17/D3.3", p. 74, Apr. 21, 2004.

Related RPR techniques enable extremely high-speed failure recovery to be provided for a single ring network. However, the problem is disabling high-speed failure recovery of a failure of an inter-link in a multi-ring with a plurality of rings connected.

FIG. 23 is a diagram for use in explaining an example of a multi-ring network having two rings connected by two inter-links. In the multi-ring network shown in FIG. 23, two rings 401 and 402 are connected through inter-links 403 and 404. The inter-link 403 is used as a living link and the inter-link 404 is a spare inter-link. One ring 401 comprises the RPR nodes 300-1~300-6, with a terminal 410 connected to the RPR node 300-1. The other ring 402 comprises RPR nodes 300-7~300-12, with a terminal 411 connected to the RPR node 300-10.

A path (traffic flow) 420 illustrated in FIG. 23 shows a path used in a case of transferring a frame from the terminal 410 to the terminal 411 in a normal state. Type of frame (U-MAC frame or RPR-MAC frame) varies with a position on the path 420. The RPR node 300-1 receives a U-MAC frame from the terminal 410. Then, the RPR node 300-1 adds a header with 300-3 as a transmission destination RPR-MAC address to convert the U-MAC frame into an RPR-MAC frame and transmits the frame directed to the RPR node 300-3. The RPR node 300-3 removes an RPR-MAC overhead of the received RPR-MAC frame to convert the frame into a U-MAC frame. Then, the node sends out the U-MAC frame to the inter-link 403. Upon receiving the U-MAC frame, the RPR node 300-7 adds a header with 300-10 as a transmission destination RPR-MAC address to convert the U-MAC frame into an RPR-MAC frame and sends out the frame to an outer ring 402-outer. The RPR node 300-10 removes the overhead of the arriving RPR-MAC frame to convert the frame into a U-MAC frame and transfers the obtained frame to the terminal 411. As a result, the frame is transferred along the path 420 shown in FIG. 23 in a normal state.

Assume that in this multi-ring network, a failure occurs on the inter-link 403. In a related multi-ring network, the RPR node 300-1 is not allowed to know occurrence of a failure on the inter-link 403 immediately. Therefore, the RPR node 300-1 converts the U-MAC frame from the terminal 410 into an RPR-MAC frame with 300-3 added as a transmission destination RPR-MAC address as in a normal state. As a result, the RPR-MAC frame is terminated at the RPR node 300-3 and not at the RPR node 300-4 at which the frame is to originally arrive. For reaching the RPR node 300-4, a time is required until a correspondence between a U-MAC address of the terminal 411 and an RPR-MAC address is invalidated at a learning data base of the RPR node 300-1 (in general, called an aging time whose time is approximately 5 minutes), so that high-speed failure recovery is impossible. In other words, from when a correspondence relationship between latest U-MAC address and RPR-MAC address is learned until a lapse of the aging time, a correspondence relationship between new U-MAC address and RPR-MAC address can not be learned. Then, after the lapse of the aging time, a broadcast frame is transferred and at that time a correspondence relationship between a transmission source U-MAC address and a transmission source RPR-MAC address is learned. Until the learning is executed, no frame transfer from the RPR node 300-1 to the RPR node 300-4 is allowed to disable high-speed failure recovery.

An exemplary object of the present invention is to provide, in a multi-ring network with a plurality of ring networks connected, a ring network system, a failure recovery method, a failure detection method, a node and a program for a node which enable high-speed failure recovery when a failure occurs between ring networks.

SUMMARY

According to a first exemplary aspect of the invention, a ring network system with a first ring network and a second ring network connected by a living communication path and a spare communication path, wherein each node in said first ring network and in said second ring network includes a learning data base for storing a correspondence relationship between an address of a terminal outside the ring network and an address of a node within the ring network, a failure occurrence determination unit for determining that a failure occurs on the living communication path, and an erasure unit for erasing information stored by the learning data base when said failure occurrence determination unit determines that a failure occurs on the living communication path, each node other than a contact node arranged as an end portion of the living communication path and the spare communication path includes a broadcast unit for, when an address of a node corresponding to a transmission destination address that a user frame received from a terminal outside the ring network fails to be stored in said learning data base, broadcast-transmitting a frame with said user frame accommodated as a payload, and a contact node arranged as an end portion of the spare communication path includes a state change unit for changing a port connected to the spare communication path to a state of enabling a user frame to be sent out when said failure occurrence determination unit determines that a failure occurs on the living communication path.

According to another exemplary aspect of the invention, the erasure unit erases all the information stored by the learning data base when the failure occurrence determination unit determines that a failure occurs on the living communication path.

According to another exemplary aspect of the invention, the erasure unit erases only an address of a contact node arranged as an end portion of the living communication path and an address of a terminal corresponding to the address among the information stored by the learning data base when the failure occurrence determination unit determines that a failure occurs on the living communication path.

According to another exemplary aspect of the invention, a contact node arranged as an end portion of the living communication path includes an existence confirmation signal transmission unit for periodically transmitting an existence confirmation signal to other ring network through the living communication path, and an existence confirmation signal reception unit for receiving an existence confirmation signal from said other ring network.

According to another exemplary aspect of the invention, a contact node arranged as an end portion of the living communication path includes an existence confirmation frame transmission unit for transmitting a frame with an existence confirmation signal received by the existence confirmation signal reception unit accommodated as a payload within a ring network to which the contact node belongs, the failure occurrence determination unit that other node than said contact node includes among nodes in said ring network determines that a failure occurs on the living communication path when failing to receive said frame for a fixed time period, and the failure occurrence determination unit that said contact node includes determines that a failure occurs on the living communication path when failing to receive an existence confirmation signal for a fixed time period.

According to a second exemplary aspect of the invention, a ring network system with a first ring network and a second ring network connected by a plurality of communication paths correlated with network identifiers in advance, wherein among nodes in said first ring network and in said second ring network, each node other than a contact node arranged as an end portion of said plurality of communication paths includes a network identifier deriving unit for deriving a network identifier to be applied to a user frame received from a terminal outside the ring network from network identifiers corresponding to communication paths developing no fault, a network identifier applying unit for applying said network identifier to said user frame, a failure occurrence determination unit for determining that a failure occurs on a communication path, a failure occurring communication path notification unit for, when said failure occurrence determination unit determines that a failure occurs on a communication path, notifying said network identifier deriving unit of information which can specify a network identifier corresponding to the communication path developing the fault, a learning data base for storing a correspondence relationship among an address of a terminal outside the ring network, a network identifier and an address of a node within the ring network, and a broadcast unit for, when an address of a node corresponding to a combination between a transmission destination address that a user frame received from a terminal outside the ring network has and a network identifier derived by the network identifier deriving unit fails to be stored in said learning data base, broadcast-transmitting a frame with a user frame to which said network identifier is applied accommodated as a payload, and each contact node arranged as an end portion of each communication path includes a user frame sending unit for, when a network identifier corresponding to a communication path with the contact node itself as an end portion and a network identifier applied to a user frame coincide, sending said user frame to said communication path.

According to another exemplary aspect of the invention, each contact node arranged as an end portion of each communication path includes an existence confirmation signal transmission unit for periodically transmitting an existence confirmation signal to other ring network through a communication path with the contact node itself as an end portion, and an existence confirmation signal reception unit for receiving an existence confirmation signal from said other ring network.

According to another exemplary aspect of the invention, each contact node arranged as an end portion of each communication path includes an existence confirmation frame transmission unit for transmitting a frame with an existence confirmation signal received by the existence confirmation signal reception unit accommodated as a payload within a ring network to which the contact node belongs, and when failing to receive said frame for a fixed time period, the failure occurrence determination unit that other node than said contact node includes among nodes in said ring network determines that a failure occurs on a communication path with a contact node which is a transmission source of said frame as an end portion.

According to a third exemplary aspect of the invention, a ring network system with a first ring network and a second ring network connected by a communication path, wherein a contact node arranged as an end portion of said communication path includes an existence confirmation signal transmission unit for periodically transmitting an existence confirmation signal to other ring network through said communication path, an existence confirmation signal reception unit for receiving an existence confirmation signal from said other ring network, and an existence confirmation frame transmission unit for transmitting a frame with an existence confirmation signal received by the existence confirmation signal reception unit accommodated as a payload within a ring network to which the contact node belongs, and a node other than a contact node among nodes in the ring network includes a failure occurrence determination unit for determining that a failure occurs on said communication path when failing to receive said frame for a fixed time period.

According to a fourth exemplary aspect of the invention, a failure recovery method to be applied to a ring network system with a first ring network and a second ring network connected by a living communication path and a spare communication path, wherein each node in said first ring network and in said second ring network includes a learning data base for storing a correspondence relationship between an address of a terminal outside the ring network and an address of a node within the ring network, and when determining that the living communication path develops a fault, erases information stored by the learning data base, each node other than a contact node arranged as an end portion of the living communication path and the spare communication path, when an address of a node corresponding to a transmission destination address that a user frame received from a terminal outside the ring network has fails to be stored in said learning data base, broadcast-transmits a frame with said user frame accommodated as a payload, and a contact node arranged as an end portion of the spare communication path, when determining that the living communication path develops a fault, changes a port connected to the spare communication path to a state of enabling a user frame to be sent out.

According to another exemplary aspect of the invention, each node in the first ring network and the second ring network erases all the information stored by the learning data base when determining that a failure occurs on the living communication path.

According to another exemplary aspect of the invention, each node in the first ring network and the second ring network erases only an address of a contact node arranged as an end portion of the living communication path and an address of a terminal corresponding to the address among the information stored by the learning data base when determining that a failure occurs on the living communication path.

According to another exemplary aspect of the invention, a contact node arranged as an end portion of the living communication path periodically transmits an existence confirmation signal to other ring network through the living communication path, and receives an existence confirmation signal from said other ring network.

According to another exemplary aspect of the invention, a contact node arranged as an end portion of the living communication path transmits a frame with a received existence confirmation signal accommodated as a payload within a ring network to which the contact node belongs, and determines that a failure occurs on the living communication path when failing to receive an existence confirmation signal for a fixed time period, and other node than said contact node among nodes in said ring network, when failing to receive said frame for a fixed time period, determines that a failure occurs on the living communication path.

According to a fifth exemplary aspect of the invention, a failure recovery method to be applied to a ring network system with a first ring network and a second ring network connected by a plurality of communication paths correlated with network identifiers in advance, wherein among nodes in said first ring network and in said second ring network, each node other than a contact node arranged as an end portion of said plurality of communication paths includes a learning data base for storing a correspondence relationship among an address of a terminal outside the ring network, a network identifier and an address of a node within the ring network, derives a network identifier to be applied to a user frame received from a terminal outside the ring network from network identifiers corresponding to communication paths developing no fault, applies said network identifier to said user frame, when determining that a failure occurs on a communication path, specifies a network identifier corresponding to the communication path developing the fault, and when an address of a node corresponding to a combination between a transmission destination address that a user frame received from a terminal outside the ring network has and a network identifier derived fails to be stored in said learning data base, broadcast-transmits a frame with a user frame to which said network identifier is applied accommodated as a payload, and each contact node arranged as an end portion of each communication path, when a network identifier corresponding to a communication path with the contact node itself as an end portion and a network identifier applied to a user frame coincide, sends said user frame to said communication path.

According to another exemplary aspect of the invention, each contact node arranged as an end portion of each communication path periodically transmits an existence confirmation signal to other ring network through a communication path with the contact node itself as an end portion, and receives an existence confirmation signal from said other ring network.

According to another exemplary aspect of the invention, each contact node arranged as an end portion of each communication path transmits a frame with a received existence confirmation signal accommodated as a payload within a ring network to which the contact node belongs, and other node than said contact node among nodes in said ring network, when failing to receive said frame for a fixed time period, determines that a failure occurs on a communication path with a contact node which is a transmission source of said frame as an end portion.

According to a sixth exemplary aspect of the invention, a failure detection method to be applied to a ring network system with a first ring network and a second ring network connected by a communication path, wherein a contact node arranged as an end portion of said communication path periodically transmits an existence confirmation signal to other ring network through said communication path, receives an existence confirmation signal from said other ring network, and transmits a frame with a received existence confirmation signal accommodated as a payload within a ring network to which the contact node belongs, and a node other than a contact node among nodes in the ring network determines that a failure occurs on said communication path when failing to receive said frame for a fixed time period.

According to a seventh exemplary aspect of the invention, a node to be applied to a ring network system with a first ring network and a second ring network connected by a living communication path and a spare communication path, includes a learning data base for storing a correspondence relationship between an address of a terminal outside the ring network and an address of a node within the ring network, a failure occurrence determination unit for determining that a failure occurs on the living communication path, and an erasure unit for erasing information stored by the learning data base when said failure occurrence determination unit determines that the living communication path develops a fault.

According to another exemplary aspect of the invention, the erasure unit erases all the information stored by the learning data base when the failure occurrence determination unit determines that a failure occurs on the living communication path.

According to another exemplary aspect of the invention, the erasure unit erases only an address of a contact node arranged as an end portion of the living communication path and an address of a terminal corresponding to the address among the information stored by the learning data base when the failure occurrence determination unit determines that a failure occurs on the living communication path.

According to another exemplary aspect of the invention, the node including a broadcast unit for, when an address of a node corresponding to a transmission destination address that a user frame received from a terminal outside the ring network has fails to be stored in said learning data base, broadcast-transmitting a frame with said user frame accommodated as a payload.

According to another exemplary aspect of the invention, wherein the failure occurrence determination unit determines that a failure occurs on the living communication path when failing to receive a frame with an existence confirmation signal accommodated as a payload for a fixed time period.

According to another exemplary aspect of the invention, the node is arranged as an end portion of the living communication path and further includes an existence confirmation signal transmission unit for periodically transmitting an existence confirmation signal to other ring network through the living communication path, and an existence confirmation signal reception unit for receiving an existence confirmation signal from said other ring network.

According to another exemplary aspect of the invention, the node including an existence confirmation frame transmission unit for transmitting a frame with an existence confirmation signal received by the existence confirmation signal reception unit accommodated as a payload within a ring network to which the contact node belongs.

According to a eighth exemplary aspect of the invention, a node to be applied to a ring network system with a first ring network and a second ring network connected by a plurality of communication paths correlated with network identifiers in advance, includes a learning data base for storing a correspondence relationship among an address of a terminal outside the ring network, a network identifier and an address of a node within the ring network, a network identifier deriving unit for deriving a network identifier to be applied to a user frame received from a terminal outside the ring network from network identifiers corresponding to communication paths developing no fault, a network identifier applying unit for applying said network identifier to said user frame, a failure occurrence determination unit for determining that a failure occurs on a communication path, a failure occurring communication path notification unit for, when said failure occurrence determination unit determines that a failure occurs on a communication path, notifying said network identifier deriving unit of information which can specify a network identifier corresponding to the communication path developing the fault, and a broadcast unit for, when an address of a node corresponding to a combination between a transmission destination address that a user frame received from a terminal outside the ring network has and a network identifier derived by the network identifier deriving unit fails to be stored in said learning data base, broadcast-transmitting a frame with a user frame to which said network identifier is applied accommodated as a payload.

According to another exemplary aspect of the invention, the failure occurrence determination unit determines that a failure occurs on the living communication path when failing to receive a frame with an existence confirmation signal accommodated as a payload for a fixed time period.

According to a ninth exemplary aspect of the invention, a node to be applied to a ring network system with a first ring network and a second ring network connected by a communication path, which is arranged as an end portion of said living communication path and includes an existence confirmation signal transmission unit for periodically transmitting an existence confirmation signal to other ring network through said communication path, an existence confirmation signal reception unit for receiving an existence confirmation signal from said other ring network, and an existence confirmation frame transmission unit for transmitting a frame with an existence confirmation signal received by the existence confirmation signal reception unit accommodated as a payload within a ring network to which the node belongs.

According to a tenth exemplary aspect of the invention, a program for a node for causing a computer which a node to be applied to a ring network system with a first ring network and a second ring network connected by a living communication path and a spare communication path includes and which includes a learning data base for storing a corresponding relationship between an address of a terminal outside the ring network and an address of a node within the ring network to execute failure occurrence processing of determining that a failure occurs on the living communication path and erasing processing of erasing information stored in the learning data base when determination is made that a failure occurs on the living communication path by said failure occurrence processing.

According to another exemplary aspect of the invention, the program for a node causes the computer to execute processing of erasing all the information stored by the learning data base in the erasing processing.

According to another exemplary aspect of the invention, the program for a node causes the computer to execute processing of erasing only an address of a contact node arranged as an end portion of the living communication path and an address of a terminal corresponding to the address among the information stored by the learning data base in the erasing processing.

According to another exemplary aspect of the invention, the program for a node causes the computer to execute broadcast processing of, when an address of a node corresponding to a transmission destination address that a user frame received from a terminal outside the ring network has fails to be stored in said learning data base, broadcast-transmitting a frame with said user frame accommodated as a payload.

According to another exemplary aspect of the invention, the program for a node causes the computer to, when failing to receive a frame with an existence confirmation signal accommodated as a payload for a fixed time period in the failure occurrence processing, determine that a failure occurs on the living communication path.

According to another exemplary aspect of the invention, the program for a node causes the computer that a node arranged as an end portion of the living communication path includes to execute existence confirmation signal transmission processing of periodically transmitting an existence confirmation signal to other ring network through the living communication path, and existence confirmation signal reception processing of receiving an existence confirmation signal from said other ring network.

According to another exemplary aspect of the invention, the program for a node causes the computer to execute existence confirmation frame transmission processing of transmitting a frame with an existence confirmation signal received in the existence confirmation signal reception processing accommodated as a payload within a ring network to which the node itself belongs.

According to a eleventh exemplary aspect of the invention, a program for a node for causing a computer which a node to be applied to a ring network system with a first ring network and a second ring network connected by a plurality of communication paths correlated with network identifiers in advance includes and which includes a learning data base for storing a corresponding relationship among an address of a terminal outside the ring network, a network identifier and an address of a node within the ring network to execute network identifier deriving processing of deriving a network identifier to be applied to a user frame received from a terminal outside the ring network from network identifiers corresponding to communication paths developing no fault, network identifier applying processing of applying said network identifier to said user frame, failure occurrence determination processing of determining that a failure occurs on a communication path, failure network identifier specifying processing of specifying, when said failure occurrence determination processing determines that a failure occurs on a communication path, a network identifier corresponding to the communication path developing the fault, and broadcasting processing of, when an address of a node corresponding to a combination between a transmission destination address that a user frame received from a terminal outside the ring network has and a network identifier derived by the network identifier deriving processing fails to be stored in said learning data base, broadcast-transmitting a frame with a user frame to which said network identifier is applied accommodated as a payload.

According to another exemplary aspect of the invention, the program for a node causes the computer to determine, when failing to receive a frame with an existence confirmation signal accommodated as a payload for a fixed time period in the failure occurrence processing, that a failure occurs on the living communication path.

According to a twelfth exemplary aspect of the invention, a program for a node for causing a computer that a node includes which is to be applied to a ring network system with a first ring network and a second ring network connected by a communication path and which is arranged as an end portion of said communication path to execute existence confirmation signal transmission processing of periodically transmitting an existence confirmation signal to other ring network through said communication path, and existence confirmation signal reception processing of receiving an existence confirmation signal from said other ring network and existence confirmation frame transmission processing of transmitting a frame with a received existence confirmation signal accommodated as a payload within a ring network to which the node belongs.

EXEMPLARY EMBODIMENT

In the following, best modes for implementing the present invention will be described with reference to the drawings.

First Exemplary Embodiment

Figure 1:
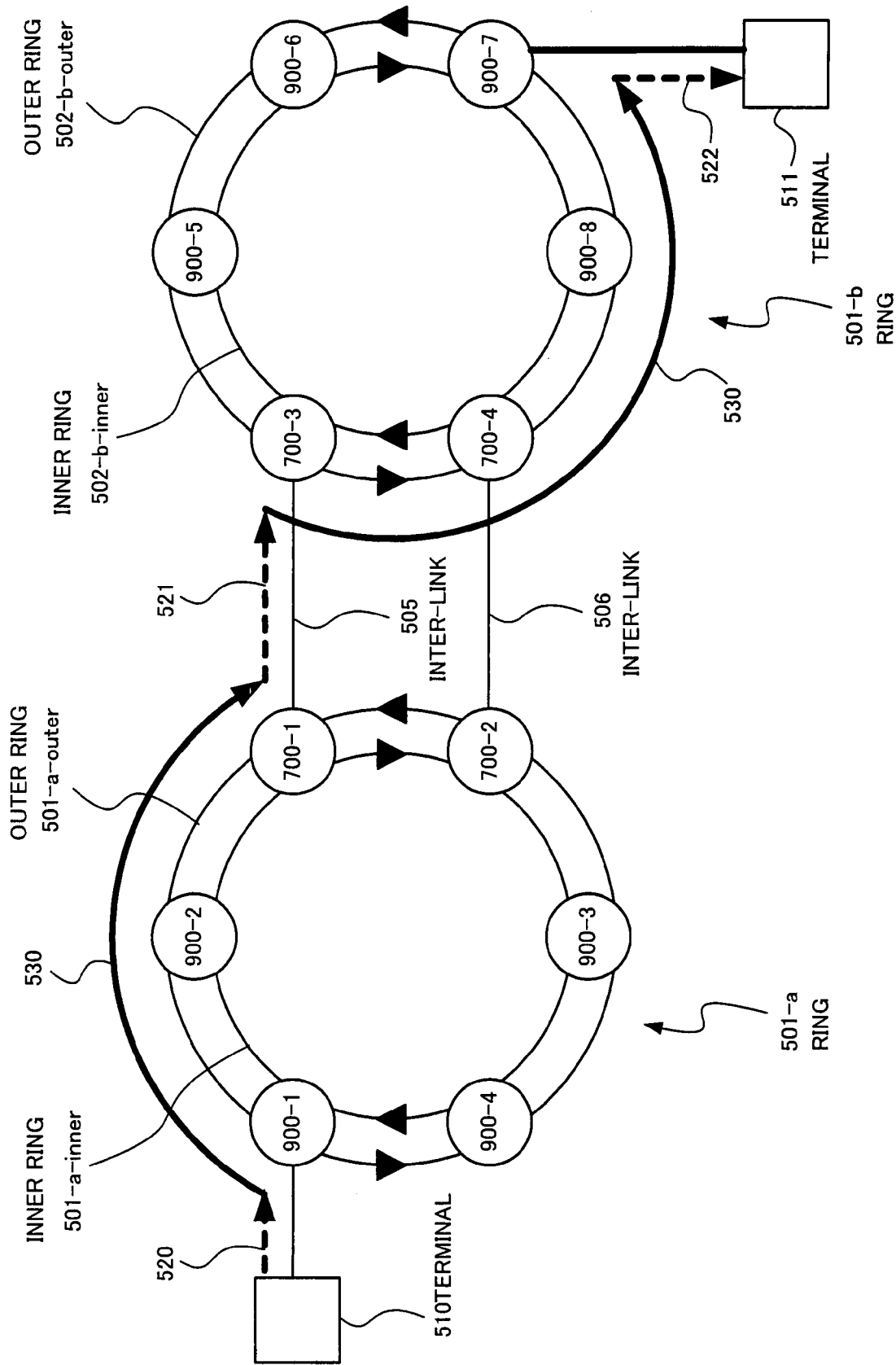
FIG. 1 is a diagram for use in explaining an example of a structure of a ring network system according to a first exemplary embodiment of the present invention.

FIG. 1 is a diagram for use in explaining an example of a structure of a ring network system according to the present invention. The ring network system according to the present invention is a multi-ring network system comprising a plurality of rings (packet rings with nodes connected in a ring) 501-*a* and 501-*b*. The ring 501-*a* comprises RPR nodes (hereinafter simply denoted as a node) 900-1~900-4 and nodes 700-1 and 700-2 connected to an inter-link. In the following, a node connected to other ring through an inter-link (or other communication network) will be denoted as a contact node. The ring 501-*b* comprises nodes 900-5~900-8 and contact nodes 700-3 and 700-4. The rings 501-*a* and 501-*b* are two-fiber rings, with the ring 501-*a* comprising an inner ring 501-*a*-inner and an outer ring 501-*a*-outer. Similarly, the ring 501-*b* comprises an inner ring 501-*b*-inner and an outer ring 501-*b*-outer. Assume here that each inner ring executes clockwise traffic transfer and each outer ring executes counter-clockwise traffic transfer. Also assume that to the node 900-1, a terminal 510 is connected and to the node 900-7, a terminal 511 is connected. RPR-MAC addresses of the respective nodes 900-1~900-8 are 900-1~900-8, respectively. Similarly, RPR-MAC addresses of the respective contact nodes 700-1~700-4 are 700-1~700-4, respectively.

The contact nodes 700-1 and 700-3 are connected by an inter-link 505. The contact nodes 700-2 and 700-4 are connected by an inter-link 506. Assume here that the inter-link 505 is a living inter-link used in a normal state and the inter-link 506 is a spare inter-link. In other words, assume that when the living inter-link 505 develops a fault, the inter-link 506 is used.

In the following, description will be made of operation of the ring network system in a normal state with respect to a case where a U-MAC frame is transferred from the terminal 510 to the terminal 511 as an example. U-MAC frame is an Ethernet (registered trademark) frame, for example. In FIG. 1, paths 520, 521 and 522 indicated by dotted lines are U-MAC frame transfer paths. Also in FIG. 1, a path 530 indicated by a solid line is an RPR-MAC frame transfer path.

The node 900-1 having received a U-MAC frame output from the terminal 510 searches an RPR-MAC address corresponding to a transmission destination U-MAC address in the U-MAC frame by using a learning data base owned by the node itself to determine a transmission destination RPR-MAC address. In the present example, assume that a transmission destination U-MAC address (the address of the terminal 511) and the RPR-MAC address "700-1" are correlated with each other and learned by the learning data base in advance. Accordingly, the node 900-1 adds, to the U-MAC frame, an RPR-MAC overhead with "700-1" as a transmission destination RPR-MAC address and its own RPR-MAC address "900-1" as a transmission source RPR-MAC address to convert the U-MAC frame into an RPR-MAC frame. Thus adding an overhead to a U-MAC frame and accommodating the U-MAC frame as a payload is referred to as encapsulation.

Subsequently, the node 900-1 refers to its own forwarding data base to specify output ring information corresponding to the transmission destination RPR-MAC address. Output ring information is information indicative of whether an RPR-MAC frame is to be output to an inner ring, to an outer ring or to both of the inner ring and the outer ring. The node 900-1 refers to the output ring information of the forwarding data base to determine to which of the inner ring and the outer ring the RPR-MAC frame is to be sent out and sends the RPR-MAC frame according to the determination. FIG. 1 shows a case where the frame is sent to the inner ring 501-*a*-inner.

The node 900-2 having received the RPR-MAC frame sent from the node 900-1 refers to the transmission destination RPR-MAC address of the RPR-MAC frame and compares the address with its own address. Since the transmission destination RPR-MAC address and the address of the node 900-2 itself differ from each other, the node 900-2 determines that the RPR-MAC frame should not be terminated by itself to transfer the RPR-MAC frame to the inner ring 501-*a*-inner.

The node 700-1 having received the RPR-MAC frame sent from the node 900-2 refers to the transmission destination RPR-MAC address of the RPR-MAC frame and compares the address with its own address. Since the compared two addresses coincide, the node 700-1 takes in the RPR-MAC address. In other words, the node takes out the RPR-MAC frame from the ring 501-*a*. Then, the node 700-1 extracts the RPR-MAC overhead from the RPR-MAC frame to convert the RPR-MAC frame into a U-MAC frame. The node 700-1 sends out the U-MAC frame to the inter-link 505.

The node 700-3 receives the U-MAC frame through the inter-link 505. Then, the node 700-3 refers to its own learning data base to determine a transmission destination RPR-MAC address ("900-7" here) in the ring 501-*b*. The node 700-3 adds, to the U-MAC frame, an RPR-MAC overhead with "900-7" as a transmission destination RPR-MAC address and its own RPR-MAC address "700-3" as a transmission source RPR-MAC address to convert the U-MAC frame into an RPR-MAC frame. Subsequently, the node 700-3 refers to its own forwarding data base to specify output ring information based on the transmission destination RPR-MAC address. Here, the node 700-3 sends out the RPR-MAC frame to the outer ring 502-*b*-outer according to the output ring information.

Each of the node 700-4 and 900-8, upon receiving the RPR-MAC frame, determines that it is not an RPR-MAC frame to be terminated by itself because the transmission destination RPR-MAC address and its own RPR-MAC address fail to coincide with each other. Then, the node sends out the RPR-MAC frame to the outer ring 502-*b*-outer. As a result, the node 900-7 receives the RPR-MAC frame. The node 900-7 takes in the received RPR-MAC frame because the transmission destination RPR-MAC address of the received RPR-MAC frame coincides with its own RPR-MAC address (takes out the RPR-MAC frame from the ring 501-*b*). Subsequently, the node 900-7 removes the RPR-MAC overhead from the RPR-MAC frame to convert the RPR-MAC frame into a U-MAC frame. The node 900-7 transfers the U-MAC frame to the terminal 511.

Figure 2:
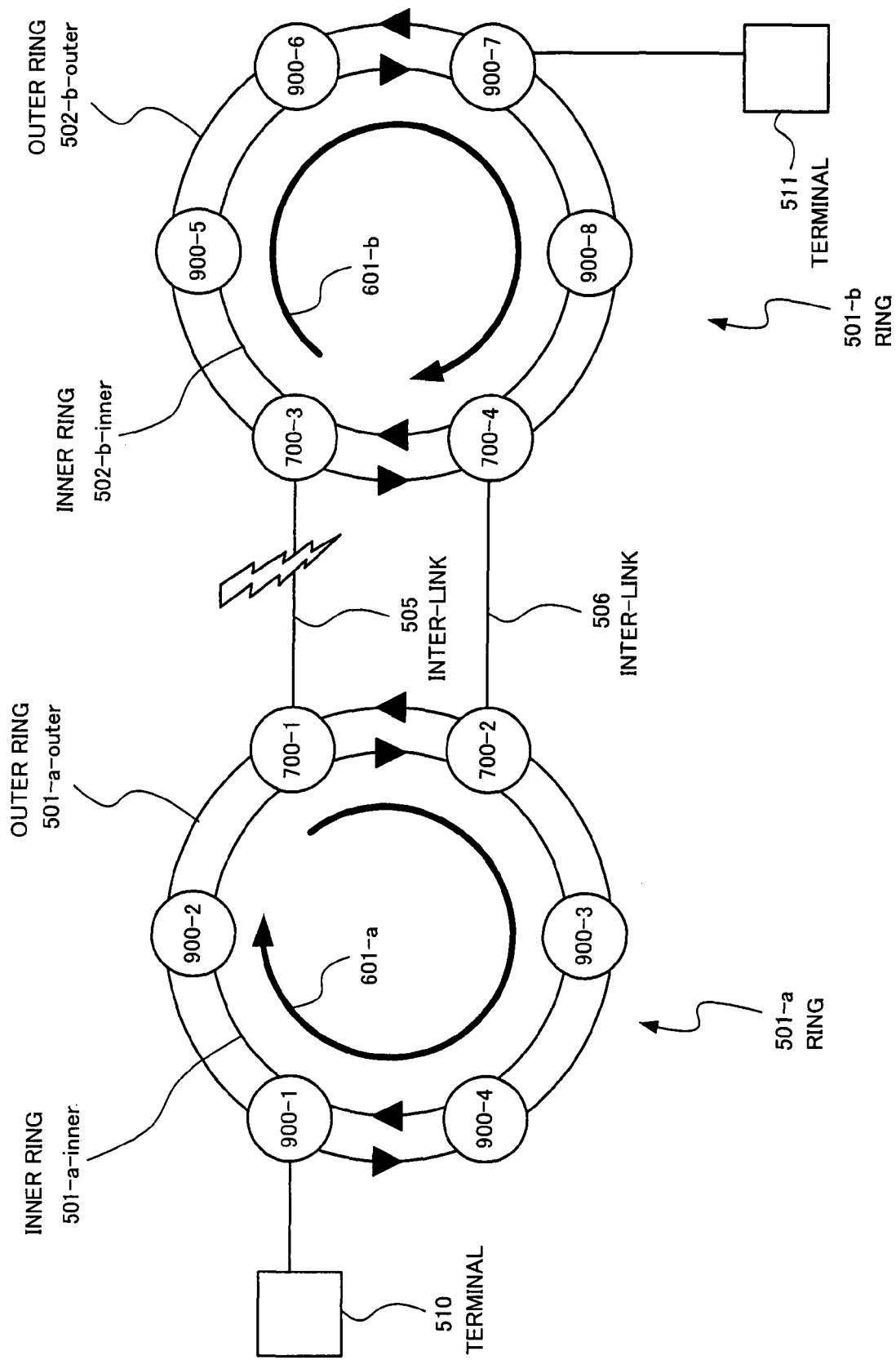
FIG. 2 is a diagram for use in explaining a situation where a living inter-link develops a fault.

Next, operation executed at the time of occurrence of a failure will be described. FIG. 2 is a diagram for use in explaining a situation where the living inter-link 505 develops a fault. As a result of occurrence of a failure on the living inter-link 505, no U-MAC frame can be transferred from the terminal 510 to the terminal 511 due to the traffic flow shown in FIG. 1.

Figure 3:
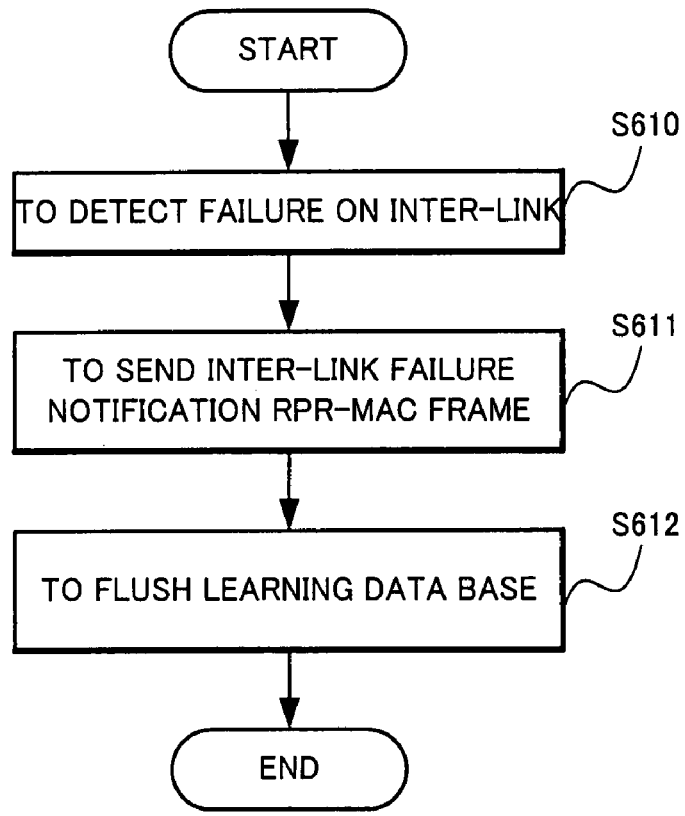
FIG. 3 is a flow chart showing operation of a contact node connected to an inter-link which develops a fault.

FIG. 3 is a flow chart showing operation of contact nodes (the contact nodes 700-1 and 700-3 in this example) connected to an inter-link on which a failure occurs. When the living inter-link 505 develops a fault, the contact nodes 700-1 and 700-3 connected to the inter-link 505 detect the fault (Step S610). Subsequently, each of the contact nodes 700-1 and 700-3 sends out an RPR-MAC frame (inter-link failure notification RPR-MAC frame) which notifies occurrence of a failure on the inter-link 505 within a ring to which its own node belongs (Step S611). The contact nodes 700-1 and 700-3 include information which can specify an inter-link developing a fault in the inter-link failure notification RPR-MAC frame. To be included in the inter-link failure notification RPR-MAC frame are, for example, an inter-link ID for identifying an individual inter-link and an RPR-MAC address of a node having detected an inter-link failure (i.e. RPR-MAC addresses of the contact nodes 700-1 and 700-3 themselves).

In the following, description will be made, as an example, with respect to a case where as information which can specify an inter-link developing a fault, an RPR-MAC address of a node having detected the inter-link failure is included. When an inter-link ID is included as information which can specify an inter-link developing a fault, each node is allowed to specify contact nodes at the opposite ends of the inter-link from its inter-link ID. The inter-link failure notification RPR-MAC frame may be sent to an inner ring, an outer ring or both of them. Illustrated in the example shown in FIG. 2 is a case where the contact nodes 700-1 and 700-3 send out an inter-link failure notification RPR-MAC frame to the inner ring 501-*a*-inner and the inner ring 502-*b*-inner, respectively. Paths 601-*a* and 601-*b* shown in FIG. 2 indicate a transfer path of an inter-link failure notification RPR-MAC frame. After Step S611, the contact nodes 700-1 and 700-3 flush (erase) learning contents of their own learning data bases (Step S612).

Figure 4:
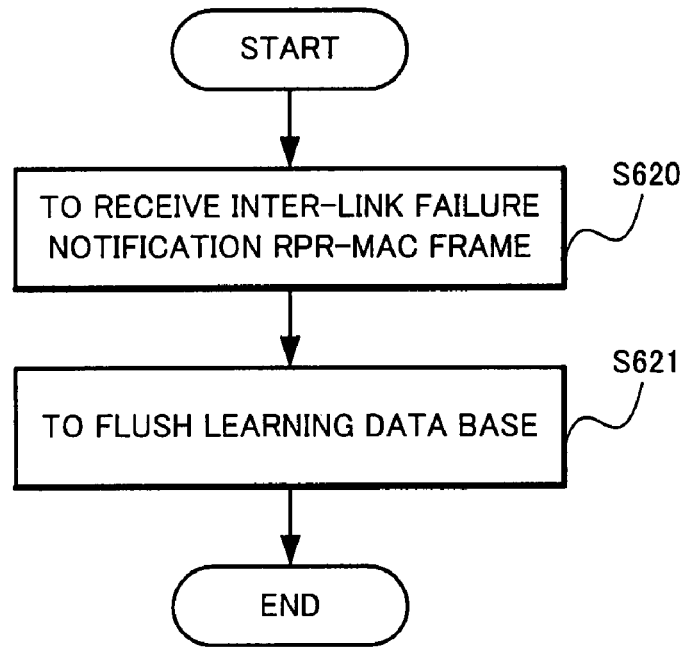
FIG. 4 is a flow chart showing operation of other node than a contact node connected to an inter-link which develops a fault (excluding a contact node connected to a spare inter-link)

FIG. 4 is a flow chart showing operation of other node than a contact node connected to an inter-link developing a fault (excluding a contact node connected to a spare inter-link). The nodes 900-1~900-8 are relevant nodes. Although description will be here made of operation of the node 900-1, the nodes 900-2~900-8 execute the same operation. The node 900-1 receives an inter-link failure notification RPR-MAC frame transmitted by the contact node 700-1 at Step 611 (Step S620). Then, the node 900-1 forcibly flushes learning contents of its own learning data base (Step S621).

Figure 5:
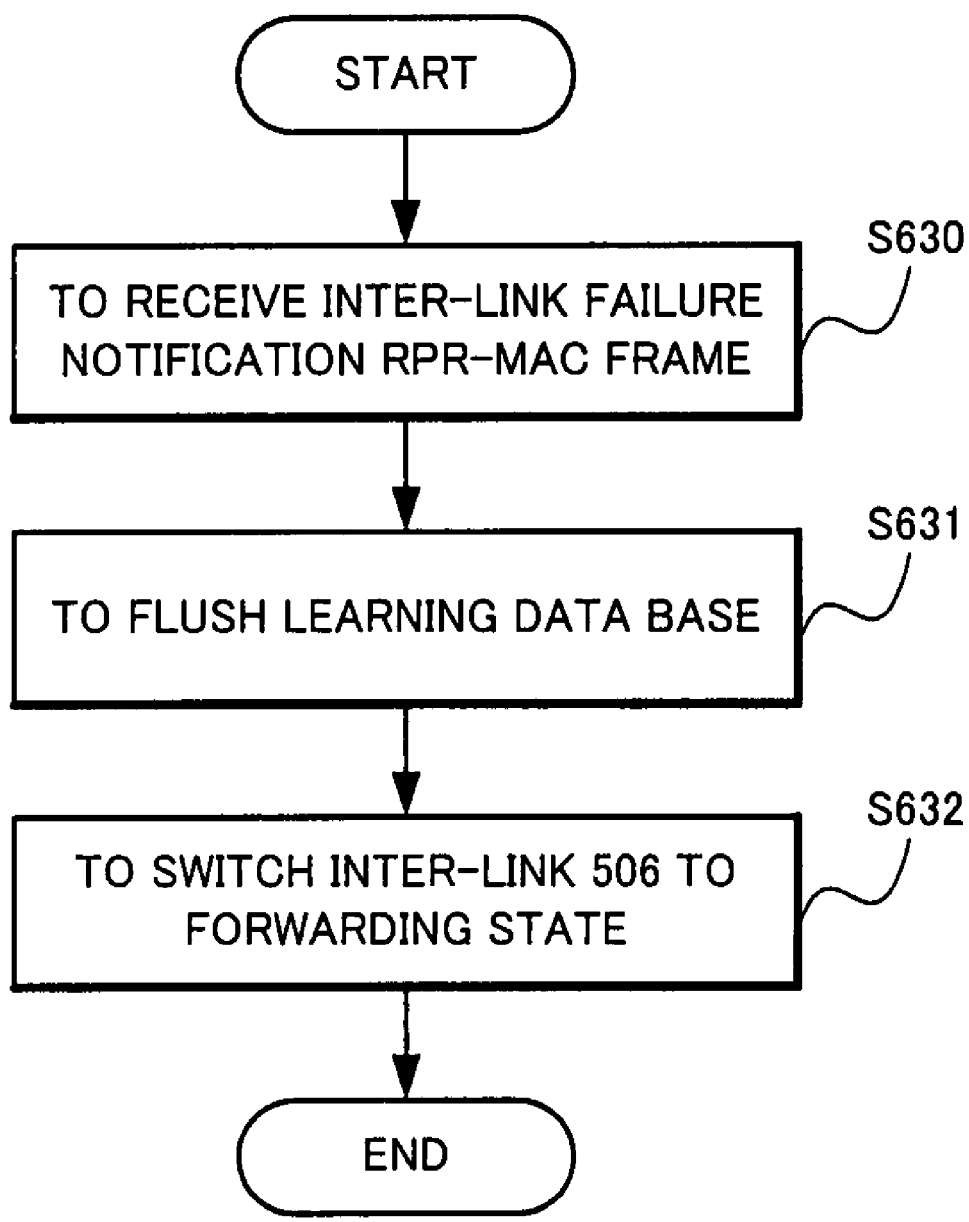
FIG. 5 is a flow chart showing operation of a contact node connected to a spare inter-link.

FIG. 5 is a flow chart showing operation of a contact node (the contact nodes 700-2 and 700-4 in this example) connected to the spare inter-link 506. Upon receiving an inter-link failure notification RPR-MAC frame, each of the contact nodes 700-2 and 700-4 forcibly flushes learning contents of its own learning data base (Steps S630 and S631). Operations at Steps S630 and S631 are the same as those at Steps S620 and S621 shown in FIG. 4. The contact nodes 700-2 and 700-4 set the spare inter-link 506 at a forwarding state (Step S632). Either of the operations at Steps S631 and S632 can be executed first.

The forwarding state represents a state which enables packet passage. On the other hand, a state where a received frame is abandoned without sending is referred to as a blocked state. The forwarding state and the blocked states are set on the basis of a port of each node. Until execution of Step S632, among ports which the contact nodes 700-2 and 700-4 have, a port connected to the inter-link 506 is set at the blocked state to prevent sending of a frame to the inter-link 506. At Step S632, the contact nodes 700-2 and 700-4 set the port connected to the inter-link 506 at the forwarding state to enable a frame to be sent to the inter-link 506.

As shown in FIG. 3 through FIG. 5, each node flushes its own learning data base. At this time, flushing is forcibly executed irrespectively whether an aging time has elapsed or not. In other words, even before a lapse of an aging time, flushing is executed.

In addition, each node may flush all the learning contents of the learning data base. Alternatively, among learning contents of the learning data base, each node may selectively flush only information about an RPR-MAC address of a node having detected an inter-link failure and about a U-MAC address correlated to the RPR-MAC address. Information of the node having detected an inter-link failure is included in an inter-link failure notification RPR-MAC frame. In a case, for example, of receiving an inter-link failure notification RPR-MAC frame including information that the node 700-1 detects an inter-link failure, each node may selectively flush the RPR-MAC address "700-1" and a U-MAC address correlated to the address.

Figure 6:
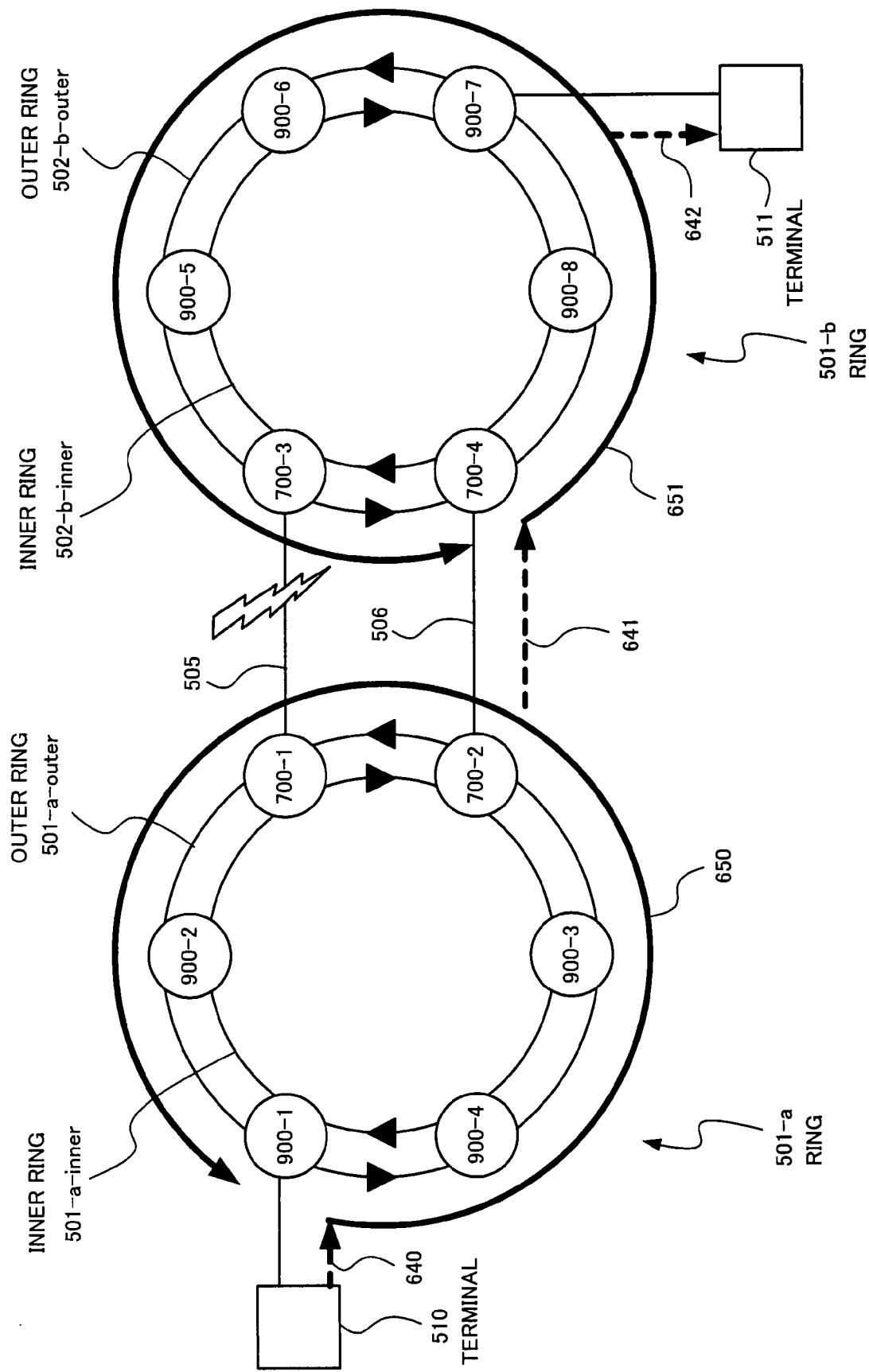
FIG. 6 is a diagram for use in explaining a situation where after flushing a learning data base in response to failure occurrence on an inter-link, each node transfers a frame from one terminal to another.

FIG. 6 is a diagram for use in explaining a situation where in response to occurrence of a failure on the inter-link 505, after flushing the learning data base, each of the nodes 700-1~700-4 and 900-1~900-8 transfers a frame from the terminal 510 to the terminal 511. In FIG. 6, paths 640, 641 and 642 indicated by dotted lines are U-MAC frame transfer paths. Also in FIG. 6, paths 650 and 651 indicated by solid lines are transfer paths of a broadcast-transmitted RPR-MAC frame.

The node 900-1 having received a U-MAC frame output from the terminal 510, by using its own learning data base, searches an RPR-MAC address corresponding to a transmission destination U-MAC address in the U-MAC frame. At this time, since learning contents of the learning data base are flushed, the search fails. Even when flushing of the learning data base is selectively executed, because the RPR-MAC address "700-1" of a node having detected an inter-link failure and a U-MAC address correlated to the address are erased, search of the RPR-MAC address "700-1" is impossible, which can be done in a normal state. When search of an RPR-MAC address fails, the node 900-1 adds, to the U-MAC frame, an RPR-MAC overhead with the transmission destination RPR-MAC address as a broadcast address and its own RPR-MAC address "900-1" as a transmission source RPR-MAC address. The node 900-1 converts the U-MAC frame into an RPR-MAC frame by adding the RPR-MAC overhead. The node 900-1 broadcast-transmits the RPR-MAC frame. At this time, the node 900-1 may send the RPR-MAC frame to either of an inner ring and outer ring. The frame may be sent to both of the inner ring and the outer ring. Shown in FIG. 6 is a case where the node 900-1 sends an RPR-MAC frame to the outer ring 501-*a*-outer and the transfer path 650 executes transfer.

Upon receiving the RPR-MAC frame (the RPR-MAC frame with a broadcast address as a transmission destination), the node 900-4 takes in the RPR-MAC frame, as well as sending a copy of the RPR-MAC frame to the ring 501-*a*. At this time, the node 900-4 sends the copy of the RPR-MAC frame to a ringlet to which the RPR-MAC frame is transferred, either the inner ring or the outer ring. Accordingly, in the present example, the node sends out the copy of the RPR-MAC frame to the outer ring 501-*a*-outer.

In addition, the node 900-4 registers, at its own learning data base, a correspondence relationship between a transmission source RPR-MAC address ("900-1" in this example) in the taken RPR-MAC frame and a transmission source U-MAC address (the address of the terminal 510 in this example) of a U-MAC frame accommodated in the RPR-MAC frame. Thereafter, the node 900-4 removes the RPR-MAC overhead from the RPR-MAC frame to convert the frame into a U-MAC frame. Then, the node 900-4 transfers the U-MAC frame to a terminal or an apparatus (not shown) connected to the node 900-4 outside the ring 501-*a*.

Similarly to the node 900-4, the nodes 900-3, 700-2, 700-1 and 900-2 take in the RPR-MAC frame, as well as sending a copy of the RPR-MAC frame to the outer ring 501-*a*-outer. As a result, the RPR-MAC frame will be transferred within the ring along the transfer path 650 shown in FIG. 6. Also similarly to the node 900-4, the nodes 900-3, 700-2, 700-1 and 900-2 register a corresponding relationship between a transmission source RPR-MAC address ("900-1" in this example) and a transmission source U-MAC address (the address of the terminal 510 in this example) at their own learning data bases. Then, the nodes remove the RPR-MAC overhead of the RPR-MAC frame to transfer the U-MAC frame to a terminal or an apparatus (not shown) outside the ring 501-*a*.

In a case of a ring structure, a broadcast-transmitted RPR-MAC frame makes a round of the ring to return to a node as a transmission source. Each of the nodes 900-1~900-8 and 700-1~700-4 refers to a transmission source RPR-MAC address of the received RPR-MAC frame and when the address coincides with its own node RPR-MAC address, abandons the RPR-MAC frame. Accordingly, the RPR-MAC frame fails to loop.

The node 700-2 removes the RPR-MAC overhead of the RPR-MAC frame taken to convert the RPR-MAC frame into a U-MAC frame. Then, the node 700-2 sends the U-MAC frame to the inter-link 506. Since the node 700-2 has the port connected to the inter-link 506 set at the forwarding state (see Step S632 shown in FIG. 5), the node is allowed to send the U-MAC frame to the inter-link 506. The U-MAC frame will be transferred to the node 700-4 along the transfer path 641 shown in FIG. 6.

The node 700-4 having received the U-MAC frame through the inter-link 506 searches an RPR-MAC address corresponding to the transmission destination U-MAC address in the U-MAC frame by using its own learning data base. At this time, since the learning contents of the learning data base are flushed, the search fails. When the search of the RPR-MAC address fails, the node 700-4 adds, to the U-MAC frame, an RPR-MAC overhead with the transmission destination RPR-MAC address as a broadcast address and its own RPR-MAC address "700-4" as a transmission source RPR-MAC address. The node 700-4 converts the U-MAC frame into an RPR-MAC frame by adding the RPR-MAC overhead. The node 700-4 broadcast-transmits the RPR-MAC frame. At this time, the node 700-4 may send the RPR-MAC frame to either of the inner ring and the outer ring. The node may send the frame to both the inner ring and the outer ring. Shown in FIG. 6 is a case where the node 700-4 sends the RPR-MAC frame to the outer ring 502-*b*-outer to transfer the frame by using the transfer path 651.

Upon receiving the RPR-MAC frame (the RPR-MAC frame with a broadcast address as a transmission destination), the node 900-8 takes in the RPR-MAC frame, as well as sending a copy of the RPR-MAC frame to the outer ring 502-*b*-outer. The node 900-8 also registers, at its own learning data base, a correspondence relationship between a transmission source RPR-MAC address in the taken RPR-MAC frame ("700-4" in this example) and a transmission source U-MAC address of a U-MAC frame accommodated in the RPR-MAC frame (the address of the terminal 510 in this example). Thereafter, the node 900-8 removes the RPR-MAC overhead from the RPR-MAC frame to convert the frame into a U-MAC frame. Then, the node 900-8 transfers the U-MAC frame to a terminal or an apparatus (not shown) connected to the node 900-8 outside the ring 501-*b*.

Similarly to the node 900-8, the nodes 900-7, 900-6, 900-5 and 700-3 take in the RPR-MAC frame, as well as sending a copy of the RPR-MAC frame to the outer ring 502-*b*-outer. As a result, the RPR-MAC frame will be transferred along the transfer path 651 in the ring shown in FIG. 6. Similarly to the node 900-8, each of the nodes 900-7, 900-6, 900-5 and 700-3 registers, at its own learning data base, a correspondence relationship between a transmission source RPR-MAC address ("700-4" in this example) and a transmission source U-MAC address (the address of the terminal 510 in this example). Then, the node removes the RPR-MAC overhead of the RPR-MAC frame to transfer a U-MAC frame to a terminal or an apparatus (not shown) outside the ring 501-*b*.

In addition, the node 700-4, when an RPR-MAC frame broadcast-transmitted by itself makes a round of the ring to be transferred to the node 700-4 itself, abandons the RPR-MAC frame.

The node 900-7 removes the RPR-MAC overhead of the taken RPR-MAC frame to convert the RPR-MAC frame into a U-MAC frame. Then, the node 900-7 transfers the U-MAC frame to the terminal 511. The U-MAC frame will be transferred from the node 900-7 to the terminal 511 along the transfer path 642 shown in FIG. 6.

Thus, even when the inter-link 505 develops a fault, frame transfer from the terminal 510 to the terminal 511 is enabled. Next, frame transfer from the terminal 511 to the terminal 510 will be described.

Figure 7:
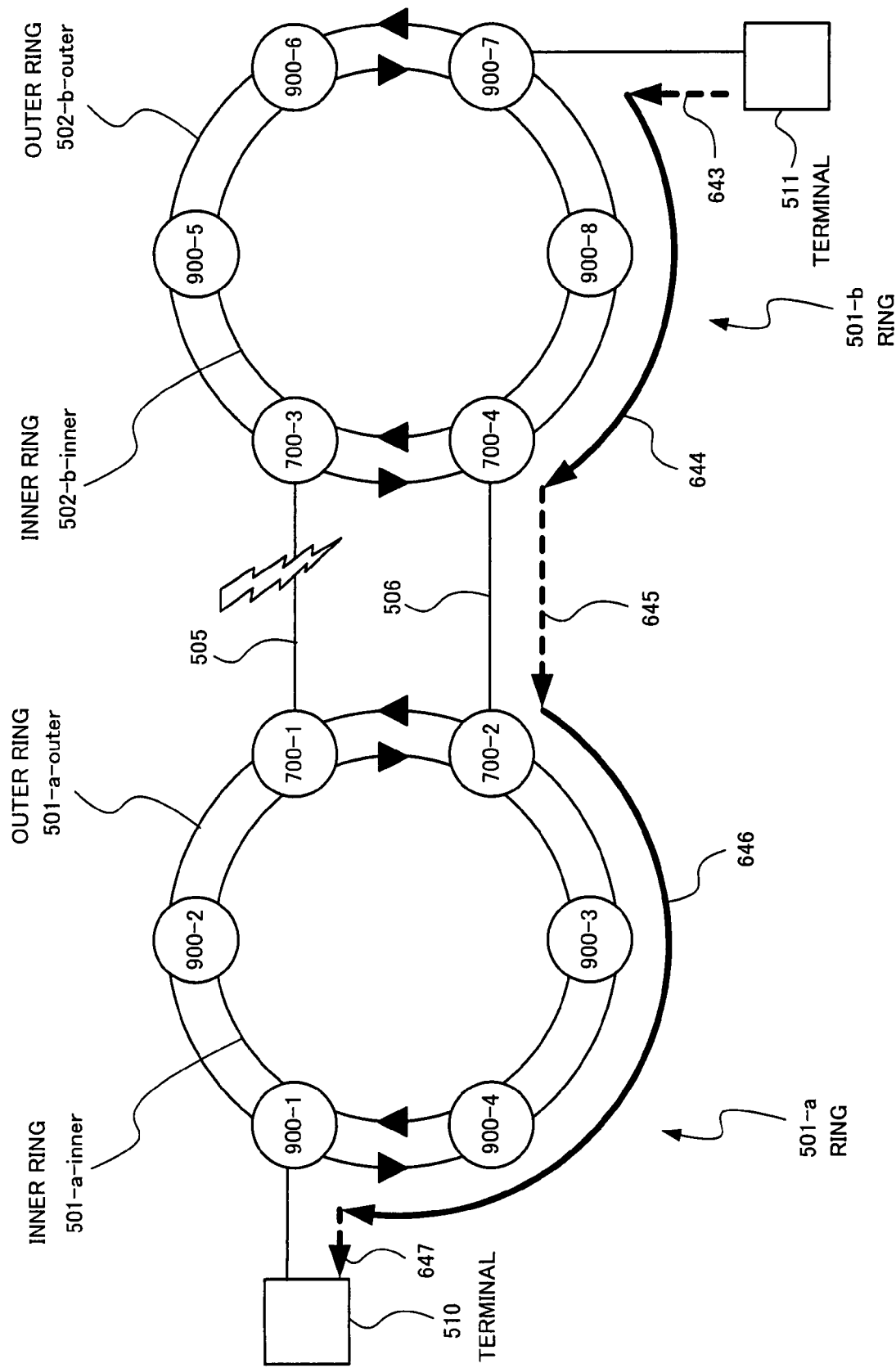
FIG. 7 is a diagram for use in explaining a situation where after broadcast-transmission, a frame is transferred from one terminal to another.

FIG. 7 is a diagram for use in explaining a situation where a frame is transferred from the terminal 511 to the terminal 510. In FIG. 7, paths 643, 645 and 647 indicated by dotted lines are transfer paths for a U-MAC frame. In FIG. 7, paths 644 and 646 indicated by solid lines are transfer paths for an RPR-MAC frame.

In the course of transfer of a frame from the terminal 510 to the terminal 511 shown in FIG. 6, each node in the ring 501-*b* learns a correspondence relationship between an address of the terminal 510 (U-MAC address) and the RPR-MAC address "700-4" into its own learning data base. Similarly, each node in the ring 501-*a* learns a correspondence relationship between the address of the terminal 510 and the RPR-MAC address "900-1" into its own learning data base. Accordingly, unicast-communication from the terminal 511 to the terminal 510 is enabled.

More specifically, upon receiving a U-MAC frame with a transmission destination U-MAC address as the address of the terminal 510 from the terminal 511, the node 900-7 is allowed to specify the transmission destination RPR-MAC address as "700-4" by referring to the learning data base. Then, the node 900-7 adds, to the U-MAC frame, an RPR-MAC overhead with the transmission destination RPR-MAC address as "700-4" and the transmission source RPR-MAC address as "900-7" to transfer the obtained frame within the ring 501-*b*. As a result, the RPR-MAC frame will be transferred from the node 900-7 to the node 700-4 along the transfer path 644. Upon receiving the RPR-MAC frame, each of the nodes 900-8 and 700-4 on the transfer path 644 registers, at its own learning data base, a correspondence relationship between the transmission source RPR-MAC address ("900-7" in this example) and a transmission source U-MAC address of the U-MAC frame accommodated in the RPR-MAC frame (the address of the terminal 511 in this example).

Upon receiving the RPR-MAC frame, the node 700-4, because the transmission destination RPR-MAC address of the frame coincides with its own RPR-MAC address, takes in the RPR-MAC frame. Then, the node removes the RPR-MAC overhead from the taken RPR-MAC frame to convert the RPR-MAC frame into a U-MAC frame. The node 700-4 sends the U-MAC frame to the inter-link 506. The U-MAC frame will be transferred to the node 700-2 along the transfer path 644 shown in FIG. 7.

The node 700-2 having received the U-MAC frame through the inter-link 506 refers to an RPR-MAC address corresponding to a transmission destination U-MAC address of the frame (the address of the terminal 510). At the learning data base, as an RPR-MAC address corresponding to the address of the terminal 510, "900-1" is registered. Accordingly, the node 700-2 adds, to the U-MAC frame, an RPR-MAC overhead with a transmission destination RPR-MAC address as "900-1" and a transmission source RPR-MAC address as "700-2" to transfer the obtained frame within the ring 501-*a*. As a result, the RPR-MAC frame will be transferred from the node 700-2 to the node 900-1 along the transfer path 646. Upon receiving an RPR-MAC frame, each of the nodes 900-3, 900-4 and 900-1 on the transfer path 646 registers, at its learning data base, a correspondence relationship between a transmission source RPR-MAC address ("700-2" in this example) and a transmission source U-MAC address of a U-MAC frame accommodated in the RPR-MAC frame (the address of the terminal 511 in this example).

As a result, the nodes 900-1, 900-4 and 900-3 learn a correspondence relationship between the address of the terminal 511 and the RPR-MAC address "700-2" into the learning data base. In addition, the nodes 700-4 and 900-8 learn a correspondence relationship between the address of the terminal 511 and the RPR-MAC address "900-7" into the learning data base. Accordingly, unicast-communication from the terminal 510 to the terminal 511 is enabled.

For realizing such recovery operation at the occurrence of a failure as described above, it is necessary to detect a failure on an inter-link. Failure detection of the inter-link 505 may be realized, for example, by direct detection of a failure on a physical link by each node between the nodes 700-1 and 700-3 and between the nodes 700-2 and 700-4 at the opposite ends of the inter-links 505 and 506, respectively.

Inter-link failure may be detected by non-arrival of a KeepAlive signal which is periodically transmitted by a contact node to a contact node of other ring through an inter-link. KeepAlive signal is, for example, a signal having the same format as that of a U-MAC frame. When a KeepAlive signal is generated as a signal having the same format as that of a U-MAC frame, the KeepAlive signal is transmitted or received as a U-MAC frame for control. There are two manners of notifying each node in a ring of inter-link failure occurrence by using a KeepAlive signal. In the first manner, a contact node itself determines that a failure occurs on an inter-link to which the contact node is connected when receiving no KeepAlive signal for a fixed time period. Then, when determining that a failure occurs, the node broadcast-transmits an inter-link failure notification RPR-MAC frame indicative of failure detection within the ring. In the inter-link failure notification RPR-MAC frame, information of a contact node which has detected occurrence of an inter-link failure is to be included. Assume, for example, that the contact node 700-1 fails to receive a KeepAlive signal from the contact node 700-3 for a fixed time period. Then, the contact node 700-1 only needs to broadcast-transfer, within the ring 501-*a*, an inter-link failure notification RPR-MAC frame which indicates that the contact node 700-1 detects an inter-link failure. In the first manner, a KeepAlive signal transmitted/received through an inter-link is terminated at each contact node. In addition, the inter-link failure notification RPR-MAC frame transferred in the ring notifies failure occurrence on the inter-link.

In the second manner, without terminating a KeepAlive signal, a contact node transfers the same with an RPR-MAC overhead added within a ring. More specifically, the contact node may convert a KeepAlive signal into an inter-link failure notification RPR-MAC frame by adding an RPR-MAC overhead to a KeepAlive signal and broadcast-transfer the inter-link failure notification RPR-MAC frame within the ring. In this case, the inter-link failure notification RPR-MAC frame includes a KeepAlive signal, which indicates that no failure occurs on the inter-link. In the second manner, upon no transfer of an inter-link failure notification RPR-MAC frame for a fixed time, each node in the ring detects occurrence of a failure on an inter-link connected to a transmission source node of the inter-link failure notification RPR-MAC frame including a KeepAlive signal. In the first manner, a contact node detects an inter-link failure to notify failure detection to each node in the ring to which the contact node belongs, while in the second manner, each node in the ring by itself detects occurrence of an inter-link failure.

The contact node may set a transmission destination RPR-MAC address of an inter-link failure notification RPR-MAC frame to be a reserved RPR-MAC address (controlling identifier). More specifically, a transmission destination RPR-MAC address can be a controlling identifier indicating that a kind of RPR-MAC frame is an inter-link failure notification RPR-MAC frame which is to be broadcast-transferred.

In addition, the inter-link failure notification RPR-MAC frame will be abandoned after making a round of the ring to return to a transmission source node. Assume, for example, that the contact node 700-1 transmits an inter-link failure notification RPR-MAC frame, so that the inter-link failure notification RPR-MAC frame makes a round of the ring to return to the contact node 700-1. Then, the contact node, since a transmission source RPR-MAC address of the inter-link failure notification RPR-MAC frame coincides with its own RPR-MAC address, abandons the inter-link failure notification RPR-MAC frame.

Figure 8:
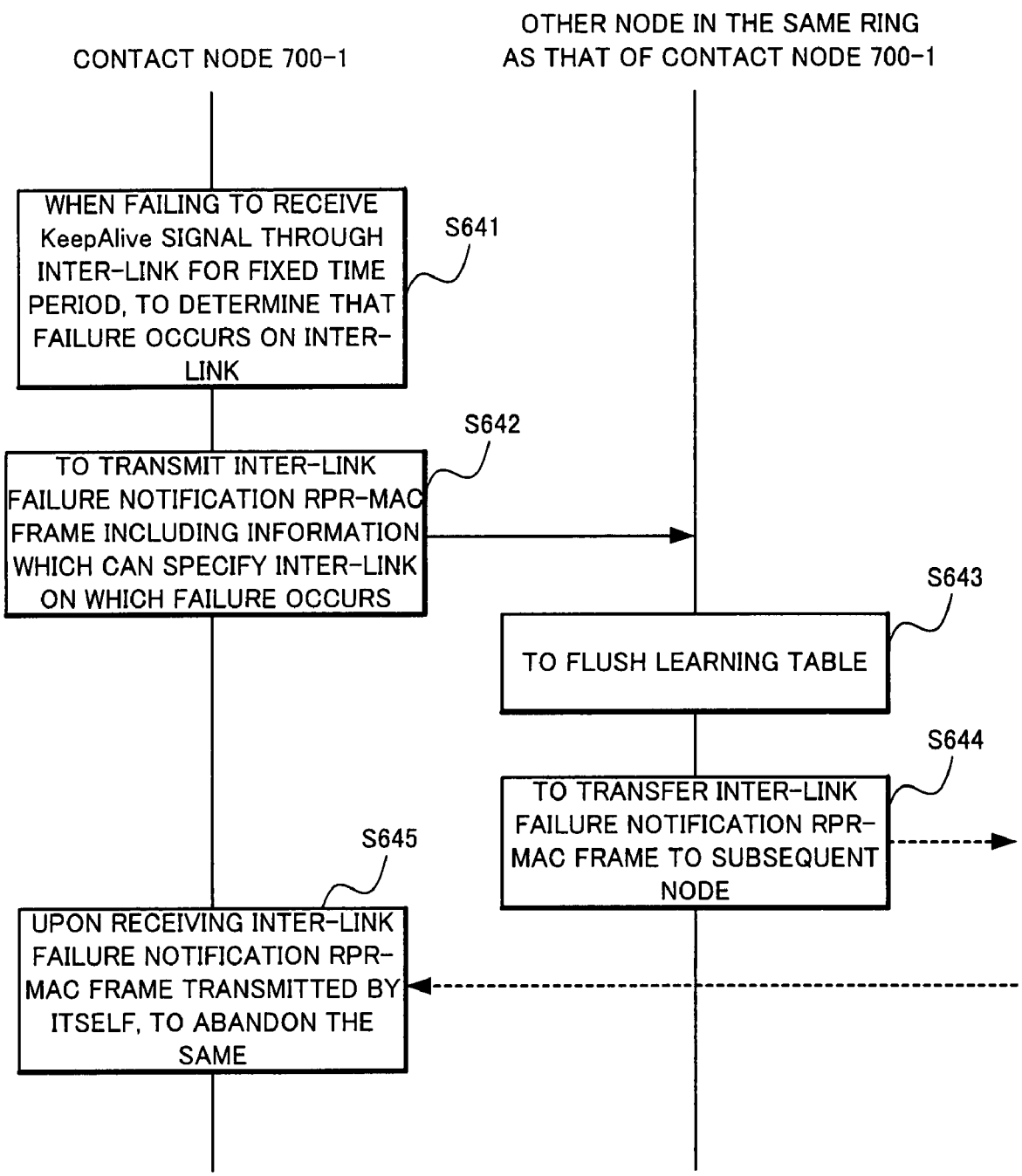
FIG. 8 is a flow chart showing a first manner of notifying each node in the ring of inter-link failure occurrence by using a KeepAlive signal.

FIG. 8 is a flow chart showing the first manner of notifying each node in the ring of occurrence of an inter-link failure by using a KeepAlive signal. Although description will be here made of FIG. 8 mainly with respect to operation of the contact node 700-1, this is also the case with operation of the contact node 700-3 and the like.

The contact node 700-1, when failing to receive a KeepAlive signal from the contact node 700-3 of other ring through the inter-link 505 for a fixed time period, determines that a failure occurs on the inter-link 505 (Step S641). Then, the contact node 700 sends, within the ring 501-*a*, an inter-link failure notification RPR-MAC frame including information which can specify an inter-link on which a failure occurs (e.g. an RPR-MAC address of the node itself which has detected the failure) (Step S642).

Other node in the same ring as that of the contact node 700-1, upon receiving the inter-link failure notification RPR-MAC frame, flushes learning contents of the learning data base (Step S643). Then, the node sends the inter-link failure notification RPR-MAC frame to a subsequent node (Step S644). The contact node 700-2 connected to the spare inter-link 506 also executes processing of brining a port of the node itself connected to the inter-link 506 into the forwarding state after Step S643 (or before).

The contact node 700-1, upon receiving an inter-link failure notification RPR-MAC frame transmitted by itself, abandons the inter-link failure notification RPR-MAC frame (Step S645).

Figure 9:
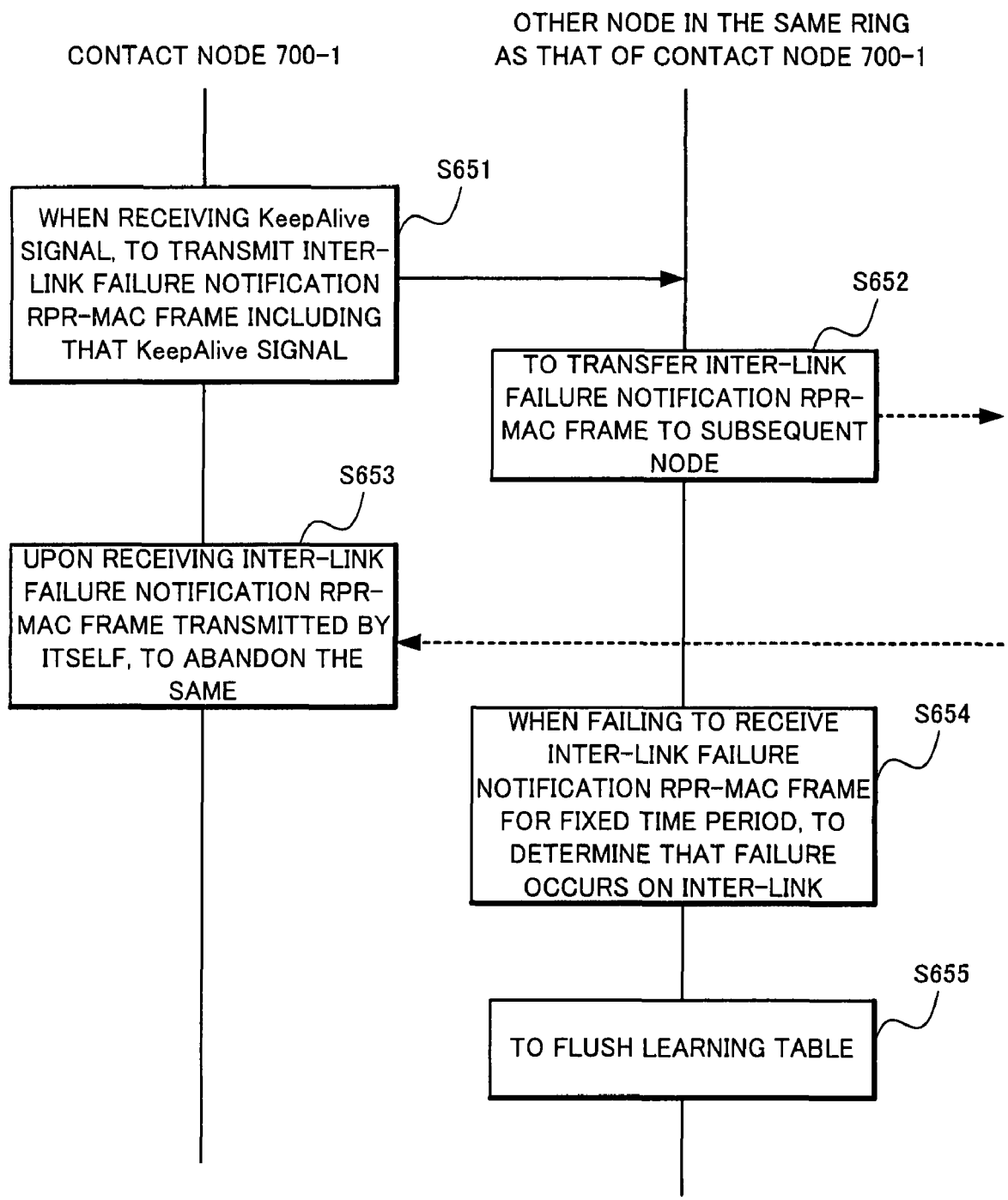
FIG. 9 is a flow chart showing a second manner of notifying each node in the ring of inter-link failure occurrence by using a KeepAlive signal.

FIG. 9 is a flow chart showing the second manner of notifying each node in the ring of occurrence of an inter-link failure by using a KeepAlive signal. Although description will be made of FIG. 9 mainly with respect to operation of the contact node 700-1, this is also the case with operation of the contact node 700-3 and the like.

Upon receiving a KeepAlive signal from the contact node 700-3 of other ring through the inter-link 505, the contact node 700-1 sends an inter-link failure notification RPR-MAC frame including the KeepAlive signal within the ring 501-*a* (Step 651). More specifically, without terminating a KeepAlive signal, the contact node 700-1 converts the signal into an inter-link failure notification RPR-MAC frame and sends the frame within the ring. The inter-link failure notification RPR-MAC frame indicates that the inter-link 505 is in a normal state.

Upon receiving the inter-link failure notification RPR-MAC frame, other node in the same ring as that of the contact node 700-1 determines that no failure occurs on the inter-link 505 to transfer the frame to a subsequent node (Step S652). The contact node 700-1, upon receiving the inter-link failure notification RPR-MAC frame transmitted by itself, abandons the inter-link failure notification RPR-MAC frame (Step S653).

In addition, when failing to receive an inter-link failure notification RPR-MAC frame including a KeepAlive signal for a fixed time period, other node in the same ring as that of the contact node 700-1 determines that the inter-link 505 develops a fault (Step S654) to flush the learning contents of the learning data base (Step S655). The contact node 700-2 connected to the spare inter-link 506 also executes processing of brining a port of the node itself connected to the inter-link 506 into the forwarding state after step S655 (or before).

Although not shown in FIG. 9, the contact node 700-1 determines that the inter-link 505 develops a fault similarly to the first manner (similarly to Step S641 shown in FIG. 8).

For transmitting an inter-link failure notification RPR-MAC frame for notifying each node in the ring of failure occurrence on the inter-link, the inter-link failure notification RPR-MAC frame may be broadcast-transmitted. Alternatively, the inter-link failure notification RPR-MAC frame may be transmitted as an RPR-MAC frame terminated at an adjacent node. Then, when receiving an inter-link failure notification RPR-MAC frame to terminate the inter-link failure notification RPR-MAC frame, each node may generate an inter-link failure notification RPR-MAC frame to be terminated at a subsequent node and transmit the frame to the subsequent node. Thus, after once terminating a frame at each node, transmitting the frame to a subsequent node is called hop-by-hop processing. In a case of broadcast-transmission, an inter-link failure notification RPR-MAC frame is transferred within the ring without being terminated at each node.

As described in the foregoing, the ring network system according to the present invention flushes the learning contents of the learning data base when an inter-link failure occurs. Flushing of the learning contents of the learning data base is executed only when the living inter-link 505 develops a fault.

Also as already described, when flushing the learning contents of the learning data base, all the learning contents may be flushed. Alternatively, out of the learning contents of the learning data base, only information about an RPR-MAC address of a node having detected a failure of an inter-link and a U-MAC address correlated with the RPR-MAC address may be selectively flushed from among the learning contents of the learning data base. When the learning contents are selectively flushed, for transmitting a U-MAC frame until a desired terminal without passing through the inter-link, such broadcast communication as shown in FIG. 6 is unnecessary.

Assume, for example, that the inter-link 505 develops a fault to selectively flush only the RPR-MAC address "700-1" and a U-MAC address corresponding to "700-1". Assume that thereafter, the U-MAC frame is transmitted from the terminal 510 to a terminal (not shown) connected to the node 900-4. At this time, the node 900-1 leaves a correspondence relationship between an address of a terminal as a transmission destination of the U-MAC frame and the RPR-MAC address "900-4" in the learning data base. It is accordingly possible to search the RPR-MAC address "900-4" from the transmission destination U-MAC address, so that it is only necessary to transmit an RPR-MAC frame converted from the U-MAC frame to the node 900-4. As a result, such broadcast-transmission as shown in FIG. 6 is unnecessary.

In addition, a KeepAlive signal sent from the nodes 700-3 and 700-4 connected to the inter-links 505 and 506 may be notified together with ring information to which a node as a KeepAlive signal transmission source belongs (identification information of a ring; ring identification information of the ring 501-b to which the node 700-3 belongs in this example). Thus, assume that the KeepAlive signal and identification information of the ring to which the node of the KeepAlive signal transmission source belongs are transmitted to a contact node of other ring through the inter-link and similarly to the above-described second manner, a contact node having received the KeepAlive signal transfers an inter-link failure notification RPR-MAC frame including the KeepAlive signal to each node in the ring. In this case, upon detecting a failure of a living inter-link, each node in the ring is allowed to rewrite the contents of the learning data base so as to transfer a frame between rings through a spare inter-link connecting a ring specified by ring identification information and a ring to which the node itself belongs. For example, each node of the ring 501-a changes the RPR-MAC address "700-1" in the learning data base to the RPR-MAC address "700-2" of a contact node connected to a spare inter-link specified by ring identification information. As a result, without executing such broadcast transmission as shown in FIG. 6, a U-MAC frame can be transferred to a desired terminal by using the spare inter-link 506.

Each node in each ring transmits/receives a failure notification RPR-MAC frame regarding failure occurrence on a link between nodes in the ring separately from an inter-link failure notification RPR-MAC frame related to failure occurrence on a inter-link. [Inter-link failure notification RPR-MAC frame] and [failure notification RPR-MAC frame] are distinguished as different RPR-MAC frames. In a case where no failure occurs on a link between adjacent nodes, each node in the ring transmits/receives a failure notification RPR-MAC frame not including failure detection node information (information of a node which has detected a failure on a link) to/from an adjacent node. Reception of a failure notification RPR-MAC frame not including the failure detection node information represents that no failure occurs on a link between adjacent nodes. Then, each node in the ring, when failing to receive a failure notification RPR-MAC frame not including failure detection node information from an adjacent node for a fixed time, determines that a failure occurs on a link with the adjacent node. Then, the node transfers, within the ring, a failure notification RPR-MAC frame including its own information (e.g. its own RPR-MAC address) as link failure detection node information.

A failure notification RPR-MAC frame not including failure detection node information is transmitted to an adjacent node and terminated at the adjacent node. On the other hand, a failure notification RPR-MAC frame including failure detection node information which is transmitted when a failure is actually detected is broadcast-transmitted to make a round of the ring and abandoned when returned to a node as a transmission source of the failure notification RPR-MAC frame. As a result, it is possible to notify each node in the ring of information of a node having detected a failure on a link in the ring.

Next, a structure of a node to be applied to a ring network system will be described. In the following, description will be made of a node structure separately with respect to a contact node and other node than a contact node.

Figure 10:
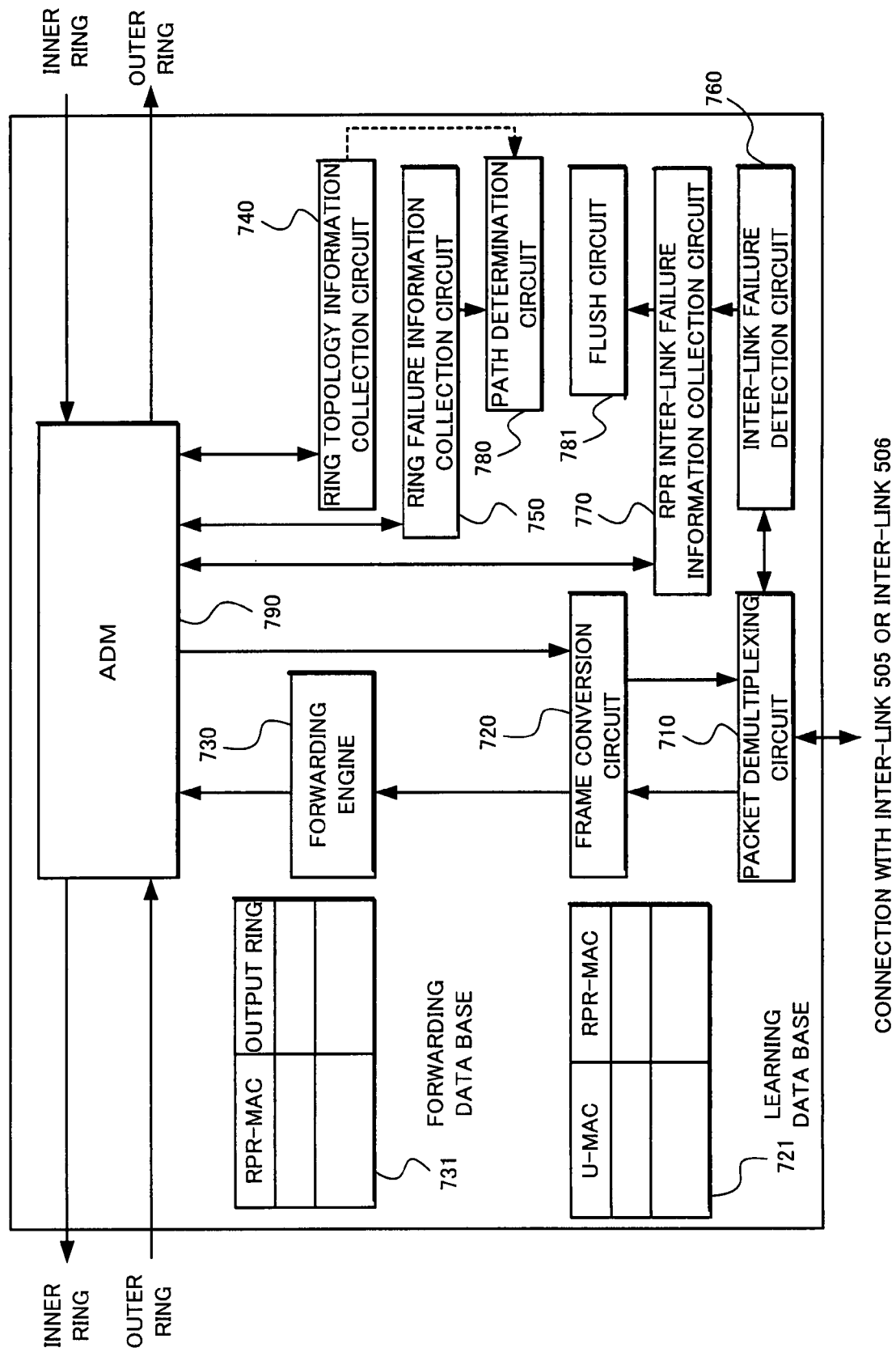
FIG. 10 is a block diagram showing an example of a structure of a contact node applied to the first exemplary embodiment.

FIG. 10 is a block diagram showing an example of a structure of the contact nodes 700-1~700-4 (these contact nodes will be denoted as a contact node 700 in the lump in some cases) to be applied to the ring network system according to the present invention. Each contact node 700 comprises a packet demultiplexing circuit 710, a frame conversion circuit 720, a forwarding engine 730, a ring topology information collection circuit 740, a ring failure information collection circuit 750, an inter-link failure detection circuit 760, an RPR inter-link failure information collection circuit 770, a path determination circuit 780, a flash circuit 781 and an ADM (Add-Drop Multiplexer) 790. The contact node 700 further comprises a learning data base 721 for storing a correspondence relationship between a U-MAC address and an RPR-MAC address, and comprises a forwarding data base 731 for storing a correspondence relationship between an RPR-MAC address and an output ring (information indicative of either or both of an inter ring and an outer ring).

The learning data base 721 also stores a correspondence relationship between a reserved U-MAC address included in a U-MAC frame for control (identifier for control included in a U-MAC frame for control) and a reserved RPR-MAC address (identifier for control which will be a transmission destination RPR-MAC address of an RPR-MAC frame). It is accordingly possible to search the learning data base 721, for example, for an identifier for control which is used at the time of adding an RPR-MAC overhead to a KeepAlive signal.

In the following, description will be made assuming that occurrence of an inter-link failure is detected by using a KeepAlive signal. The description will be made, as an example, of a case where an inter-link failure occurrence notification manner is the above-described first manner.

The packet demultiplexing circuit 710 is connected to the inter-link 505 or the inter-link 506. In a case where a port of the packet demultiplexing circuit 710 connected to the inter-link is set at the forwarding state, the packet demultiplexing circuit 710 operates as described in the following. The packet demultiplexing circuit 710 receives a U-MAC frame from the frame conversion circuit 720. The U-MAC frame is conversion of an RPR-MAC frame transferred within the ring by the frame conversion circuit 720. In addition, the packet demultiplexing circuit 710 periodically receives a KeepAlive signal from the inter-link failure detection circuit 760 (as will be described later, the inter-link failure detection circuit 760 periodically generates a KeepAlive signal and sends the same to the packet demultiplexing circuit 710). The packet demultiplexing circuit 710 multiplexes the U-MAC frame sent from the frame conversion circuit 720 and the KeepAlive signal sent from the inter-link failure detection circuit 760 to send the result to the connected inter-link.

In addition, the packet demultiplexing circuit 710, when receiving a U-MAC frame (excluding a KeepAlive signal) from a contact node of other ring through the inter-link to which the packet demultiplexing circuit 710 itself is connected, sends the U-MAC frame to the frame conversion circuit 720. The packet demultiplexing circuit 710, also when receiving a KeepAlive signal from a contact node of other ring through the inter-link, sends the KeepAlive signal to the inter-link failure detection circuit 760.

When the port of the packet demultiplexing circuit 710 connected to the inter-link is set at the blocked state, the packet demultiplexing circuit 710 operates as described in the following. The packet demultiplexing circuit 710, when receiving a U-MAC frame from the frame conversion circuit 720, abandons the U-MAC frame. When receiving a U-MAC frame (excluding a KeepAlive signal) from a contact node of other ring through the inter-link, the circuit abandons the U-MAC frame as well. Even when the port connected to the inter-link is set at the blocked state, the packet demultiplexing circuit 710 refrains from abandoning the KeepAlive signal similarly to the case of the forwarding state. More specifically, when receiving a KeepAlive signal from the inter-link failure detection circuit 760, the packet demultiplexing circuit 710 sends the KeepAlive signal to the inter-link. In addition, when receiving a KeepAlive signal from a contact node of other ring through the inter-link, the circuit sends the KeepAlive signal to the inter-link failure detection circuit 760.

The frame conversion circuit 720, in a case where the packet demultiplexing circuit 710 receives a U-MAC frame other than a KeepAlive signal from a contact node of other ring and the U-MAC frame is transferred from the packet demultiplexing circuit 710, refers to the learning data base 721 to search an RPR-MAC address corresponding to a transmission destination U-MAC address of the U-MAC frame. Then, the frame conversion circuit 720 converts the U-MAC frame into an RPR-MAC frame by adding an RPR-MAC overhead with the searched address as a transmission destination RPR-MAC address and its own node address as a transmission source RPR-MAC address. The frame conversion circuit 720, when failing to search an RPR-MAC address corresponding to a transmission destination U-MAC address of the U-MAC frame (i.e. a correspondence relationship between the U-MAC address and an RPR-MAC address is yet to be learned), converts the frame into an RPR-MAC frame with a broadcast address as a transmission destination RPR-MAC address. After converting the U-MAC frame into an RPR-MAC frame, the frame conversion circuit 720 sends the RPR-MAC frame to the forwarding engine 730.

There is a case where a control signal other than a KeepAlive signal is sent as a U-MAC frame from the packet demultiplexing circuit 710 to the frame conversion circuit 720. Also in this case, the frame conversion circuit 720 only needs to search the learning data base for a reserved RPR-MAC address (identifier for control) corresponding to a reserved U-MAC address of the U-MAC frame (an identifier for control which is included in a U-MAC frame for control) to convert the U-MAC frame into an RPR-MAC frame with the identifier for control as a transmission destination RPR-MAC address.

In addition, when the ADM 790 receives an RPR-MAC frame within the ring and the RPR-MAC frame is transferred form the ADM 790, the frame conversion circuit 720 removes the RPR-MAC overhead to convert the RPR-MAC frame into a U-MAC frame. Then, the frame conversion circuit 720 sends the U-MAC frame to the packet demultiplexing circuit 710. At this time, the frame conversion circuit 720 registers, at the learning data base 721, a correspondence relationship between a transmission source RPR-MAC address in the RPR-MAC frame transferred from the ADM 790 and a transmission source U-MAC address in a U-MAC frame accommodated in the RPR-MAC frame. When it is already registered, the circuit registers the same by overwriting.

The forwarding engine 730 determines which of the inner ring or the outer ring the RPR-MAC frame should be sent or whether the frame should be sent to both of the inner ring and the outer ring based on a transmission destination RPR-MAC address of the RPR-MAC frame transferred from the frame conversion circuit 720. At this time, the forwarding engine 730 only needs to refer to the forwarding data base 331 to refer to an output ring corresponding to the transmission destination RPR-MAC address and make determination. Then, the forwarding engine 730 transfers the RPR-MAC frame and the output ring information (information indicating whether the RPR-MAC frame should be sent to the inner ring or the outer ring or whether it should be sent to both) to the AMD 790.

The ring topology information collection circuit 740 generates a topology discovery RPR-MAC frame for comprehending a node structure in a ring to which the contact node shown in FIG. 10 itself belongs and transfers the frame to the ADM 790 together with output ring information. In addition, when the ADM 790 receives a topology discovery RPR-MAC frame within the ring and the topology discovery RPR-MAC frame is transferred from the ADM 790, the ring topology information collection circuit 740 notifies the path determination circuit 780 of ring topology information indicated by the topology discovery RPR-MAC frame. Upon receiving a topology discovery RPR-MAC frame, each frame in the ring adds information of its own node (e.g. RPR-MAC address) to the frame and transfers the obtained frame to a subsequent node. It is accordingly possible for a node as a transmission source to recognize an arrangement condition (ring topology information) of a node in the ring when a topology discovery RPR-MAC frame transmitted by a certain node makes a round of the ring to return to the transmission source node. The ring topology information collection circuit 740 extracts the ring topology information from the topology discovery RPR-MAC frame transferred from the ADM 790 and notifies the path determination circuit 780 of the information.

Next, operation of the ring failure information collection circuit 750 will be described. As is already described, each node in the ring transmits and receives a failure notification RPR-MAC frame including none of failure detection node information to and from an adjacent node when none of failure occurs on a link with the adjacent node. When the ADM 790 receives a failure notification RPR-MAC frame including none of failure detection node information within the ring and the failure notification RPR-MAC frame is transferred from the ADM 790, the ring failure information collection circuit 750 refrains from operating. More specifically, when none of failure occurs on a link with an adjacent node, while the ring failure information collection circuit 750 receives a failure notification RPR-MAC frame including none of failure detection node information, it executes no operation in response to the reception of the frame.

The ring failure information collection circuit 750, when no failure notification RPR-MAC frame including none of failure detection node information is transferred from the ADM 790 for a fixed time, determines that a failure occurs on a link with an adjacent node. Then, the ring failure information collection circuit 750 transfers information indicating that its own node detects a failure on the link with the adjacent node to the path determination circuit 780. The circuit further transfers a failure notification RPR-MAC frame including information of its own node as failure detection node information to the ADM 790 together with output ring information. In this case, the ADM 790 sends the failure notification RPR-MAC frame within the ring.

On the other hand, when the ADM 790 receives a failure notification RPR-MAC frame including failure detection node information within the ring and the failure notification RPR-MAC frame is transferred from the ADM 790, the ring failure information collection circuit 750 extracts the failure detection node information from the failure notification RPR-MAC frame. Then, the ring failure information collection circuit 750 notifies the path determination circuit 780 of the failure detection node information. Then, the ring failure information collection circuit 750 transfers the failure notification RPR-MAC frame including the failure detection node information to the ADM 790 together with output ring information. At this time, the ring failure information collection circuit 750 defines output ring information which designates a ringlet through which the failure notification RPR-MAC frame is transferred to the ADM 790 as output ring information. In a case, for example, where the failure notification RPR-MAC frame is transferred from an inner ring, output ring information which designates an inner ring is defined. As a result, the ADM 790 sends the failure notification RPR-MAC frame to the same ringlet as that through which the failure notification RPR-MAC frame is transferred. When a failure notification RPR-MAC frame including failure detection node information is received, therefore, the same frame as the failure notification RPR-MAC frame will be transferred to a subsequent node.

The inter-link failure detection circuit 760 periodically generates a KeepAlive signal (KeepAlive signal for informing other ring that no failure occurs on an inter-link). At this time, the inter-link failure detection circuit 760 generates a KeepAlive signal as a U-MAC frame with a controlling identifier of the KeepAlive signal as a transmission destination U-MAC address and its own node address as a transmission source U-MAC address. The inter-link failure detection circuit 760 transmits the generated KeepAlive signal (U-MAC frame) to the packet demultiplexing circuit 710. The KeepAlive signal is transferred to other ring by the packet demultiplexing circuit 710. The inter-link failure detection circuit 760 may include an identifier of a ring to which its own node belongs and an identifier for unitarily deciding its own node in the KeepAlive signal. When an identifier is assigned to an inter-link to which its own node is connected, the inter-link identifier may be included in the KeepAlive signal.

When the packet demultiplexing circuit 710 receives a KeepAlive signal from other ring and the KeepAlive signal is transferred from the packet demultiplexing circuit 710, the inter-link failure detection circuit 760 determines that no failure occurs on the inter-link to which its own node is connected. Then, the inter-link failure detection circuit 760, when no KeepAlive signal is transferred from the packet demultiplexing circuit 710 for a fixed time period, determines that a failure occurs on the inter-link to which its own node is connected to notify the RPR inter-link failure information collection circuit 770 of occurrence of a failure on the inter-link.

Upon receiving a notification of a failure occurring on a inter-link from the inter-link failure detection circuit 760, the RPR inter-link failure information collection circuit 770 generates an inter-link failure notification RPR-MAC frame including failure information (information which can specify an inter-link on which a failure occurs) and transfers the frame to the ADM 790 together with output ring information. As a result, the inter-link failure notification RPR-MAC frame is sent within the ring from the ADM 790. The RPR inter-link failure information collection circuit 770 can execute broadcast-transmission such that the inter-link failure notification RPR-MAC frame makes a round of the ring to return to its own node. In this case, a transmission destination RPR-MAC address of the inter-link failure notification RPR-MAC frame is set to be a controlling identifier according to broadcast-transmission. In addition, the RPR inter-link failure information collection circuit 770 can define a transmission destination RPR-MAC address such that the inter-link failure notification RPR-MAC frame is sequentially transferred to each node by hop-by-hop processing. The RPR inter-link failure information collection circuit 770 also notifies the flash circuit 781 of information that a failure occurs on the inter-link to which its own node is connected. The flash circuit 781 flushes learning contents of the learning data base 721 in response to the notification.

There is also a case where to the contact node shown in FIG. 10, an inter-link failure notification RPR-MAC frame sent by other contact node is transferred. In this case, first, the ADM 790 receives an inter-link failure notification RPR-MAC frame sent by other contact node. Then, the unit transfers the inter-link failure notification RPR-MAC frame to the RPR inter-link failure information collection circuit 770. In this case, the RPR inter-link failure information collection circuit 770 notifies the flash circuit 781 of failure information (information which can specify an inter-link developing a fault) included in the inter-link failure notification RPR-MAC frame.

In a case where an inter-link failure notification RPR-MAC frame is set to be broadcast-transmitted, the ADM 790 only needs to transfer a copy of a received inter-link failure notification RPR-MAC frame to a subsequent node without processing the same.

On the other hand, in a case where an inter-link failure notification RPR-MAC frame is set to be sequentially transferred to each node by hop-by-hop processing, the RPR inter-link failure information collection circuit 770 generates an inter-link failure notification RPR-MAC frame to be terminated at a subsequent node which is an inter-link failure notification RPR-MAC frame including failure information included in the inter-link failure notification RPR-MAC frame received from the ADM 790 and transferring the frame to the ADM 790 together with output ring information. At this time, as output ring information, the RPR inter-link failure information collection circuit 770 defines output ring information which designates a ringlet through which the inter-link failure notification RPR-MAC frame is transferred to the ADM 790. In a case, for example, where an inter-link failure notification RPR-MAC frame is transferred from an inner ring, output ring information which designates the inner ring is defined. As a result, the ADM 790 sends the inter-link failure notification RPR-MAC frame to the same ringlet as the ringlet through which the inter-link failure notification RPR-MAC frame is transferred.

The path determination circuit 780 determines an output ring corresponding to a transmission destination RPR-MAC address based on ring topology information notified by the ring topology information collection circuit 740 and information notified by the ring failure information collection circuit 750 (failure detection node information extracted from the failure notification RPR-MAC frame) to register the ring at the forwarding data base 731. When a failure occurs in the ring, the path determination circuit 780 changes an output ring which is to pass the failure occurrence position to an output ring which fails to pass the failure occurrence position.

Upon receiving information notified by the RPR inter-link failure information collection circuit 770 (information that a failure occurs on an inter-link to which its own node is connected or failure information included in the inter-link failure notification RPR-MAC frame), the flash circuit 781 flushes learning contents registered at the learning data base 721. At this time, the flash circuit 781 may flush all the learning contents or selectively a part of the learning contents. When selectively flushing a part of the learning contents, the circuit flushes an entry including an RPR-MAC address of a node specified by the information which is notified by the RPR inter-link failure information collection circuit 770.

Upon receiving information that a failure occurs on an inter-link to which its own node is connected, the flash circuit 781 brings a port of the packet demultiplexing circuit 710 connected to the inter-link into the blocked state. Upon receiving information that other contact node detects failure occurrence on the living inter-link 505, the flash circuit 781 brings the port of the packet demultiplexing circuit 710 connected to the inter-link into the forwarding state.

The ADM 790 sends various kinds of RPR-MAC frames transferred from the forwarding engine 730, the ring topology information collection circuit 740, the ring failure information collection circuit 750 and the RPR inter-link failure information collection circuit 770 to the inner ring or the outer ring, or to both of them. The ADM 790 determines whether the RPR-MAC frame should be sent to the inner ring or the outer ring, or to both of them based on output ring information transferred together with the RPR-MAC frame.

In addition, when receiving various kinds of RPR-MAC frames from the inner ring or the outer ring, the ADM 790 refers to a transmission destination RPR-MAC address of the RPR-MAC frame. Then, based on the transmission destination RPR-MAC address, the unit determines whether to drop (take in from the ring) the RPR-MAC frame or not. As to an RPR-MAC frame not to be dropped, the ADM 790 sends the frame to a subsequent node without processing. On the other hand, when determining to drop a frame, the ADM 790 transfers a received RPR-MAC frame to the frame conversion circuit 720, the ring topology information collection circuit 740, the ring failure information collection circuit 750 or the RPR inter-link failure information collection circuit 770. To which circuit transfer is made depends on a kind of RPR-MAC frame. When a received RPR-MAC frame is a topology discovery RPR-MAC frame, for example, the unit transfers the frame to the ring topology information collection circuit 740. When the frame is a failure notification RPR-MAC frame, the unit transfers the frame to the ring failure information collection circuit 750. When the frame is an inter-link failure notification RPR-MAC frame, the unit transfers it to the RPR inter-link failure information collection circuit 770. When a transmission destination RPR-MAC address is set to be an RPR-MAC address of its own node, the unit transfers the frame to the frame conversion circuit 720.

Figure 11:
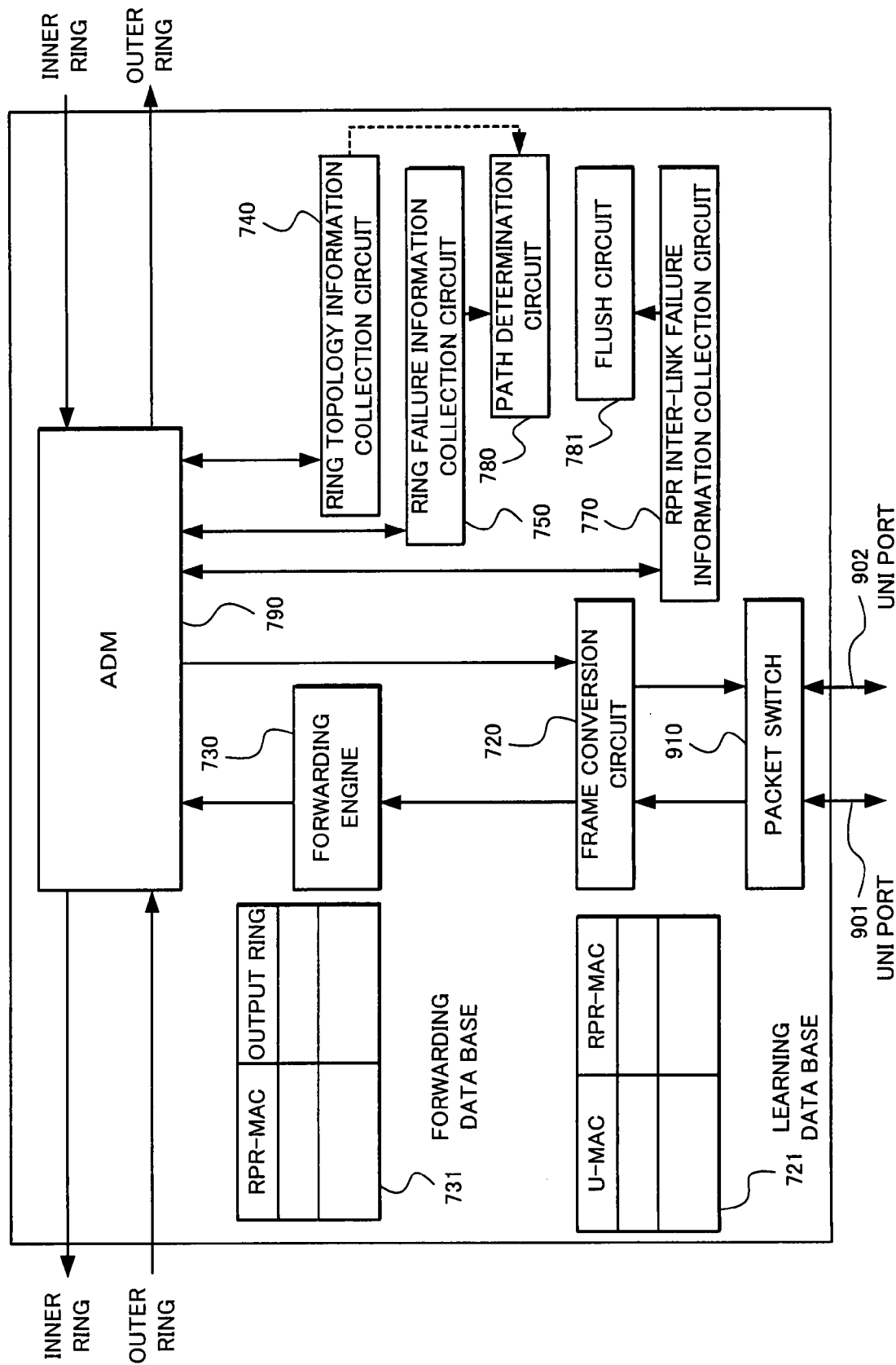
FIG. 11 is a block diagram showing an example of a structure of other node than a contact node applied to the first exemplary embodiment.

FIG. 11 is a block diagram showing an example of a structure of each of nodes 900-1~900-8 (these nodes will be denoted as a node 900 in the lump in some cases) other than a contact node which are to be applied to the ring network system according to the present invention. The same components as those of the contact node 700 are given the same reference numerals as those of FIG. 10 to omit their description. Each node 900 comprises a packet switch 910, the frame conversion circuit 720, the forwarding engine 730, the ring topology information collection circuit 740, the ring failure information collection circuit 750, the RPR inter-link failure information collection circuit 770, the path determination circuit 780, the flash circuit 781 and the ADM 790. The node 900 further comprises the learning data base 721 and the forwarding data base 731.

More specifically, the node 900 comprises the packet switch 910 in place of the packet demultiplexing circuit 710 and eliminates the need of the inter-link failure detection circuit 760.

Packet switch 910, which is a UNI (User Network Interface), transmits and receives a U-MAC frame to/from a terminal through UNI ports 901 and 902. Upon receiving a U-MAC frame through the respective UNI ports 901 and 902, the packet switch 910 concentrates U-MAC frames from the UNI ports 901 and 902 and transfers the frames to the frame conversion circuit 720. When a U-MAC frame is transferred from the frame conversion circuit 720, the packet switch 910 outputs the U-MAC frame through an appropriate UNI port (UNI port connected to a terminal as a transmission destination of the U-MAC frame).

The frame conversion circuit 720 of the node 900 transmits and receives a U-MAC frame to/from not the packet demultiplexing circuit 710 but the packet switch 910. The reminder is the same as that of the frame conversion circuit of the contact node 700 (see FIG. 10).

The RPR inter-link failure information collection circuit 770 of the node 900 operates in the same manner as that of the RPR inter-link failure information collection circuit (see FIG. 10) of the contact node 700. The node 900 fails to comprise such inter-link failure detection circuit 760 as shown in FIG. 10. Accordingly, the node refrains from executing operation of receiving a notification of failure occurrence on the inter-link and responsively generating an inter-link failure notification RPR-MAC frame including failure information to transfer the frame to the ADM 790. Except for this point, operation of the RPR inter-link failure information collection circuit 770 of the node 900 is the same as the operation of the RPR inter-link failure information collection circuit of the contact node 700.

Using other node than the contact node shown in FIG. 10 and the contact node shown in FIG. 11 realizes the already described operation of the ring network system.

With reference to FIG. 10 and FIG. 11, the description has been made with respect to a case of detecting occurrence of an inter-link failure by using a KeepAlive signal to notify inter-link failure occurrence by the above-described first manner as an example. Inter-link failure occurrence may be notified by the above-described second manner. More specifically, without terminating a KeepAlive signal, the contact node may transfer the same with an RPR-MAC overhead added within the ring. In the following, operation executed in this case will be described. While structure of each node is the same as those shown in FIG. 10 and FIG. 11, operation of a part of the circuits differs from that in a case of the first manner.

Operation of the packet demultiplexing circuit 710 of the contact node 700 which is executed when receiving a U-MAC frame other than a KeepAlive signal through an inter-link is the same as that already described. The packet demultiplexing circuit 710 of the contact node 700, when receiving a KeepAlive signal through the inter-link, outputs the KeepAlive signal to both the inter-link failure detection circuit 760 and the frame conversion circuit 720 in the second manner.

Upon receiving the KeepAlive signal from the packet demultiplexing circuit 710, the frame conversion circuit 720 generates an inter-link failure notification RPR-MAC frame as encapsulation of the KeepAlive signal by adding an RPR-MAC overhead to the KeepAlive signal. At this time, the frame conversion circuit 720 sets a transmission destination RPR-MAC address reserved in advance (controlling identifier) for a KeepAlive signal. Set, for example, a transmission destination RPR-MAC address to be a controlling identifier indicating that a kind of RPR-MAC frame is an inter-link failure notification RPR-MAC frame which is to be broadcast-transferred. Alternatively, a transmission destination RPR-MAC address may be defined such that an inter-link failure notification RPR-MAC frame including KeepAlive signal is subjected to hop-by-hop processing (i.e. so as to be once terminated at a subsequent node). Since the inter-link failure notification RPR-MAC frame generated by the frame conversion circuit 720 includes a KeepAlive signal, it indicates that no failure occurs on the inter-link. The frame conversion circuit 720 outputs the generated inter-link failure notification RPR-MAC frame to the forwarding engine 730. The forwarding engine 730 specifies an output ring corresponding to the transmission destination RPR-MAC address of the inter-link failure notification RPR-MAC frame to transfer the inter-link failure notification RPR-MAC frame and the output ring information to the ADM 790. Then, according to the output ring information, the ADM 790 sends out the inter-link failure notification RPR-MAC frame within the ring.

Similarly to the case shown in the first manner, when no KeepAlive signal is transferred from the packet demultiplexing circuit 710 for a fixed time period, the inter-link failure detection circuit 760 determines that a failure occurs on the inter-link to which its own node is connected to notify the RPR inter-link failure information collection circuit 770 of failure occurrence on the inter-link. In the second manner, the RPR inter-link failure information collection circuit 770 generates none of inter-link failure notification RPR-MAC frames even when receiving the notification from the inter-link failure detection circuit 760. Processing of notifying the flash circuit 781 of information that a failure occurs on the inter-link to which its own node is connected is executed similarly to the case of the first manner.

The KeepAlive signal is periodically received by the contact node 700 through the inter-link. Then, in the second manner, the frame conversion circuit 720 generates an inter-link failure notification RPR-MAC frame including a KeepAlive signal, which is sent out into the ring by the ADM 790. Accordingly, each node in the ring which is not a transmission source of the inter-link failure notification RPR-MAC frame periodically receives the inter-link failure notification RPR-MAC frame. When an inter-link failure notification RPR-MAC frame is transferred, the ADM 790 of each node (see FIG. 10 and FIG. 11) transfers the inter-link failure notification RPR-MAC frame to the RPR inter-link failure information collection circuit 770. When none of inter-link failure notification RPR-MAC frames including a KeepAlive signal is transferred from the ADM 790 for a fixed time, the RPR inter-link failure information collection circuit 770 determines that a failure occurs on the inter-link to notify the flash circuit 781 that a failure occurs on an inter-link connected to a transmission source node of the being received inter-link failure notification RPR-MAC frame.

The other operation is the same as that of first manner.

In a case of notifying each node in the ring of inter-link failure occurrence in the second manner, a contact node having received a KeepAlive signal transfers the KeepAlive signal within the ring without once terminating the signal and each node is allowed to detect failure occurrence on an inter-link, so that inter-link failure occurrence can be detected at a high speed. On the other hand, in a case of notifying each node in the ring of inter-link failure occurrence in the second manner, operation of the node can be simplified.

Moreover, according to the present invention, when the RPR inter-link failure information collection circuit 770 notifies the flash circuit 781 of information that a failure occurs on the inter-link, the flash circuit 781 immediately flushes the storage contents of the learning data base 721 without waiting for a lapse of an aging time. Timing is accordingly sped up of setting a broadcast address as a transmission destination RPR-MAC address by the frame conversion circuit 720 to enable such broadcast-transmission as shown in FIG. 6. As a result, an inter-link failure can be recovered at a high speed.

In a case of selectively flushing the storage contents of the learning data base 721, learning contents related to a communication path which fails to pass the inter-link are left as they are. At the time of frame transfer from a terminal to a terminal without passing through the inter-link, broadcast-transmission is accordingly unnecessary to enable frame transfer similarly to a case where no inter-link failure occurs. More specifically, when a frame is transferred without passing through the inter-link, lack of broadcast-transmission prevents an increase in the volume of traffic to realize effective use of a band.

Moreover, since each node comprises the ring failure information collection circuit 750 and the path determination circuit 780, even when a failure occurs on a link between nodes of the ring, the failure can be recovered.

Even when the respective rings are connected through other communication network by transmission/reception of a KeepAlive signal to/from contact nodes, it is possible to detect a failure on a path connecting the rings and recover from the failure. More specifically, the contact nodes 700-1 and 700-3 may be connected not through the inter-link 505 but through other communication network. Similarly, the contact nodes 700-2 and 700-4 may be connected not through the inter-link 506 but through other communication network.

When the contact nodes are connected not through the inter-link but through other communication network, the inter-link failure detection circuit 760 of each contact node adds information of a contact node as a transmission destination of a KeepAlive signal to the KeepAlive signal as information which can be recognized by the communication network. Assume, for example, that the contact nodes are connected through an Ethernet (registered trademark) network. In this case, the inter-link failure detection circuit 760 only needs to designate a MAC address of a transmission destination contact node within a KeepAlive signal as information of the contact node as a transmission destination of the KeepAlive signal.

While in FIG. 10, the description has been made with respect to a structure in which the contact node 700 comprises each circuit, the contact node may comprise a computer, which computer operates in the same manner as those of the packet demultiplexing circuit 710, the frame conversion circuit 720, the forwarding engine 730, the ring topology information collection circuit 740, the ring failure information collection circuit 750, the inter-link failure detection circuit 760, the RPR inter-link failure information collection circuit 770, the path determination circuit 780, the flash circuit 781 and the ADM 790 according to a program. The program only needs to be stored in a storage device in advance that the contact node 700 comprises.

Similarly, the node 900 other than the contact node may comprise a computer, which computer operates in the same manner as those of the packet switch 910, the frame conversion circuit 720, the forwarding engine 730, the ring topology information collection circuit 740, the ring failure information collection circuit 750, the RPR inter-link failure information collection circuit 770, the path determination circuit 780, the flash circuit 781 and the ADM 790 according to a program. The program only needs to be stored in a storage device in advance that the node 900 comprises.

In the first exemplary embodiment, the inter-link or a communication network which connects rings is equivalent to the communication path recited in the claims. The inter-link failure detection unit 760 of the contact node and the RPR inter-link failure information collection circuit 770 of other node than the contact node are equivalent to the failure occurrence determination unit. The flash circuit 781 is equivalent to the erasure unit. The frame conversion circuit 720, the forwarding engine 730 and the ADM 790 are equivalent to the broadcast unit. The packet demultiplexing circuit 710 is equivalent to the state change unit. KeepAlive signal is equivalent to an existence confirmation signal. The inter-link failure detection unit 760 and the packet demultiplexing circuit 710 are equivalent to the existence confirmation signal transmission unit. The packet demultiplexing circuit 710 is equivalent to the existence confirmation signal reception unit. The frame conversion circuit 720, the forwarding engine 730 and the ADM 790 are equivalent to the existence confirmation frame transmission unit.

Second Exemplary Embodiment

Shown in the first exemplary embodiment is a case of executing broadcast-transmission early to realize high-speed failure recovery by immediately flushing storage contents of the learning data base when an inter-link failure occurs. On the other hand, in a second exemplary embodiment of the present invention, the learning data base stores a correspondence relationship among a U-MAC address, a network identifier (VLAN identifier in this example) and an RPR-MAC address. Then, at the occurrence of an inter-link failure, a VLAN identifier deriving method is changed. As a result, when search of an RPR-MAC address corresponding to a pair of a U-MAC address and a VLAN identifier fails at the occurrence of an inter-link failure, executing broadcast-transmission realizes high-speed failure recovery.

Figure 12:
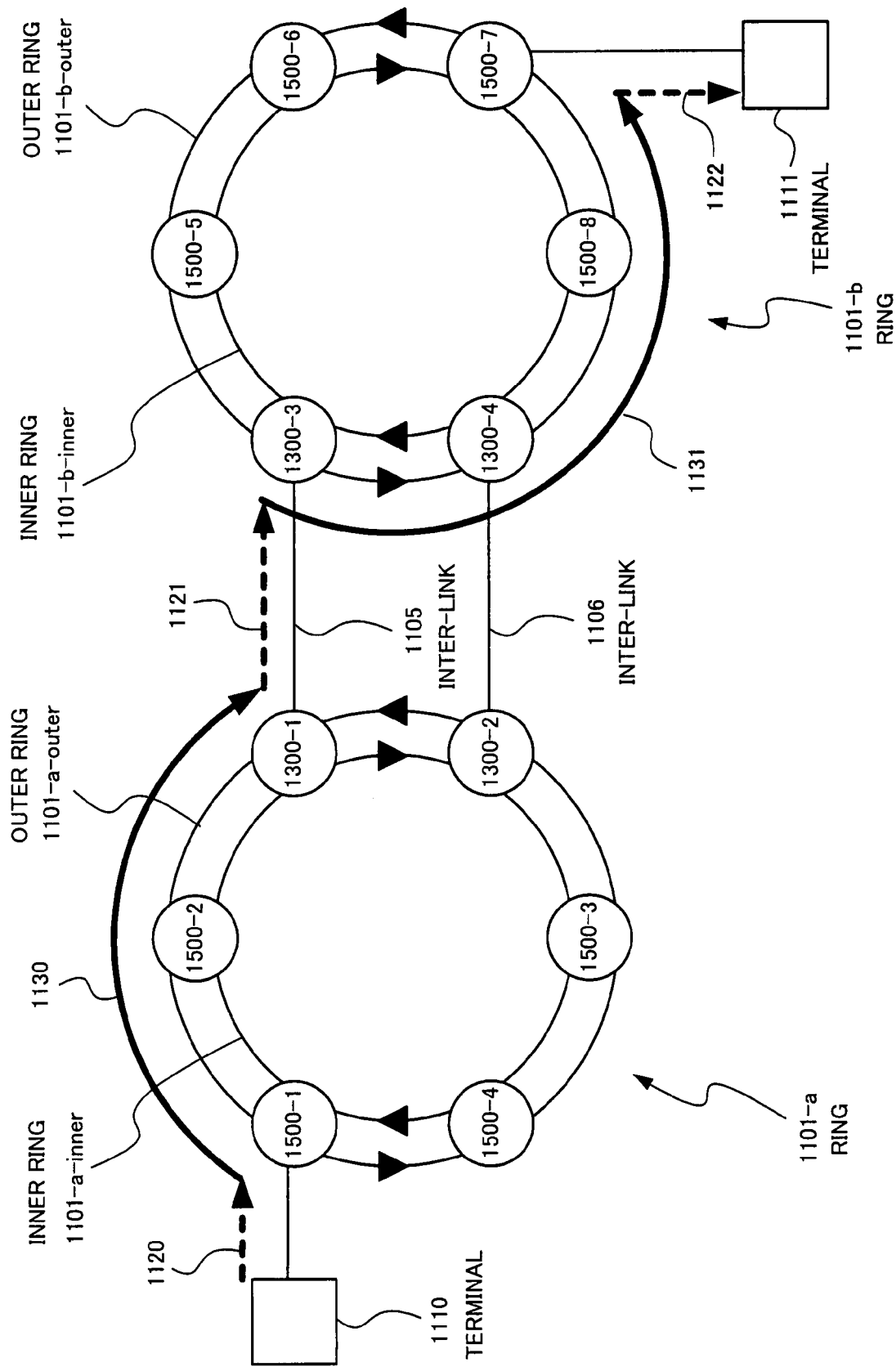
FIG. 12 is a diagram for use in explaining an example of a structure of a ring network system according to a second exemplary embodiment.

FIG. 12 is a diagram for use in explaining an example of a structure of a ring network system according to the second exemplary embodiment. The ring network system according to the second exemplary embodiment is a multi-ring network system comprising a plurality of rings (packet rings) 1101-*a* and 1101-*b*. The ring 1101-*a* comprises RPR nodes (hereinafter simply denoted as a node) 1500-1~1500-4 and contact nodes 1300-1 and 1300-2. The ring 1101-*b* comprises nodes 1500-5~1500-8 and contact nodes 1300-3 and 1300-4. The rings 1101-*a* and 1101*b* are two-fiber rings, with the ring 1101-*a* comprising an inner ring 1101-*a*-inner and an outer ring 1101-*a*-outer. Similarly, the ring 1101-*b* comprises an inner ring 1101-*b*-inner and an outer ring 1101-*b*-outer. Assume here that each inner ring executes traffic transfer clockwise and each outer ring executes traffic transfer counterclockwise. Assume that to the node 1500-1, a terminal 1110 is connected and to the node 1500-7, a terminal 1111 is connected. Also assume that RPR-MAC addresses of the nodes 1500-1~1500-8 are 1500-1~1500-8, respectively. Similarly, assume that RPR-MAC addresses of the contact nodes 1300-1~1300-4 are 1300-1~1300-4, respectively.

The contact nodes 1300-1 and 1300-3 are connected by an inter-link 1105. The contact nodes 1300-2 and 1300-4 are connected by an inter-link 1106. At each inter-link, a VLAN (Virtual LAN) is set. To one inter-link, a plurality of VLANs may be set. For simplicity of explanation, assume here that a VLAN1 is set at the inter-link 1105 and a VLAN2 is set at the inter-link 1106.

Each contact node refers to a VLAN identifier of a U-MAC frame. Then, when a VLAN set at an inter-link connected to the node itself and its VLAN identifier correspond to each other, the node transfers the U-MAC frame to the inter-link. Accordingly, a U-MAC frame having the VLAN identifier "VLAN1" is transferred to the inter-link 1105 and not to the inter-link 1106. Similarly, a U-MAC frame having the VLAN identifier "VLAN2" is transferred to the inter-link 1106 and not to the inter-link 1105. In addition, while broadcast-transmission is first executed for making a learning data table learn a correspondence relationship among a U-MAC address, a VLAN identifier and an RPR-MAC address, each contact node also at this time compares a VLAN identifier that a U-MAC frame has and a VLAN set at an inter-link and when they do not correspond to each other, refrains from executing transfer to the inter-link.

In the present embodiment, the inter-links 1105 and 1106 are both used in the forwarding state indiscriminatingly between a living inter-link and a spare inter-link. Each inter-link passes only a U-MAC frame having a VLAN identifier according to a VLAN set at itself as described above.

In the following, description will be made of operation of a ring network system in a normal state with respect to a case where U-MAC frame transfer is made from the terminal 1110 to the terminal 1111. U-MAC frame is an Ethernet (registered trademark) frame, for example. In FIG. 12, paths 1120, 1121 and 1122 indicated by dotted lines are U-MAC frame transfer paths. Paths 1130 and 1131 indicated by solid lines in FIG. 12 are RPR-MAC frame transfer paths.

The node 1500-1 receives a U-MAC frame output by the terminal 1110. Here, the terminal 1110 may output a U-MAC frame with a VLAN identifier added. Alternatively, the terminal 1110 may output a U-MAC frame with no VLAN identifier added.

Upon receiving a U-MAC frame output from the terminal 1110, the node 1500-1 adds a VLAN identifier to the U-MAC frame or changes a VLAN identifier added in advance. When with a VLAN identifier already added to the received U-MAC frame, the node 1500-1 newly adds a VLAN identifier, an addition region of a VLAN identifier is provided in the U-MAC frame to newly add the VLAN identifier to the region. At this time, a VLAN identifier originally added to the U-MAC frame is preserved in the U-MAC frame as it is. Such VLAN identifier addition manner is called VLAN tag stack. The node 1500-1 may change a VLAN identifier originally added to the U-MAC frame without stacking a VLAN tag. When no VLAN identifier is originally added to the U-MAC frame, the node 1500-1 adds a VLAN identifier to the U-MAC frame.

Each node other than a contact node derives a VLAN identifier by executing predetermined operation and adds the VLAN identifier to a U-MAC frame. Alternatively, the node changes a VLAN identifier originally added to a derived VLAN identifier. Accordingly, depending on an operation result, "VLAN1" may be derived or "VLAN2" may be derived as an identifier.

When notified occurrence of a failure on an inter-link, each node other than a contact node changes a method of operating a VLAN identifier such that only an identifier of a VLAN set at an inter-link developing no fault is derived.

In the following, description will be made of a case where the node 1500-1 derives the "VLAN1" as a VLAN identifier and adds the "VLAN1" to a U-MAC frame. In the present exemplary embodiment, each node comprises a learning data base in which a correspondence relationship among a U-MAC address, a VLAN identifier and an RPR-MAC address is stored.

Upon newly adding a VLAN identifier to a U-MAC frame received from the terminal 1110, the node 1500-1 refers to its own learning data base. Then, the node searches an RPR- MAC address corresponding to a combination between a transmission destination U-MAC address in the U-MAC frame and an added VLAN identifier to determine a transmission destination RPR-MAC address. In this example, assume that a transmission destination U-MAC address (the address of the terminal 1111), the "VLAN1" and the RPR-MAC address 1300-1 are correlated in advance and learned by the learning data base. The node 1500-1 accordingly adds an RPR-MAC overhead with "1300-1" as a transmission destination RPR-MAC address and its own RPR-MAC address "1500-1" as a transmission source RPR-MAC address and converts the U-MAC frame into an RPR-MAC frame.

Subsequently, the node 1500-1 refers to its own forwarding data base to specify output ring information. Then, according to the output ring information, the node sends the RPR-MAC frame to the inner ring or the outer ring or both of them. Shown in FIG. 12 is a case where the frame is sent out to the inner-ring 1101-*a*-inner.

The node 1500-2 having received an RPR-MAC frame sent from the node 1500-1 refers to the transmission destination RPR-MAC address of the RPR-MAC frame to compare the address with its own address. Since the transmission destination RPR-MAC address differs from the address of the node 1500-2 itself, the node 1500-2 determines that itself should not terminate the RPR-MAC frame to transfer the RPR-MAC frame to the inner link 1101-*a*-inner.

The node 1300-1 having received the RPR-MAC frame sent from the node 1500-2 refers to the transmission destination RPR-MAC address of the RPR-MAC frame to compare the address with its own address. Since the compared two addresses coincide with each other, the node 1300-1 takes in the RPR-MAC address. In other words, the node takes out the RPR-MAC frame from the ring 1101-*a*. Then, the node 1300-1 removes the RPR-MAC overhead from the RPR-MAC frame to convert the RPR-MAC frame into the U-MAC frame. To the U-MAC frame, the VLAN identifier "VLAN1" is added. In addition, since the VLAN1 is set at the inter-link 1105, the node 1300-1 is allowed to send the U-MAC frame to the inter-link 1105, so that the node sends the U-MAC frame to the inter-link 1105.

The node 1300-3 receives the U-MAC frame through the inter-link 1105. Then, the node 1300-3 refers to its own learning data base to search an RPR-MAC address corresponding to a combination between a transmission destination U-MAC address in the U-MAC frame and an added VLAN identifier to determine a transmission destination RPR-MAC address ("1500-7" here). The node 1300-3 adds an RPR-MAC overhead with "1500-7" as the transmission destination RPR-MAC address and its own RPR-MAC address "1300-3" as the transmission source RPR-MAC address to the U-MAC frame to convert the U-MAC frame into an RPR-MAC frame. Subsequently, the node 1300-3 refers to its own forwarding data base to specify output ring information based on the transmission destination RPR-MAC address. In this example, the node 1300-3 sends the RPR-MAC frame to the outer ring 1101-*b*-outer according to the output ring information.

Upon receiving the RPR-MAC frame, either of the nodes 1300-4 and 1500-8 determines that the frame is not an RPR-MAC frame to be terminated by the node itself because the transmission destination RPR-MAC address and its own RPR-MAC address fail to coincide. Then, the node sends out the RPR-MAC frame to the outer rig 1101-*b*-outer. As a result, the node 1500-7 receives the RPR-MAC frame. The node 1500-7 takes in the received RPR-MAC frame because the transmission destination RPR-MAC address of the received RPR-MAC frame is coincident with its own RPR-MAC address (takes out the RPR-MAC frame from the ring 1101-*b*). Subsequently, the node 1500-7 removes the RPR-MAC overhead from the RPR-MAC frame to convert the RPR-MAC frame into a U-MAC frame.

The node 1500-7 deletes the VLAN identifier "VLAN1" added by the node 1500-1 from the converted U-MAC frame. As a result, the U-MAC frame returns to a state of being output by the terminal 1110. Although the description has been made here of a case where the node 1500-1 adds the VLAN identifier "VLAN1", when the VLAN identifier added to the U-MAC frame is changed to the "VLAN1", the node 1500-7 only needs to restore the "VLAN1" to the original VLAN identifier. The node 1500-7 transfers the U-MAC frame with the VLAN identifier "VLAN1" deleted to the terminal 1111.

Figure 13:
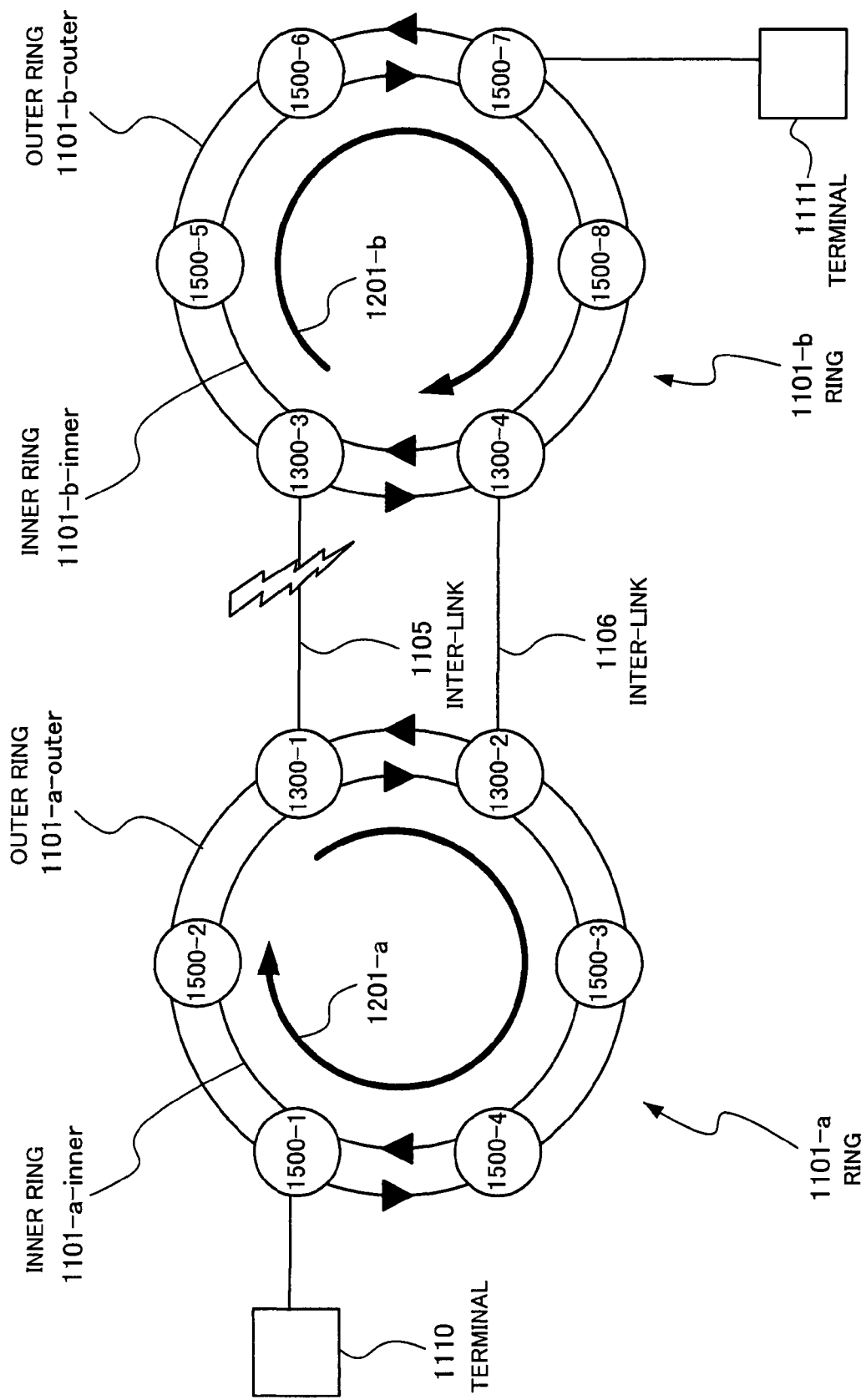
FIG. 13 is a diagram for use in explaining a situation where an inter-link develops a fault.

Next, operation executed when a failure occurs will be described. FIG. 13 is a diagram for use in explaining a condition where the inter-link 1105 develops a fault. When the inter-link 1105 develops a fault, traffic flow shown in FIG. 12 prevents transfer of a U-MAC frame from the terminal 1110 to the terminal 1111.

Figure 14:
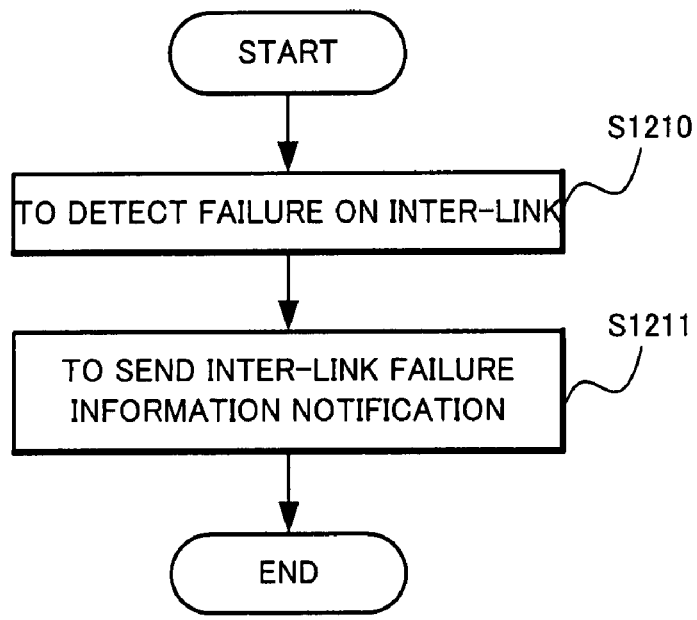
FIG. 14 is a flow chart showing operation of a contact node when a failure occurs.

FIG. 14 is a flow chart showing operation of a contact node when a failure occurs. Description will be here made of the contact nodes 1300-1 and 1300-3 connected to the inter-link 1105 as an example. When the inter-link 1105 develops a fault, the contact nodes 1300-1 and 1300-3 detect the failure (Step S1210). Subsequently, the contact nodes 1300-1 and 1300-3 send an inter-link failure notification RPR-MAC frame notifying that the inter-link develops a fault within a ring to which the node itself belongs (Step S1211). The contact nodes 1300-1 and 1300-3 include information which can specify an inter-link developing a fault in the inter-link failure notification RPR-MAC frame. The inter-link failure notification RPR-MAC frame may be sent out to the inner ring or the outer ring, or to both of them. In the example shown in FIG. 13, illustrated is a case where the contact nodes 1300-1 and 1300-3 send an inter-ink failure notification RPR-MAC frame to the inner ring 1101-*a*-inner and the inner ring 1101-*b*-inner, respectively. In addition, the paths 1201-*a* and 1201-*b* shown in FIG. 13 show transfer paths of an inter-link failure notification RPR-MAC frame.

Figure 15:
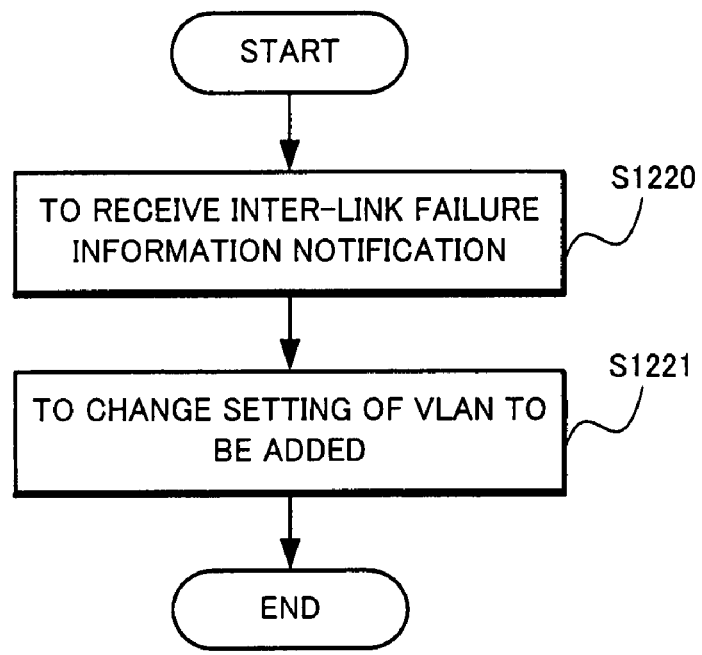
FIG. 15 is a flow chart showing operation of other node than a contact node when a failure occurs.

FIG. 15. is a flow chart showing operation of a node other than a contact node at failure occurrence. The nodes 1500-1~1500-8 are relevant nodes. Although description will be here made of operation of the node 1500-1, the nodes 1500-2~1500-8 execute the same operation. The node 1500-1 receives an inter-link failure notification RPR-MAC frame transmitted to the contact node 1300-1 at Step S1210 (Step S1220). The node 1500-1 then changes a method of deriving a VLAN identifier (Step S1221). At Step S1221, the node 1500-1 specifies an inter-link on which a failure occurs based on the inter-link failure notification RPR-MAC frame to change the method of deriving a VLAN identifier so as to prevent a VLAN identifier corresponding to a VLAN set at the inter-link from being derived. In other words, the method of deriving a VLAN identifier is changed such that only a VLAN identifier corresponding to a VLAN set at an inter-link developing no failure is derived. While in a normal state, the "VLAN1" is derived as a VLAN identifier in some cases, changing the VLAN identifier deriving method at Step S1221 results in excluding the "VLAN1" from targets to be derived. Then, as a VLAN identifier, a VLAN identifier corresponding to the VLAN set at the inter-link 1106 (in this example, "VLAN2") will be derived. Then, the node 1500-1 adds the "VLAN2" to the U-MAC frame. Alternatively, the node changes an originally added VLAN identifier to the "VLAN2".

Figure 16:
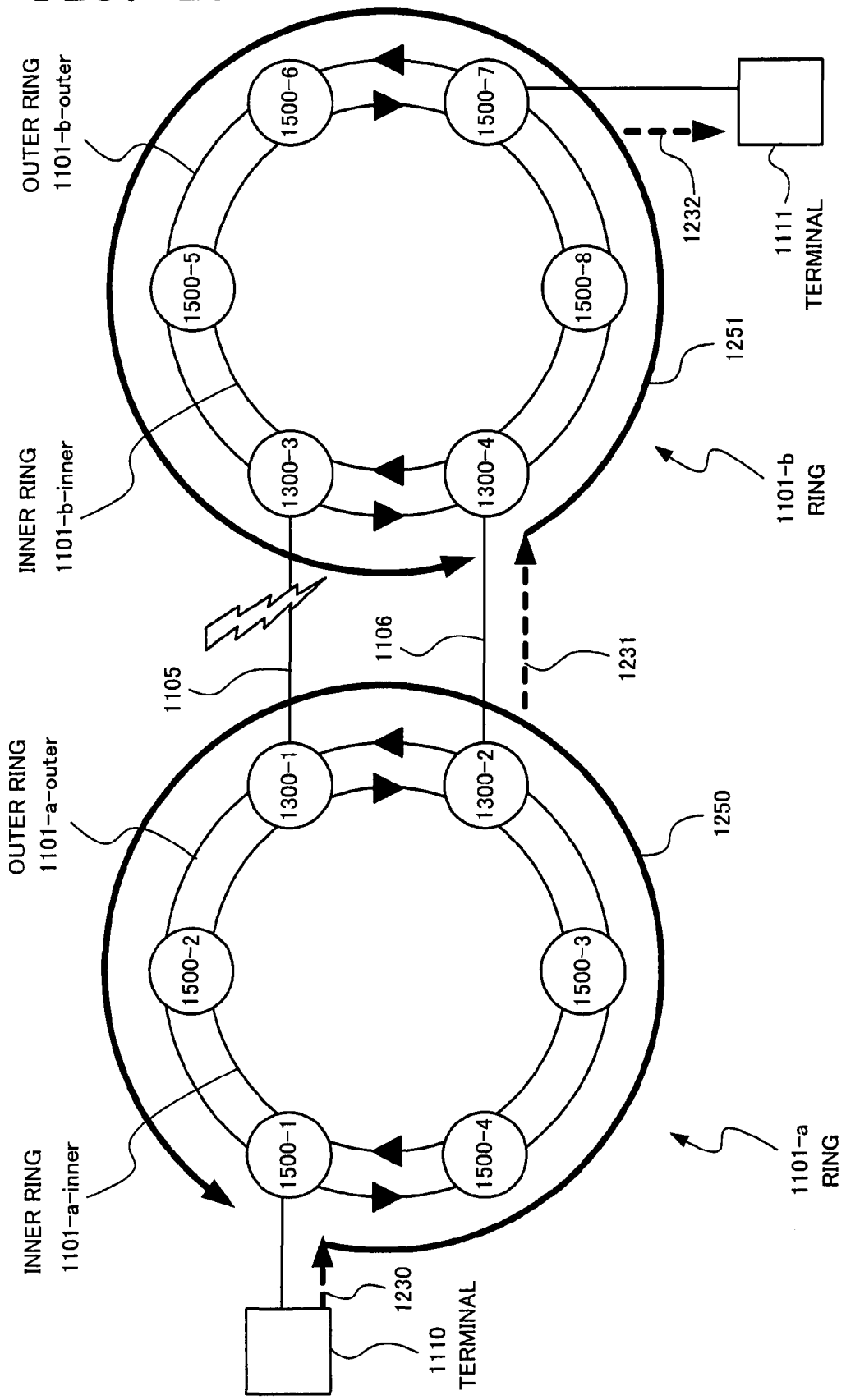
FIG. 16 is a diagram for use in explaining a situation where after changing a VLAN identifier deriving method in response to failure occurrence on an inter-link, each node transfers a frame from one terminal to another.

FIG. 16 is a diagram for use in explaining a condition where a frame is transferred from the terminal 1110 to the terminal 1111 after each of the nodes 1500-1~1500-8 changes a VLAN identifier deriving method in response to failure occurrence on the inter-link 1105. In FIG. 16, paths 1230, 1231 and 1232 indicated by dotted lines are transfer paths of a U-MAC frame. Paths 1250 and 1251 indicated by solid lines in FIG. 16 are transfer paths of an RPR-MAC frame to be broadcast-transmitted.

With reference to FIG. 16, description will be made of a case where a derived VLAN identifier is added to a U-MAC frame.

Upon receiving a U-MAC frame from the terminal 1110, the node 1500-1 derives a VLAN identifier. At this time, since a VLAN identifier deriving method has been changed at Step S1221, even in a case where the "VLAN1" is supposed to be derived in a normal state, the node derives the "VLAN2". Then, the node 1500-1 adds the VLAN identifier "VLAN2" to the U-MAC frame.

Subsequently, the node 1500-1 searches its own learning data base for an RPR-MAC address corresponding to a combination between a transmission destination U-MAC address (the address of the terminal 1111) in the received U-MAC frame and the VLAN identifier "VLAN2". While the address of the terminal 1111 (U-MAC address) and the RPR-MAC address corresponding to the "VLAN1" are stored in the learning data base, the address of the terminal 1111 (U-MAC address) and the RPR-MAC address corresponding to the "VLAN2" are not stored in the learning data base. Therefore, the node 1500-1 fails in searching an RPR-MAC address. When search of the RPR-MAC address fails, the node 1500-1 adds an RPR-MAC overhead with the transmission destination RPR-MAC address as a broadcast address and its own RPR-MAC address "1500-1" as a transmission source RPR-MAC address to the U-MAC frame. The node 1500-1 converts the U-MAC frame into an RPR-MAC frame by adding the RPR-MAC overhead. The node 1500-1 broadcast-transmits the RPR-MAC frame. At this time, the node 1500-1 may transmit the RPR-MAC frame to either of the inner ring and the outer ring. The node may send the same to both of the inner ring and the outer ring. FIG. 16 shows a case where the node 1500-1 sends an RPR-MAC frame to the outer ring 1101-a-outer to transfer the same through the transfer path 1250.

Upon receiving the RPR-MAC frame (an RPR-MAC frame with a broadcast address as a transmission destination), the node 1500-4 takes in the RPR-MAC frame, as well as sending a copy of the RPR-MAC frame to the ring 1101-a. At this time, the node 1500-4 sends the copy of the RPR-MAC frame to a ringlet through which the RPR-MAC frame is transferred out of the inner ring and the outer ring. In this example, accordingly, a copy of the RPR-MAC frame is sent out to the outer ring 1101-a-outer.

In addition, the node 1500-4 registers, at its own learning data base, a correspondence relationship among a transmission source RPR-MAC address in the taken RPR-MAC frame (in this example, "1500-1"), a transmission source U-MAC address of a U-MAC frame accommodated in the RPR-MAC frame (in this example, the address of the terminal 1110) and a VLAN identifier added to the U-MAC frame ("VLAN2" in this example). Thereafter, the node 1500-4 removes the RPR-MAC overhead from the RPR-MAC frame to convert the frame into a U-MAC frame. The node also removes the VLAN identifier "VLAN2" added to the U-MAC frame by the node 1500-1. As a result, the U-MAC frame returns to a state of being output by the terminal 1110. While the description has been here made with respect to a case where the node 1500-1 adds the VLAN identifier "VLAN2", when a VLAN identifier added to the U-MAC frame is changed to the "VLAN2", the node 1500-4 only needs to restore the "VLAN2" to an original VLAN identifier. The node 1500-4 transfers the U-MAC frame with the VLAN identifier removed to a terminal or an apparatus (not shown) connected to the node 1500-4 outside the ring 1101-a-outer.

Similarly to the node 1500-4, the nodes 1500-3, 1300-2, 1300-1 and 1500-2 take in the RPR-MAC frame, as well as sending a copy of the RPR-MAC frame to the outer ring 1101-a-outer. As a result, the RPR-MAC frame will be transferred within the ring along the transfer path 1250 shown in FIG. 16. Also similarly to the node 1500-4, each of the nodes 1500-3, 1300-2, 1300-1 and 1500-2 registers, at its own learning data base, a correspondence relationship among a transmission source RPR-MAC address (in this example, "1500-1"), a transmission source U-MAC address (in this example, the address of the terminal 1110) and the VLAN identifier "VLAN2". Then, each of the nodes 1500-3 and 1500-2 removes the RPR-MAC overhead of the RPR-MAC frame to remove the VLAN identifier "VLAN2" from the U-MAC frame. As a result, the U-MAC frame returns to a state of being output by the terminal 1110. Thereafter, each node transfers the U-MAC frame to a terminal or an apparatus (not shown) outside the ring 1101-a. After conversion to a U-MAC frame, a contact node connected to the inter-link sends the U-MAC frame to the inter-link without removing a VLAN identifier.

In a case of a ring structure, a broadcast-transmitted RPR-MAC frame makes a round of the ring to return to a node as its transmission source. Each of the nodes 1500-1~1500-8 and 1300-1~1300-4, when referring to a transmission source RPR-MAC address of the received RPR-MAC frame to find that the address coincides with an RPR-MAC address of its own node, abandons the RPR-MAC frame. No RPR-MAC frame accordingly loops.

The node 1300-2 removes the RPR-MAC overhead from the taken RPR-MAC frame to convert the RPR-MAC frame into a U-MAC frame. Since the VLAN identifier "VLAN2" added to the converted U-MAC frame and the VLAN2 set at the inter-link 1106 correspond, the node 1300-2 determines to send the U-MAC frame to the inter-link 1106 to send the U-MAC frame to the inter-link 1106. The node 1300-2 sends the frame to the inter-link 1106 without deleting the VLAN identifier "VLAN2" added to the U-MAC frame. The U-MAC frame will be transferred to the node 1300-4 along the transfer path 1231 shown in FIG. 16.

The node 1300-4 having received the U-MAC frame through the inter-link 1106 searches its own learning data base for an RPR-MAC address corresponding to a combination between a transmission destination U-MAC address in the received U-MAC frame (the address of the terminal 1111) and the "VLAN2" added to the U-MAC frame. In the learning data base of the node 1300-4, neither the address of the terminal 1111 (a U-MAC address) nor an RPR-MAC address corresponding to the "VLAN2" is stored. Therefore, the node 1300-4 fails in searching an RPR-MAC address. When the RPR-MAC address search fails, the node 1300-4 adds to the U-MAC frame an RPR-MAC overhead with a transmission destination RPR-MAC address as a broadcast address and its own RPR-MAC address "1300-4" as a transmission source RPR-MAC address. The node 1300-4 converts the U-MAC frame into an RPR-MAC frame by adding an RPR-MAC overhead. The node 1300-4 broadcast-transmits the RPR-MAC frame. At this time, the node 1300-4 is allowed to send the RPR-MAC frame to either of the inner ring and the outer ring. Alternatively, the frame may be sent to both of the inner ring and the outer ring. FIG. 16 shows a case where the node 1300-4 sends the RPR-MAC frame to the outer ring 1101-*b*-outer and transfers the same through the transfer path 1251.

Upon receiving the RPR-MAC frame (the RPR-MAC frame with a broadcast address as a transmission source), the node 1500-8 takes in the RPR-MAC frame, as well as sending a copy of the RPR-MAC frame to the outer ring 1101-*b*-outer. The node 1500-8 also registers, at its own learning data base, a correspondence relationship among a transmission source RPR-MAC address in the taken RPR-MAC frame (in this example, "1300-4"), a transmission source U-MAC address of a U-MAC frame accommodated in the RPR-MAC frame (in this example, the address of terminal 1110) and a VLAN identifier added to the U-MAC frame (in this example, "VLAN2"). Thereafter, the node 1500-8 removes the RPR-MAC overhead from the RPR-MAC frame to convert the frame into a U-MAC frame. The node further removes the VLAN identifier "VLAN2" added to the U-MAC frame. Then, the node 1500-8 transfers the U-MAC frame to a terminal or an apparatus (not shown) connected to the node 1500-8 outside the ring 1101-*b*. While the description has been made with respect to a case where the node 1500-1 adds the VLAN identifier "VLAN2" as an example, when a VLAN identifier added to a U-MAC frame is changed to the "VLAN2", the node 1500-8 only needs to restore the "VLAN2" to the original VLAN identifier.

Similarly to the node 1500-8, the nodes 1500-7, 1500-6, 1500-5 and 1300-3 take in an RPR-MAC frame, as well as sending a copy of the RPR-MAC frame to the outer ring 1101-*b*-outer. As a result, the RPR-MAC frame will be transferred within the ring along the transfer path 1251 shown in FIG. 16. In addition, each of the nodes 1500-7, 1500-6, 1500-5 and 1300-3 registers at its own learning data base a correspondence relationship among a transmission source RPR-MAC address (in this example, "700-4"), a transmission source U-MAC address (in this example, the address of the terminal 510) and a VLAN identifier (in this example, "VLAN2") similarly to the node 900-8. Then, the node removes the RPR-MAC overhead of the RPR-MAC frame and removes the VLAN identifier "VLAN2" added to the U-MAC frame to transfer the obtained U-MAC frame to a terminal or an apparatus (not shown) outside the ring 1101-*b*. A contact node, however, removes no VLAN identifier.

On the other hand, the node 1300-4, when an RPR-MAC frame broadcast-transmitted by itself makes a round of the ring and is transferred to the node 1300-4, abandons the RPR-MAC frame.

The node 1500-7 removes the RPR-MAC overhead of the taken RPR-MAC frame to convert the RPR-MAC frame into a U-MAC frame. Furthermore, the node removes the VLAN identifier "VLAN2" added to the U-MAC frame. As a result, the U-MAC frame returns to a state of being output by the terminal 1110. Then, the node 1500-7 transfers the U-MAC frame to the terminal 1111. The U-MAC frame will be transferred from the node 1500-7 to the terminal 1111 along the transfer path 1232 shown in FIG. 16.

Thus, even when the inter-link 1105 develops a fault, frame transfer from the terminal 1110 to the terminal 1111 is enabled. Next, frame transfer from the terminal 1111 to the terminal 1110 will be described.

Figure 17:
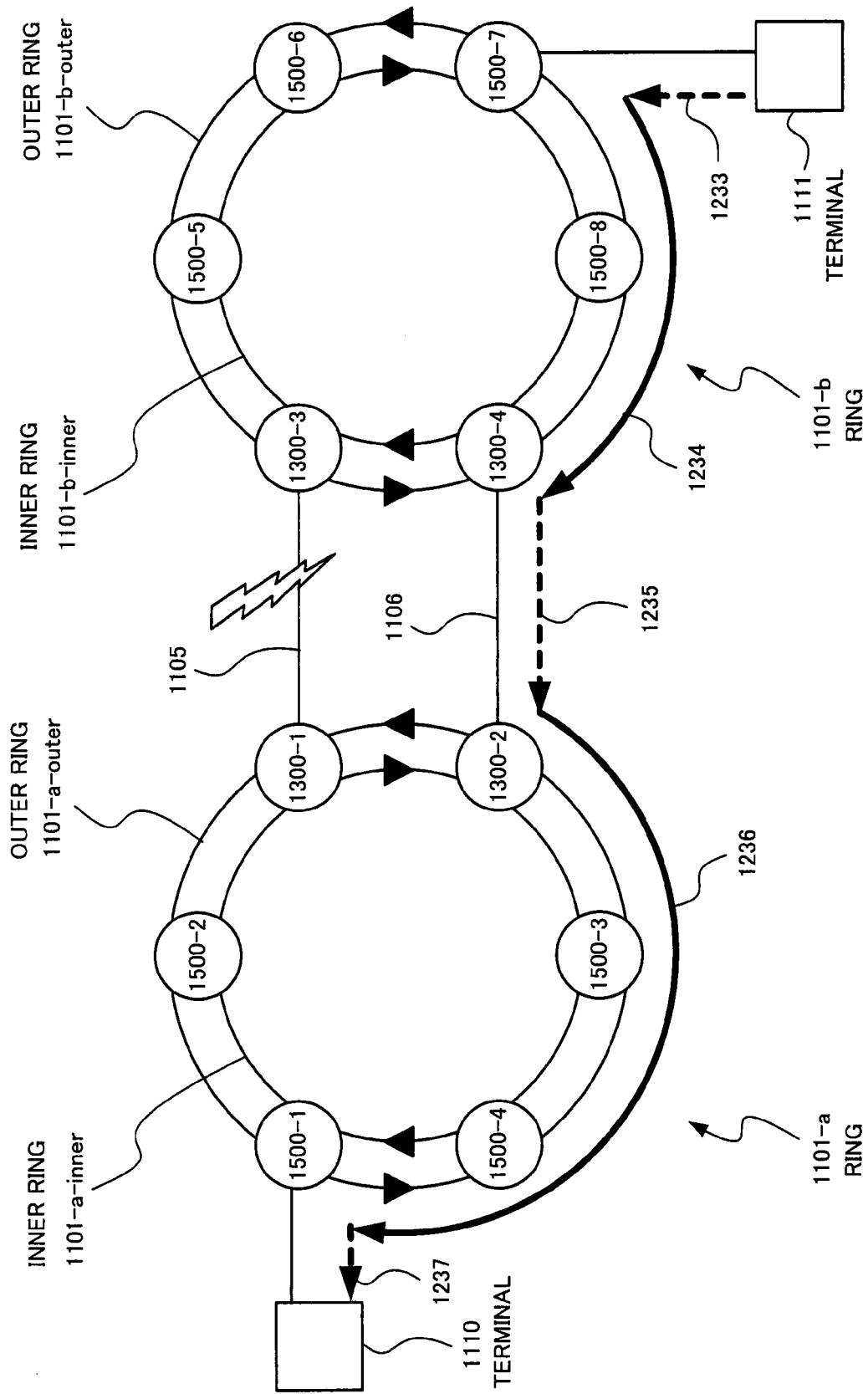
FIG. 17 is a diagram for use in explaining a situation where after broadcast-transmission, a frame is transferred from one terminal to another.

FIG. 17 is a diagram for use in explaining a condition where a frame is transferred from the terminal 1111 to the terminal 1110. In FIG. 17, paths 1233, 1235 and 1237 indicated by dotted lines are U-MAC frame transfer paths. Also in FIG. 17, paths 1234 and 1236 indicated by solid lines are RPR-MAC frame transfer paths.

In the course of frame transfer from the terminal 1110 to the terminal 1111 shown in FIG. 17, each node in the ring 1101-*b* learns into its own learning data table a correspondence relationship among the address of the terminal 1110 (the U-MAC address), the VLAN identifier "VLAN2" and the RPR-MAC address "1300-4". Similarly, each node in the ring 1101-*a* learns into its own learning data base a correspondence relationship among the address of the terminal 1110, the VLAN identifier "VLAN2" and the RPR-MAC address "1500-1". Accordingly, unicast communication from the terminal 1111 to the terminal 1110 is enabled. In the following, the unicast communication will be described.

The node 1500-7 receives a U-MAC frame whose transmission destination U-MAC address is the address of the terminal 1110 from the terminal 1111. Then, the node 1500-7 derives a VLAN identifier to be added to the U-MAC frame and adds the same to the U-MAC frame. Since the processing at Step S1221 (see FIG. 15) is executed in response to failure occurrence on the inter-link 1105 here, the node 1500-7 derives the identifier "VLAN2" set at the inter-link 1106 and adds the "VLAN2" to the U-MAC frame.

Subsequently, the node 1500-7 refers to the learning data base to search the RPR-MAC address 1300-4 corresponding to a combination between the transmission destination U-MAC address and the "VLAN2". Then, the node 1500-7 adds to the U-MAC frame an RPR-MAC overhead with "1300-4" as a transmission destination RPR-MAC address and "1500-7" as a transmission source RPR-MAC address and transfers the obtained frame within the ring 1101-*b*. As a result, the RPR-MAC frame will be transferred from the node 1500-7 to the node 1300-4 along the transfer path 1234.

Upon receiving an RPR-MAC frame, each of the nodes 1500-8 and 1300-4 on the transfer path 1234 registers at its own learning data base a correspondence relationship among the transmission source RPR-MAC address ("1500-7" in this example), a transmission source U-MAC address of a U-MAC frame accommodated in the RPR-MAC frame (the address of the terminal 1111 in this example) and a VLAN identifier added to the U-MAC frame ("VLAN2" in this example).

Upon receiving the RPR-MAC frame, the node 1300-4 also takes in the RPR-MAC frame because the transmission destination RPR-MAC address coincides with its own RPR-MAC address. Then, the node removes the RPR-MAC overhead of the taken RPR-MAC frame to convert the RPR-MAC frame into a U-MAC frame. Without removing the VLAN identifier from the U-MAC frame, the node 1300-4 sends the U-MAC frame to the inter-link 1106. The U-MAC frame will be transferred to the node 1300-2 along the transfer path 1235 shown in FIG. 17.

The node 1300-2 having received the U-MAC frame through the inter-link 1106 refers to an RPR-MAC address corresponding to a combination between the transmission destination U-MAC address (the address of the terminal 1110) and the "VLAN2" added to the U-MAC frame. Registered at the learning data base is "1500-1" as an RPR-MAC address corresponding to the combination between the address of the terminal 1110 and the "VLAN2". The node 1300-2 accordingly adds to the U-MAC frame an RPR-MAC overhead with "1500-1" as a transmission destination RPR-MAC address and "1300-2" as a transmission source RPR-MAC address and transfers the obtained frame within the ring 1101-*a*. As a result, the RPR-MAC frame will be transferred from the node 1300-2 to the node 1500-1 along the transfer path 1236.

Upon receiving the RPR-MAC frame, each of the nodes 1500-3, 1500-4 and 1500-1 on the transfer path 1236 registers at its own learning data base a correspondence relationship among a transmission source RPR-MAC address ("1300-2" in this example), a transmission source U-MAC address of a U-MAC frame accommodated in the RPR-MAC frame (the address of the terminal 1111 in this example) and a VLAN identifier added to the U-MAC frame ("VLAN2" in this example).

As a result, the nodes 1500-1, 1500-4 and 1500-3 learn into the learning data base a correspondence relationship among the address of the terminal 1111, the "VLAN2" and the RPR-MAC address "1300-2". The nodes 1300-4 and 1500-8 learn into the learning data base a correspondence relationship among the address of the terminal 1111, the "VLAN2" and the RPR-MAC address "1500-7". Accordingly, unicast-communication from the terminal 1110 to the terminal 1111 is enabled.

In the second exemplary embodiment, each contact node only needs to detect a failure of an inter-link similarly to the first exemplary embodiment. More specifically, by directly detecting a failure of a physical link, the contact node can detect a failure of an inter-link. Alternatively, the contact node may transmit and receive a KeepAlive signal to/from each other to detect a failure on an inter-link upon non-arrival of the KeepAlive signal. While the two manners have been described as a method of notifying each node in the ring of inter-link failure occurrence by using a KeepAlive signal, any of the two manners can be applied to the present exemplary embodiment.

Figure 18:
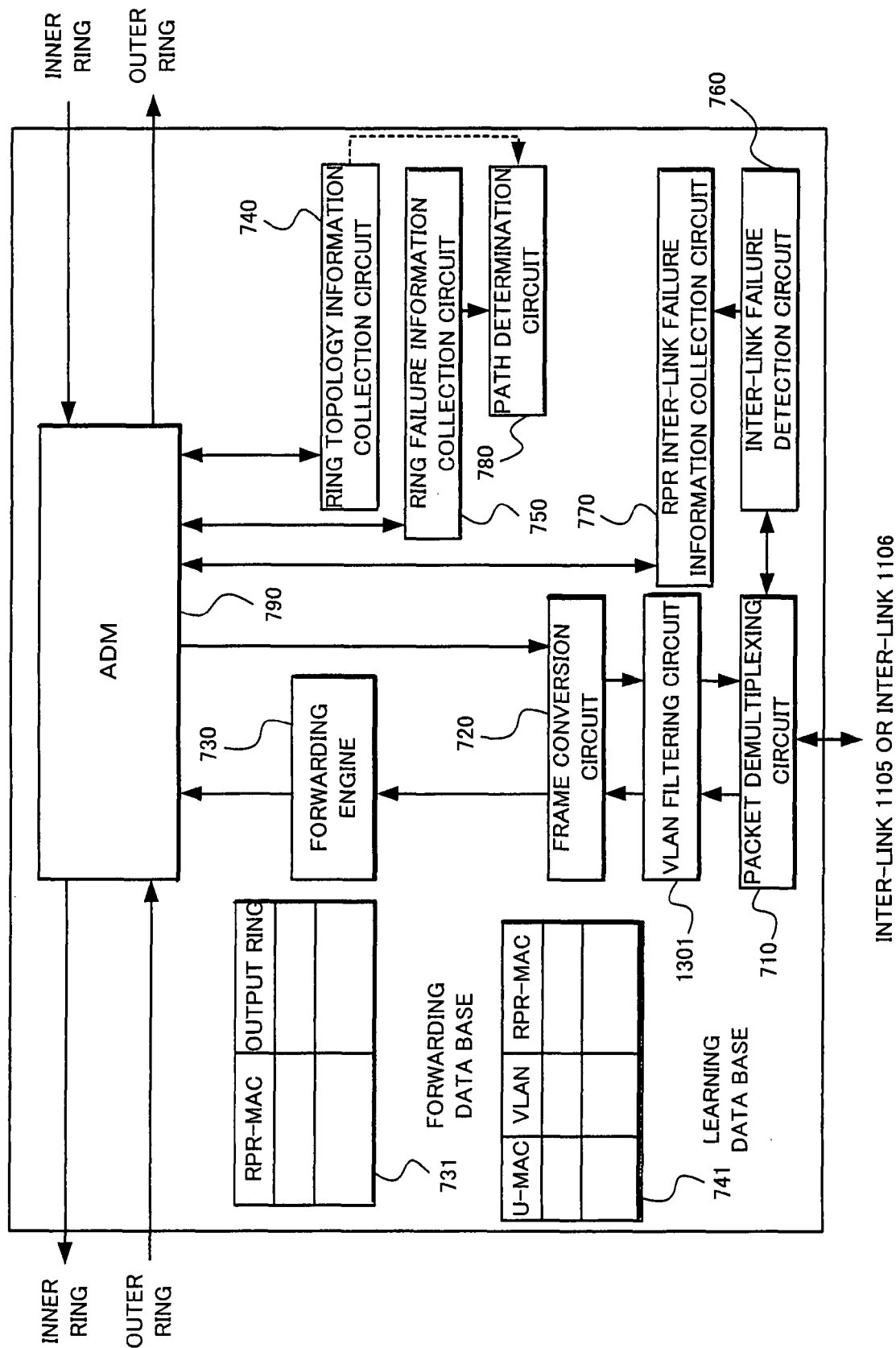
FIG. 18 is a block diagram showing an example of a structure of a contact node applied to the second exemplary embodiment.

FIG. 18 is a block diagram showing an example of a structure of the contact nodes 1300-1~1300-8 (these contact nodes will be denoted as a node 1300 in the lump in some cases) applied to the ring network system according to the second exemplary embodiment. The same components as those of the contact node 700 according to the first exemplary embodiment are given the same reference numerals as those in FIG. 10 to omit their description. Each contact node 1300 comprises a packet demultiplexing circuit 710, a frame conversion circuit 720, a forwarding engine 730, a ring topology information collection circuit 740, a ring failure information collection circuit 750, an inter-link failure detection circuit 760, an RPR inter-link failure information collection circuit 770, a path determination circuit 780, an ADM 790 and a VLAN filtering circuit 1301. The node 1300 further comprises a learning data base 741 and a forwarding data base 731.

More specifically, the contact node 1300 according to the present exemplary embodiment differs from the contact node 700 according to the first exemplary embodiment in failing to comprise a flash circuit and in comprising the VLAN filtering circuit 1301. Also, in the second exemplary embodiment, the learning data base 741 stores a correspondence relationship among a U-MAC address, a VLAN identifier and an RPR-MAC address.

The VLAN filtering circuit 1301 has a U-MAC frame transferred from the frame conversion circuit 720. The U-MAC frame is a conversion from an RPR-MAC frame received by the ADM 790 which is transferred within the ring into a U-MAC frame by the frame conversion circuit 720. The VLAN filtering circuit 1301 refers to a VLAN identifier that the U-MAC frame has (not an originally existing VLAN identifier but a newly added VLAN identifier when a VLAN tag is stacked). Then, the VLAN filtering circuit 1301 determines whether the VLAN identifier is an identifier corresponding to a VLAN set at an inter-link connected to its own node or not. That the VLAN identifier of the U-MAC frame is not an identifier corresponding to a VLAN set at the inter-link denotes that the U-MAC frame will not be transferred to the inter-link. Conversely, that the VLAN identifier of the U-MAC frame is an identifier corresponding to a VLAN set at the inter-link denotes that the U-MAC frame can be transferred to the inter-link. Accordingly, the VLAN filtering circuit 1301, when a VLAN identifier of a U-MAC frame received from the frame conversion circuit 720 is not an identifier corresponding to a VLAN set at the inter-link, abandons the U-MAC frame. On the other hand, when a VLAN identifier of a U-MAC frame received from the frame conversion circuit 720 is an identifier corresponding to a VLAN set at the inter-link, the VLAN filtering circuit 1301 transfers the U-MAC frame to the packet demultiplexing circuit 710. The VLAN filtering circuit 1301 only needs to store information of a VLAN set at the inter-link connected to its own node in advance.

The VLAN filtering circuit 1301 executes the same processing in a case where a U-MAC frame is transferred from the packet demultiplexing circuit 710. More specifically, the VLAN filtering circuit 1301, when a VLAN identifier of a U-MAC frame received from the packet demultiplexing circuit 710 is not an identifier corresponding to a VLAN set at the inter-link, abandons the U-MAC frame. On the other hand, when a VLAN identifier of a U-MAC frame received from the packet demultiplexing circuit 710 is an identifier corresponding to a VLAN set at the inter-link, the VLAN filtering circuit 1301 transfers the U-MAC frame to the frame conversion circuit 720.

When a transmission destination U-MAC address of the U-MAC frame is a predetermined address reserved in advance, the VLAN filtering circuit 1301 is allowed to transfer the frame to a subsequent circuit irrespective of a VLAN identifier. When an inter-link failure is notified by the second manner using a KeepAlive signal, for example, the packet demultiplexing circuit 710 transfers a KeepAlive signal received from other ring through the inter-link to the VLAN filtering circuit 1301. As a transmission destination U-MAC address of a U-MAC frame as a KeepAlive signal, a controlling identifier according to the KeepAlive signal is set. In this case, the VLAN filtering circuit 1301 transfers the U-MAC frame to the frame conversion circuit 720 irrespective of a VLAN identifier.

Also in the present exemplary embodiment, the frame conversion circuit 720 and the packet demultiplexing circuit 710 transmit and receive a U-MAC frame to/from each other through the VLAN filtering circuit 1301. At this time, the U-MAC frame might be abandoned by the VLAN filtering circuit 1301 in some cases as described above.

In addition, according to the present exemplary embodiment, when determining a transmission destination RPR-MAC address, the frame conversion circuit 720 searches the learning data base 741 for an RPR-MAC frame corresponding to a combination between a transmission destination U-MAC address of a U-MAC frame and a VLAN identifier to determine a transmission destination RPR-MAC address. Other operation of the frame conversion circuit 720 and the packet demultiplexing 710 is the same as that of the first exemplary embodiment.

In the first exemplary embodiment, the RPR inter-link failure information collection circuit 770, when notified of failure occurrence on an inter-link by the inter-link failure detection circuit 760, notifies the flash circuit 781 that an inter-link develops a fault (see FIG. 10). In the present exemplary embodiment, since the contact node 1300 fails to comprise a flash circuit, no processing of notification to the flash circuit is executed. Other operation of the RPR inter-link failure information collection circuit 770 is the same as that of the first exemplary embodiment.

The inter-link failure detection circuit 760 periodically generates a KeepAlive signal and transmits the same to the packet demultiplexing circuit 710 similarly to the first exemplary embodiment. The inter-link failure detection circuit 760 may include a VLAN identifier according to a VLAN set at an inter-link to which its own node is connected in a KeepAlive signal. The circuit also may include an inter-link identifier of the inter-link to which its own node is connected in a KeepAlive signal. Other operation of the inter-link failure detection circuit 760 is the same as that of the first exemplary embodiment.

In addition, operation of the other respective circuits (the forwarding engine 730, the ring topology information collection circuit 740, the ring failure information collection circuit 750, the path determination circuit 780 and the ADM 790) is the same as that of the first exemplary embodiment.

Figure 19:
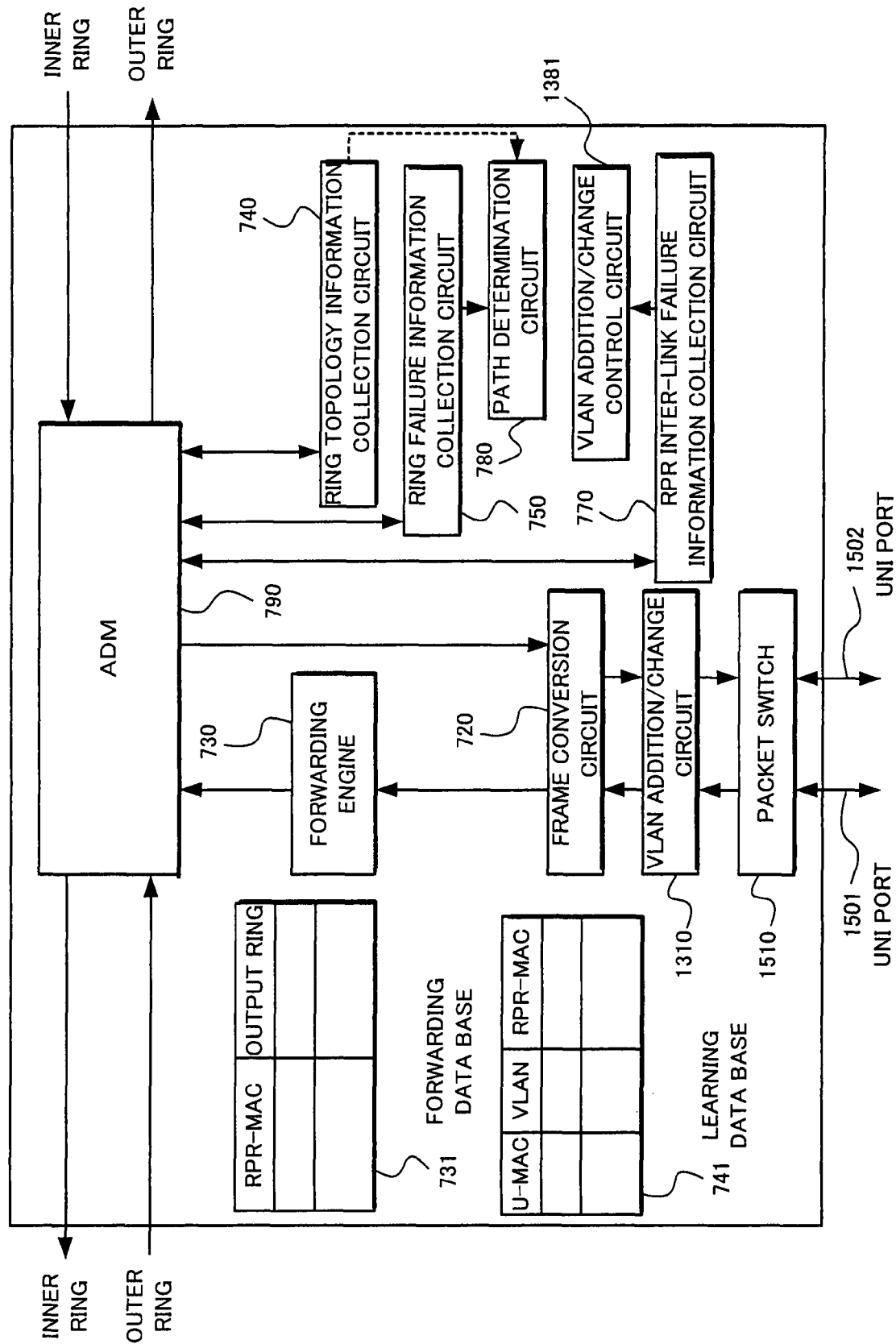
FIG. 19 is a block diagram showing an example of a structure of other node than a contact node applied to the second exemplary embodiment.
Figure 20:
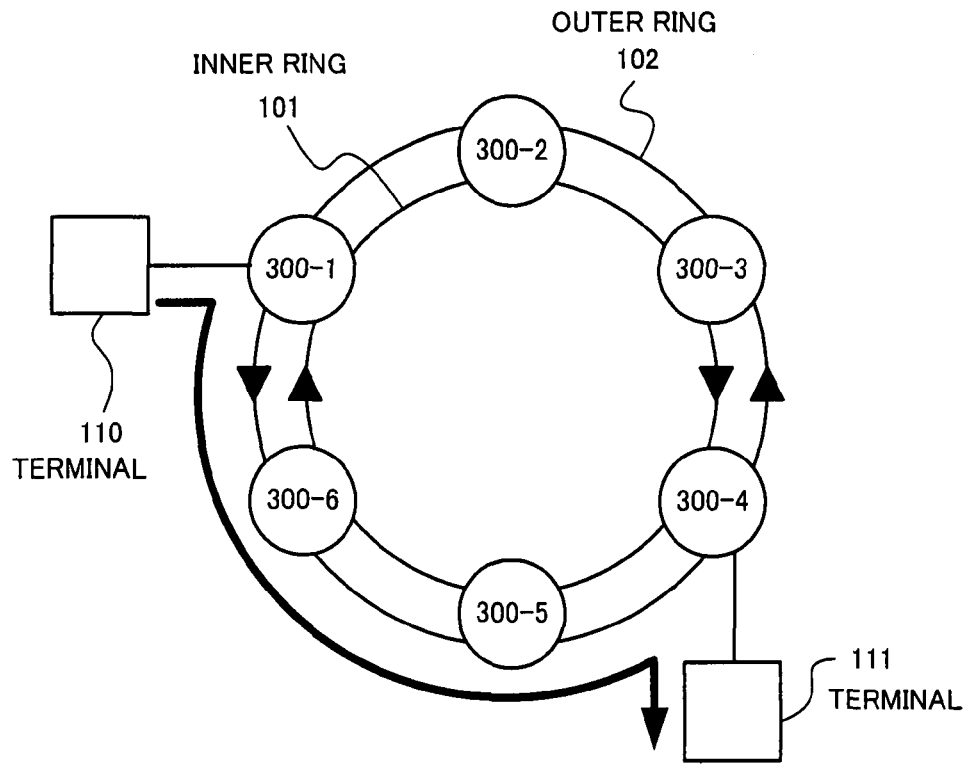
FIG. 20 is a diagram for use in explaining an example of an RPR network of a single ring.
Figure 21:
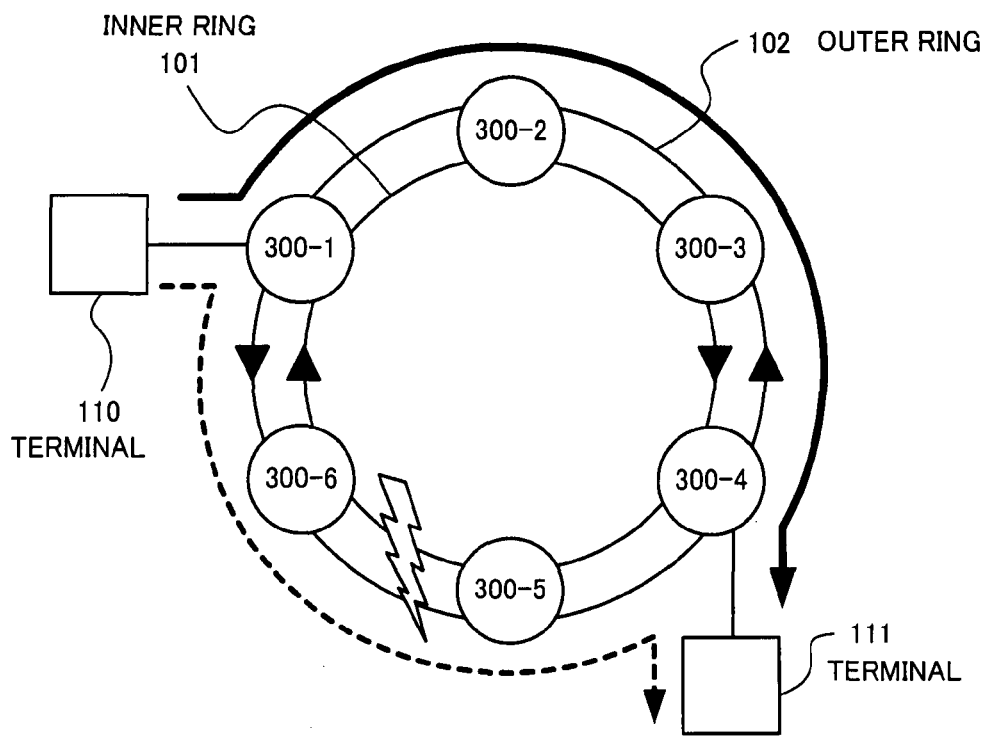
FIG. 21 is a diagram for use in explaining operation of a ring when a failure occurs in the ring.
Figure 22:
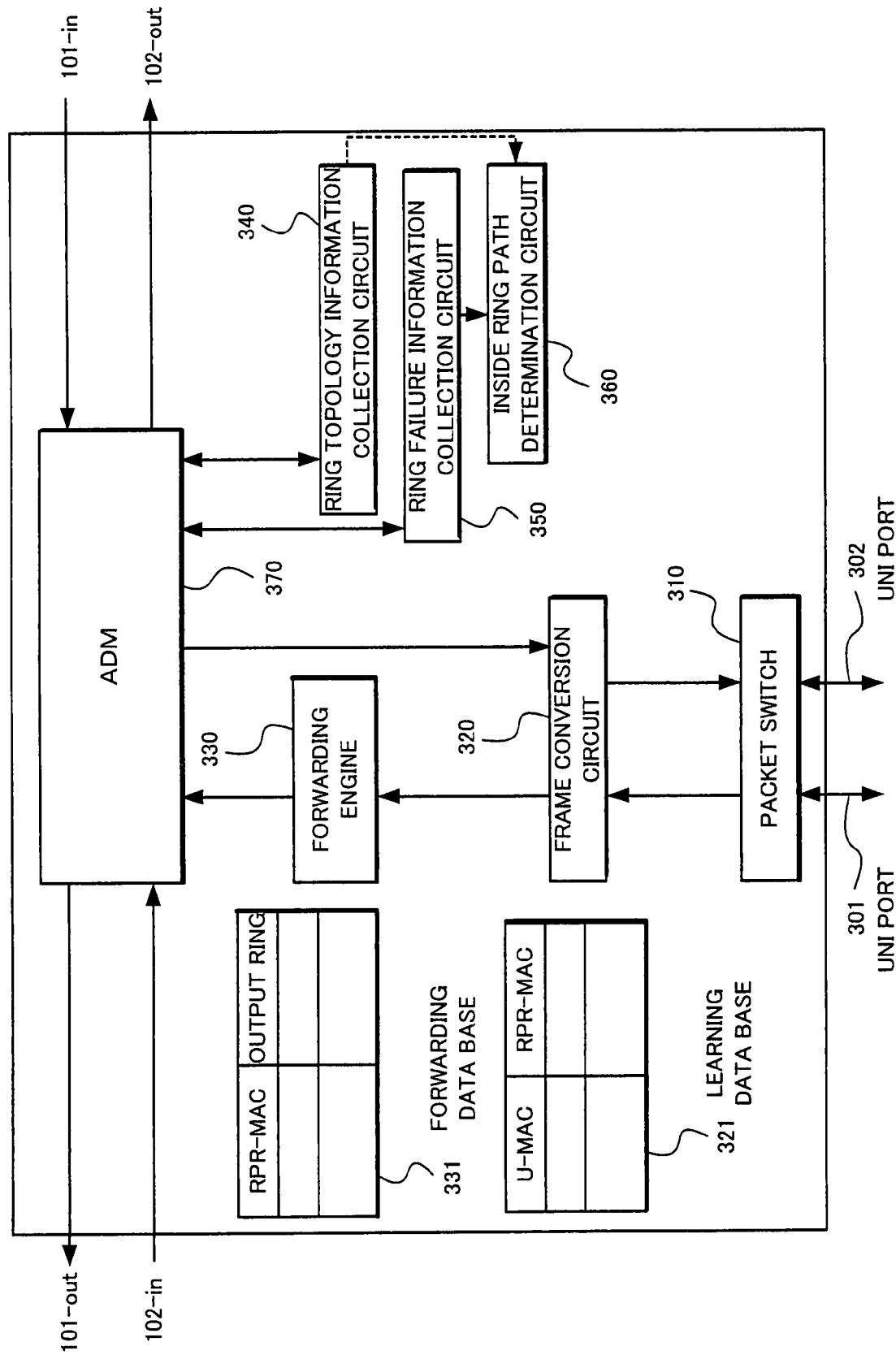
FIG. 22 is a block diagram showing an example of a structure of a related RPR node.
Figure 23:
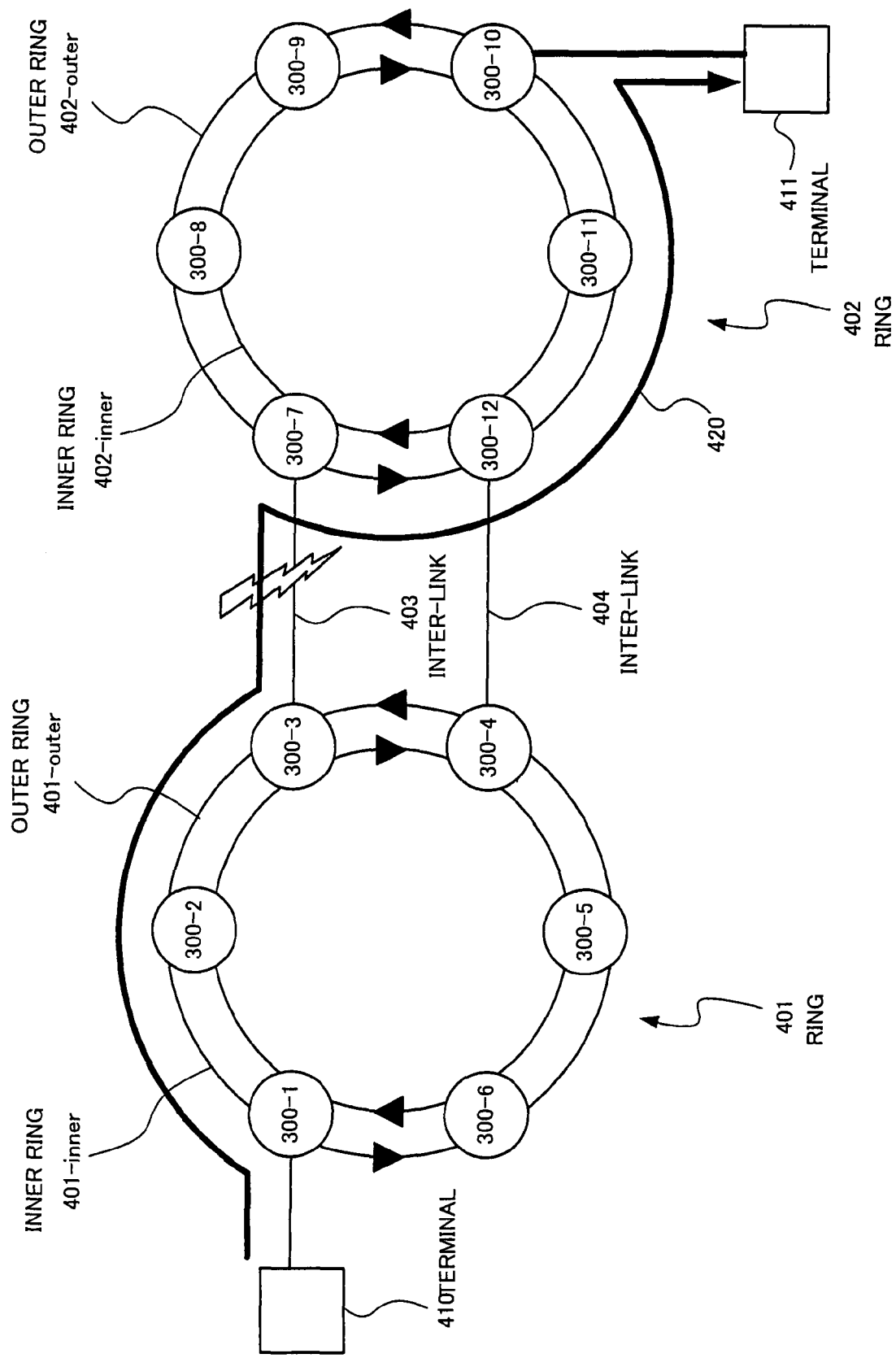
FIG. 23 is a diagram for use in explaining an example of a multi-ring network having two rings connected by two interlinks.

FIG. 19 is a block diagram showing an example of a structure of the nodes 1500-1~1500-8 (these nodes will be denoted as the node 1500 in the lump in some cases) other than the contact nodes applied to the ring network according to the second exemplary embodiment. The same components as those of the contact node 1500 shown in FIG. 18 are given the same reference numerals as those in FIG. 18 to omit their description. Each node 1500 comprises a packet switch 1510, the frame conversion circuit 720, the forwarding engine 730, the ring topology information collection circuit 740, the ring failure information collection circuit 750, the RPR inter-link failure information collection circuit 770, the path determination circuit 780, the ADM 790, a VLAN addition/change circuit 1310 and a VLAN addition/change control circuit 1381. The node 1500 further comprises the learning data base 741 and the forwarding data base 731. The learning data base 741 and the forwarding data base 731 of the node 1500 are the same as the learning data base 741 and the forwarding data base 731 of the contact node 1300.

More specifically, the node 1500 comprises the packet switch 1510 in place of the packet demultiplexing circuit 710 and eliminates the need of the inter-link failure detection circuit 760. The node 1500 differs from the contact node 1300 in comprising the VLAN addition/change circuit 1310 and the VLAN addition/change control circuit 1381.

The VLAN addition/change circuit 1310 has a U-MAC frame that the packet switch 1510 receives from a terminal (not shown in FIG. 19) transferred from the packet switch 1510. Then, the VLAN addition/change circuit 1310 derives a VLAN identifier and adds the same to the U-MAC frame or change a VLAN identifier originally added to the U-MAC frame to the derived VLAN identifier.

U-MAC frame output by a terminal may have a VLAN identifier added or no VLAN identifier added. When a VLAN identifier is added to the U-MAC frame output by the terminal, the VLAN addition/change circuit 1310 is allowed to leave the VLAN identifier as it is and newly provide a VLAN identifier addition region to add a derived VLAN identifier to the region (VLAN tag stack). Alternatively, the VLAN addition/change circuit 1310 may change a VLAN identifier originally added to the U-MAC frame to a derived VLAN identifier. When no VLAN identifier is added to a U-MAC frame output by the terminal, the VLAN addition/change circuit 1310 adds a derived VLAN identifier to the U-MAC frame.

The VLAN addition/change circuit 1310 transfers the U-MAC frame with the VLAN identifier added (changed) to the frame conversion circuit 720.

Next, description will be made of a method of deriving a VLAN identifier by the VLAN addition/change circuit 1310. The VLAN addition/change circuit 1310 executes operation of determining one from VLAN identifiers of a VLAN which can transfer a U-MAC frame based on information included in the U-MAC frame to derive a VLAN identifier. Information included in a U-MAC frame is, for example, a transmission destination U-MAC address, a transmission source U-MAC address, a port number or the like and when a VLAN identifier is originally added to a U-MAC frame output by the terminal, the VLAN identifier is also included in the information included in the U-MAC frame. When newly deriving a VLAN identifier, however, it is unnecessary to use all the information included in the U-MAC frame and only a part of it may be used. It is possible, for example, to use all of a transmission destination U-MAC address, a transmission source U-MAC address, a port number and an originally added VLAN identifier or use a part of them. Description will be here made of a case where a transmission destination U-MAC address and a transmission source U-MAC address are used as an example.

The VLAN addition/change circuit 1310 determines a VLAN identifier according to a residual obtained by dividing a total value of a transmission destination U-MAC address and a transmission source U-MAC address by the number of assigned VLANs. The number of assigned VLANs is a total value of VLANs set at the respective inter-links developing no fault. Assume, for example, that only the VLAN1 is set at the inter-link 1105 and only the VLAN2 is set at the inter-link 1106. Then, assume that each inter-link develops no fault. The number of assigned VLANs will be accordingly 2. In this case, the VLAN addition/change circuit 1310 divides a total value of the transmission destination U-MAC address and the transmission source U-MAC address by the number of assigned VLANs "2" to determine, for example, that the VLAN identifier is the "VLAN1" when the residual is 1 and determine that the VLAN identifier is the "VLAN2" when the residual is 0. On the other hand, when one inter-link (assumed to be the inter-link 1105 here) develops a fault to enable only the inter-link 1106 to be used, the number of assigned VLANs will be 1. In this case, the VLAN addition/change circuit 1310 changes a method of deriving a VLAN identifier such that when dividing a total value of the transmission destination U-MAC address and the transmission source U-MAC address by the number of assigned VLANs "1" results in having the residual of 0, determination is made that the VLAN identifier is the "VLAN2". Thus changing the deriving method results in deriving the identifier "VLAN2" of the VLAN set at the inter-link 1106 developing no fault as a VLAN identifier without fail.

In addition, VLAN set at each inter-link is not necessarily one. Assume, for example, that five VLANs are set at each of the inter-links 1105 and 1106 shown in FIG. 16. Then, the number of assigned VLANs in a normal state will be ten. In this case, the VLAN addition/change circuit 1310 only needs to divide a total value of the transmission destination U-MAC address and the transmission source U-MAC address by the number of assigned VLANs "10" to determine one VLAN identifier among ten kinds of VLANs according to the residual (any of 0~9). On the other hand, when one inter-link (assumed to be the inter-link 1105) develops a fault to enable only the inter-link 1106 to be used, the number of assigned VLANs will be five. In this case, the VLAN addition/change circuit 1310 divides a total value of the transmission destination U-MAC address and the transmission source U-MAC address by the number of assigned VLANs "5" to determine one VLAN identifier among five kinds of VLANs set at the inter-link 1106 according to the residual (any of 0~4). Thus changing the deriving method results in deriving an identifier of a VLAN set at the inter-link 1106 on which no failure occurs as a VLAN identifier without fail.

Although shown here is a case where a total value of the transmission destination U-MAC address and the transmission source U-MAC address is used, other information may be used. A total value of a transmission destination U-MAC address, a transmission source U-MAC address and a port number, for example, may be used. Alternatively, a value of a VLAN identifier originally added to a U-MAC frame may be divided by the number of assigned VLANs.

The VLAN addition/change circuit 1310 has information of a VLAN identifier of a VLAN set at an inter-link developing no fault transferred from the VLAN addition/change control circuit 1381. The VLAN addition/change control circuit 1381, when the inter-link develops a fault, notifies the VLAN addition/change circuit 1310 of the information of the VLAN identifier of the VLAN set at the inter-link developing no fault. The VLAN addition/change circuit 1310 changes the VLAN identifier deriving method according to the notification to derive only the VLAN identifier of the VLAN set at the inter-link developing no fault.

In addition, the VLAN addition/change circuit 1310 needs not to add (or change) a VLAN identifier to all the U-MAC frames transferred from the packet switch 1510. For example, when searching the learning data base 741 for an RPR-MAC address corresponding to a transmission destination U-MAC frame finds that the RPR-MAC address is not an RPR-MAC address of a contact node, the VLAN addition/change circuit 1310 needs no addition (or change) of a VLAN identifier. This is because when an RPR-MAC address corresponding to a transmission destination U-MAC frame is not an RPR-MAC address of a contact node, the U-MAC frame will not be transferred to other ring through the inter-link.

When the ADM 790 receives an RPR-MAC frame transferred within the ring and the frame conversion circuit 720 converts the RPR-MAC frame into a U-MAC frame, the VLAN addition/conversion circuit 1310 has the U-MAC frame transferred from the frame conversion circuit 720. The U-MAC frame is a frame with a VLAN identifier added (changed) when transferred to a node in the ring from the terminal and further converted into an RPR-MAC frame and transferred within the ring network system. The VLAN addition/change circuit 1310 restores the U-MAC frame transferred from the frame conversion circuit 720 to a state of being first output from the terminal. In a case of an exemplary embodiment in which a VLAN identifier is added when a frame is transferred from the terminal to a node in the ring, the VLAN addition/change circuit 1310 only needs to remove an added VLAN identifier from a U-MAC frame transferred from the frame conversion circuit 720. As a result, the U-MAC frame returns to a state of being first output from the terminal. In a case of an exemplary embodiment in which a VLAN identifier is changed when a frame is transferred from the terminal to a node in the ring, the VLAN addition/change circuit 1310 only needs to change a VLAN identifier of a U-MAC frame transferred from the frame conversion circuit 720 to restore the same to an original VLAN identifier. The VLAN addition/change circuit 1310 only needs to specify an original VLAN identifier to change the identifier to the original VLAN identifier based on, for example, a transmission source U-MAC address, a transmission destination U-MAC address, an IP address included in a U-MAC frame and the like.

After restoring the U-MAC frame transferred from the frame conversion circuit 720 to a state of being first output from the terminal, the VLAN addition/change circuit 1310 transfers the obtained frame to the packet switch 110.

When an inter-link develops a fault, the VLAN addition/change control circuit 1381 is notified of which inter-link develops a fault by the RPR inter-link failure information collection circuit 770. Based on the notification, the VLAN addition/change control circuit 1381 finds a VLAN identifier of a usable VLAN to output information of the VLAN identifier to the VLAN addition/change circuit 1310. As a result, the VLAN addition/change circuit 1310 changes the VLAN identifier deriving method as shown in the above-described example such that only a VLAN identifier of a usable VLAN can be derived.

The VLAN addition/change control circuit 1381 only needs to store, for example, information about each inter-link in an initial state (a state where no failure occurs) and about a VLAN identifier of a VLAN set at each inter-link. Then, the VLAN addition/change control circuit 1381 first only needs to notify the VLAN addition/change circuit 1310 of all the information of the VLAN identifiers. Then, when notified of which inter-link develops a fault from the RPR inter-link failure information collection circuit 770, the circuit only needs to notify the VLAN addition/change circuit 1310 of a VLAN identifier of a VLAN set at an inter-link on which no failure occurs. In addition, the VLAN addition/change control circuit 1381 may be notified of information about a VLAN identifier of a VLAN set at an inter-link developing a fault by the RPR inter-link failure information collection circuit 770. In this case, the VLAN addition/change control circuit 1381 only needs to notify the VLAN addition/change circuit 1310 of other VLAN identifier than the VLAN identifier notified from the RPR inter-link failure information collection circuit 770.

The packet switch 1510, which is a UNI (User Network Interface), transmits and receives a U-MAC frame to/from a terminal through UNI ports 1501 and 1502. Upon receiving a U-MAC frame through the respective UNI ports 1501 and 1502, the packet switch 1510 concentrates U-MAC frames from the UNI ports 1501 and 1502 and transfers the same to the VLAN addition/change circuit 1310. When a U-MAC frame is transferred from the VLAN addition/change circuit 1310, the packet switch 1510 outputs the U-MAC frame through an appropriate UNI port (a UNI port connected to a terminal as a transmission destination of the U-MAC frame).

The frame conversion circuit 720 of the node 1500 transmits and receives a U-MAC frame to/from the VLAN addition/change circuit 1310. Other operation of the frame conversion circuit 720 is the same as the operation of the frame conversion circuit of the contact node 1300.

The node 1500 fails to comprise such inter-link failure detection circuit 760 as shown in FIG. 18. The RPR inter-link failure information collection circuit 770 of the node 1500 refrains from executing operation of generating an inter-link failure notification RPR-MAC frame including failure information upon reception of a notification that an inter-link develops a fault and transferring the same to the ADM 790. In addition, upon detecting a failure on an inter-link based on an inter-link failure notification RPR-MAC frame transferred from the ADM 790, the RPR inter-link failure information collection circuit 770 of the node 1500 notifies the VLAN addition/change control circuit 1381 of information of the inter-link (or information of a VLAN identifier of a VLAN set at the inter-link). Other operation of the RPR inter-link failure information collection circuit 770 is the same as that of the RPR inter-link failure information collection circuit of the contact node 1300.

By using a node other than the contact node shown in FIG. 18 and the contact node shown in FIG. 19, the already described operation of the ring network system according to the second exemplary embodiment can be realized.

In a case of detecting occurrence of an inter-link failure by using a KeepAlive signal to notify the failure occurrence, detection and notification may be made by the first manner as described in the first exemplary embodiment or made by the second manner. In any case, operation of the components of a contact node and a node other than a contact node is the same as the operation described in the first exemplary embodiment. As is already described, application of the second manner enables inter-link failure occurrence to be detected at a high-speed. Application of the first manner enables node operation to be simplified.

Also according to the second exemplary embodiment, when the RPR inter-link failure information collection circuit 770 notifies the VLAN addition/change control circuit 1381 of information about an inter-link on which a failure occurs, the VLAN addition/change control circuit 1381 notifies the VLAN addition/change circuit 1310 of information of a VLAN identifier of a usable VLAN. Then, the VLAN addition/change circuit 1310 changes the method of deriving a VLAN identifier to be added (or changed) to a U-MAC frame to derive only a VLAN identifier of a usable VLAN. As a result, search of an RPR-MAC address corresponding to a combination between a transmission source U-MAC address and a VLAN identifier fails to speed up timing at which such broadcast-transmission as shown in FIG. 16 can be executed. It is accordingly possible to recover from a failure on an inter-link at a high speed.

The present exemplary embodiment has no discrimination between living and spare inter-links. Then, even when a failure is yet to occur, each contact node sends a U-MAC frame having a VLAN identifier of a VLAN set at an inter-link to an inter-link to which its own node is connected. Accordingly, even when a failure is yet to occur, each node is allowed to transfer a U-MAC frame to other ring through each inter-link to distribute loads on inter-links.

In addition, since each node comprises the ring failure information collection circuit 750 and the path determination circuit 780, even when a failure occurs on a link between nodes of the ring, the failure can be recovered.

Moreover, even when rings are connected to each other through other communication network, transmission and reception of a KeepAlive signal to/from contact nodes with each other enables detection of a failure on a path connecting the rings to recover from the failure. In other words, the contact nodes 1300-1 and 1300-3 may be connected not through the inter-link 1105 but through other communication networks. Similarly, the contact nodes 1300-2 and 1300-4 may be connected not through the inter-link 1106 but through other communication networks.

When the contact nodes are connected not through an inter-link but through other communication network, the inter-link failure detection circuit 760 of each contact node adds information of a contact node as a transmission destination of a KeepAlive signal to the KeepAlive signal as information which can be recognized by the communication network. Assume, for example, that contact nodes are connected through an Ethernet (registered trademark) network, for example. In this case, the inter-link failure detection circuit 760 only needs to designate a MAC address of the transmission destination contact node in the KeepAlive signal as information of the contact node as the transmission destination of the KeepAlive signal.

While with reference to FIG. 18, the description has been made of the structure in which the contact node 1300 comprises each circuit, the contact node can be structured to comprise a computer, which computer operates in the same manner as that of the packet demultiplexing circuit 710, the frame conversion circuit 720, the forwarding engine 730, the ring topology information collection circuit 740, the ring failure information collection circuit 750, the inter-link failure detection circuit 760, the RPR inter-link failure information collection circuit 770, the path determination circuit 780, the ADM 790 and the VLAN filtering circuit 1301 according to a program. The program only needs to be stored in advance in a storage device that the contact node 1300 comprises.

Similarly, also the node 1500 other than the contact node can be structured to comprise a computer, which computer operates in the same manner as that of the packet switch 1510, the frame conversion circuit 720, the forwarding engine 730, the ring topology information collection circuit 740, the ring failure information collection circuit 750, the RPR inter-link failure information collection circuit 770, the path determination circuit 780, the ADM 790, the VLAN addition/change circuit 1310 and the VLAN addition/change control circuit 1381 according to a program. The program only needs to be stored in advance in a storage device that the contact node 1500 comprises.

In the second exemplary embodiment, an inter-link or a communication network connecting the rings to each other is equivalent to a communication path recited in the claims. VLAN identifier is equivalent to a network identifier. The VLAN addition/change circuit 1310 is equivalent to the network identifier deriving unit and the network identifier applying unit. The RPR inter-link failure information collection circuit 770 is equivalent to the failure occurrence determination unit of a node other than a contact node. The VLAN addition/change control circuit 1381 is equivalent to the failure occurring communication path notification unit. The frame conversion circuit 720, the forwarding engine 730 and the ADM 790 are equivalent to the broadcast unit. The VLAN filtering circuit 1301 and the packet demultiplexing circuit 710 are equivalent to the user frame sending unit. KeepAlive signal is equivalent to an existence confirmation signal. The inter-link failure detection unit 760 and the packet demultiplexing circuit 710 are equivalent to the existence confirmation signal transmission unit. The packet demultiplexing circuit 710 is equivalent to the existence confirmation signal reception unit. The frame conversion circuit 720, the forwarding engine 730 and the ADM 790 are equivalent to the existence confirmation frame transmission unit.

According to the exemplary embodiment of the invention, each node comprises an erasure unit and the erasure unit erases information stored by a learning data base when a failure occurrence determination unit determines that a failure occurs on a living communication path. Then, each node other than a contact node comprises a broadcast unit, and when an address of a node corresponding to a transmission destination address which a user frame received from a terminal outside a ring network has is not stored in the learning data base, the broadcast unit broadcast-transmits a frame with the user frame accommodated as a payload. Accordingly, when a failure occurs on a living communication path, the information stored by the learning data base is erased and as a result, the broadcast unit immediately broadcast-transmits a frame with a user frame accommodated as a payload. Therefore, a failure can be recovered at a high speed when a failure occurs between ring networks.

In addition, in a case where when the failure occurrence determination unit determines that a failure occurs on a living communication path, among information stored in the learning data base, the erasure unit erases only an address of a contact node arranged as an end portion of the living communication path and an address of a terminal corresponding to the address, an address of a node other than the contact node and an address of a terminal corresponding to the address are left in the learning data base. Therefore, unless a contact node exists on a path to a terminal as a transmission destination of a user frame, the broadcast unit executes no broadcast transmission. Accordingly, occasions of broadcast transmission are reduced to suppress an increase in the volume of traffic, thereby realizing effective use of a band.

In a case where the contact node arranged as an end portion of the living communication path comprises an existence confirmation signal transmission unit for periodically transmitting an existence confirmation signal to other ring network through the living communication path and an existence confirmation signal reception unit for receiving an existence confirmation signal from the other ring network, determination can be made based on the existence confirmation signal whether in a ring to which the contact node having received the existence confirmation signal belongs, there occurs a failure on a communication path. Then, the existence confirmation signal can reach other ring even when the communication path includes a communication network. It is accordingly possible to detect failure occurrence on a communication path even when the communication path includes a communication network.

In a case of a structure in which when the failure occurrence determination unit that other node than a contact node comprises among nodes in the ring network fails to receive a frame with an existence confirmation signal accommodated as a payload for a fixed time period, the unit determines that a living communication path develops a fault, each node is individually allowed to detect failure occurrence on a communication path. In this case, as compared with a case where only a contact node determines that a failure occurs on a communication path and after the determination, transfers the determination result to other node, each node is allowed to detect failure occurrence more quickly. Accordingly, it is possible to contribute to high-speed failure recovery.

In addition, according to the exemplary embodiment of the invention, a network identifier deriving unit of each node other than a contact node derives a network identifier to be applied to a user frame which is received from a terminal outside the ring network from among network identifiers corresponding to communication paths developing no fault and a network identifier applying unit applies the network identifier to the user frame. Then, when the failure occurrence determination unit determines that a failure occurs on a communication path, a failure occurring communication path notification unit notifies the network identifier deriving unit of information which can specify a network identifier corresponding to the communication path developing the fault. Accordingly, a different network identifier will be derived in a case where a communication path develops a fault and otherwise. When no address of a node corresponding to a combination between a transmission destination address that a user frame has which is received from a terminal outside the ring network and a network identifier derived by the network identifier deriving unit is stored in the learning data base, the broadcast unit broadcast-transmits a frame with a user frame to which the network identifier is applied accommodated as a payload. Accordingly, when a failure occurs to derive a network identifier different from that derived in a normal state, the broadcast unit immediately executes broadcast-transmission. As a result, high-speed failure recovery is possible when a failure occurs between ring networks.

A user frame sending unit that each contact node comprises, when a network identifier corresponding to a communication path with itself as an end portion and a network identifier applied to a user frame coincide with each other, sends out the user frame to the communication path. Accordingly, when the network identifiers coincide with each other, the user frame can be sent through each communication path to distribute loads on communication paths.

In addition, in a case of a structure in which each contact node arranged as an end portion of each communication path comprises the existence confirmation signal transmission unit for periodically transmitting an existence confirmation signal to other ring network through a communication path with itself as an end portion and the existence confirmation signal reception unit for receiving an existence confirmation signal from the other ring network, it is possible to determine whether a failure occurs on a communication path within a ring to which a contact node having received the existence confirmation signal belongs based on the existence confirmation signal. Then, the existence confirmation signal is allowed to reach other ring even when the communication path includes a communication network. Therefore, even in a case where a communication path includes a communication network, failure occurrence on the communication path can be detected.

In addition, in a case where the failure occurrence determination unit that other node than a contact node comprises is structured to determine, when failing to receive a frame with an existence confirmation signal accommodated as a payload for a fixed time period, that a failure occurs on a communication path with a contact node as a transmission source of the frame as an end portion, each node is individually allowed to detect failure occurrence on a communication path. In this case, each node can detect failure occurrence earlier than a case where only a contact node determines that a communication path develops a fault and after the determination, transfers the determination result to other node. It is accordingly possible to contribute to high-speed failure recovery.

An exemplary advantage according to the invention is that enables high-speed failure recovery when a failure occurs between ring networks. Another exemplary advantage according to the invention is that suppresses an increase in the volume of traffic to enable efficient use of a band. Another exemplary advantage according to the invention is that enables detection of failure occurrence on a communication path even when the communication path includes the communication network. Another exemplary advantage according to the invention is that enables failure occurrence to be detected at a high-speed to contribute to high-speed failure recovery. Another exemplary advantage according to the invention is that enables high-speed failure recovery when a failure occurs between ring networks. Load on a communication path can be also scattered.

According to an exemplary aspect of the invention, each node includes the learning data base for storing a correspondence relationship between an address of a terminal outside a ring network and an address of a node inside the ring network, the failure occurrence determination unit for determining that a failure occurs on a living communication path, and the erasure unit for erasing information stored in the learning data base when the failure occurrence determination unit determines that a living communication path develops a fault, and each node other than a contact node arranged as an end portion of a living communication path and a spare communication path includes the broadcast unit for, when no address of a node corresponding to a transmission destination address that a user frame received from a terminal outside the ring network has is stored in the learning data base, broadcast-transmitting a frame accommodating the user frame as a payload, so that failure occurrence between ring networks can be recovered at a high speed.

Moreover, each node other than a contact node includes the network identifier deriving unit for deriving a network identifier to be applied to a user frame received from a terminal outside the ring network from among network identifiers corresponding to communication paths developing no fault, the network identifier applying unit for applying a network identifier to a user frame, the failure occurrence determination unit for determining that a communication path develops a fault, the failure occurring communication path notification unit for, when the failure occurrence determination unit determines that a failure occurs on a communication path, notifying the network identifier deriving unit of information by which a network identifier corresponding to the communication path developing the fault can be specified, the learning data base for storing a correspondence relationship among an address of a terminal outside the ring network, a network identifier and an address of a node inside the ring network, and the broadcast unit for, when no address of a node corresponding to a combination between a transmission destination address that a user frame received from a terminal outside the ring network has and a network identifier derived by the network identifier deriving unit is stored in the learning data base, broadcast-transmitting a frame with a user frame to which the network identifier is applied accommodated as a payload, so that a failure occurring between the ring networks can be recovered at a high speed.

Furthermore, a contact node includes the existence confirmation signal transmission unit for periodically transmitting an existence confirmation signal to other ring network through a communication circuit, the existence confirmation signal reception unit for receiving an existence confirmation signal from the other ring network, and an existence confirmation frame transmission unit for transmitting a frame with an existence confirmation signal received by the existence confirmation signal reception unit accommodated as a payload within a ring network to which the contact node belongs, and other node than a contact node among nodes in the ring network includes the failure occurrence determination unit for, when failing to receive a frame with an existence confirmation signal accommodated as a payload for a fixed time, determining that a communication path develops a fault, so that detection of failure occurrence can be made at a high speed to contribute to high-speed failure recovery.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-101254, filed on Mar. 31, 2005, the disclosure of which is incorporated herein in its entirety by reference.

The invention claimed is:

1. A ring network system with a first ring network and a second ring network connected by a living communication path and a spare communication path, wherein
each node in said first ring network and in said second ring network comprises
a learning data base for storing a correspondence relationship between an address of a terminal outside the ring network and an address of a node within the ring network,
a failure occurrence determination unit for determining that a failure occurs on the living communication path, and
an erasure unit for forcibly erasing information stored by the learning data base without waiting for a lapse of an aging time when said failure occurrence determination unit determines that a failure occurs on the living communication path,
each node other than a contact node arranged as an end portion of the living communication path and the spare communication path comprises
a broadcast unit for, when an address of a node corresponding to a transmission destination address that a user frame received from a terminal outside the ring network fails to be stored in said learning data base, broadcast-transmitting a frame including said user frame accommodated as a payload and an address of the node itself,
an abandoning unit for, when receiving a broadcast-transmitted frame including the address of the node itself, abandoning said broadcast-transmitted frame,
a contact node arranged as an end portion of the spare communication path comprises
a state change unit for changing a port connected to the spare communication path to a state of enabling a user frame to be sent out when said failure occurrence determination unit determines that a failure occurs on the living communication path, and
a converting unit for converting said broadcast-transmitted frame into said user frame, and sending said user frame to said first ring network or said second ring network through said spare communication path.

2. The ring network system according to claim 1, wherein the erasure unit erases all the information stored by the learning data base when the failure occurrence determination unit determines that a failure occurs on the living communication path.

3. The ring network system according to claim 1, wherein the erasure unit erases only an address of a contact node arranged as an end portion of the living communication path and an address of a terminal corresponding to the address among the information stored by the learning data base when the failure occurrence determination unit determines that a failure occurs on the living communication path.

4. The ring network system according to claim 1, wherein a contact node arranged as an end portion of the living communication path comprises
an existence confirmation signal transmission unit for periodically transmitting an existence confirmation signal to other ring network through the living communication path, and
an existence confirmation signal reception unit for receiving an existence confirmation signal from said other ring network.

5. The ring network system according to claim 1, wherein a contact node arranged as an end portion of the living communication path comprises an existence confirmation frame transmission unit for transmitting a frame with an existence confirmation signal received by the existence confirmation signal reception unit accommodated as a payload within a ring network to which the contact node belongs,
the failure occurrence determination unit that other node than said contact node comprises among nodes in said ring network determines that a failure occurs on the living communication path when failing to receive said frame for a fixed time period, and the failure occurrence determination unit that said contact node comprises determines that a failure occurs on the living communication path when failing to receive an existence confirmation signal for a fixed time period.

6. A failure recovery method to be applied to a ring network system with a first ring network and a second ring network connected by a living communication path and a spare communication path, wherein each node in said first ring network and in said second ring network comprises a learning data base for storing a correspondence relationship between an address of a terminal outside the ring network and an address of a node within the ring network, and when determining that the living communication path develops a fault, forcibly erases information stored by the learning data base without waiting for a lapse of an aging time, each node other than a contact node arranged as an end portion of the living communication path and the spare communication path when an address of a node corresponding to a transmission destination address that a user frame received from a terminal outside the ring network has fails to be stored in said learning data base, broadcast-transmits a frame including said user frame accommodated as a payload and an address of the node itself, when receiving a broadcast-transmitted frame including the address of the node itself, abandons said broadcast-transmitted frame, a contact node arranged as an end portion of the spare communication path, when determining that the living communication path develops a fault, changes a port connected to the spare communication path to a state of enabling a user frame to be sent out, and converts said broadcast-transmitted frame into said user frame, and sends said user frame to said first ring network or said second ring network through said spare communication path.

7. The failure recovery method according to claim 6, wherein each node in the first ring network and the second ring network erases all the information stored by the learning data base when determining that a failure occurs on the living communication path.

8. The failure recovery method according to claim 6, wherein each node in the first ring network and the second ring network erases only an address of a contact node arranged as an end portion of the living communication path and an address of a terminal corresponding to the address among the information stored by the learning data base when determining that a failure occurs on the living communication path.

9. The failure recovery method according to claim 6, wherein a contact node arranged as an end portion of the living communication path periodically transmits an existence confirmation signal to other ring network through the living communication path, and receives an existence confirmation signal from said other ring network.

10. The failure recovery method according to claim 6, wherein a contact node arranged as an end portion of the living communication path transmits a frame with a received existence confirmation signal accommodated as a payload within a ring network to which the contact node belongs, and determines that a failure occurs on the living communication path when failing to receive an existence confirmation signal for a fixed time period, and other node than said contact node among nodes in said ring network, when failing to receive said frame for a fixed time period, determines that a failure occurs on the living communication path.

11. A node to be applied to a ring network system with a first ring network and a second ring network connected by a living communication path and a spare communication path, comprising:

a learning data base for storing a correspondence relationship between an address of a terminal outside the ring network and an address of a node within the ring network, a failure occurrence determination unit for determining that a failure occurs on the living communication path, and an erasure unit for forcibly erasing information stored by the learning data base without waiting for a lapse of an aging time when said failure occurrence determination unit determines that the living communication path develops a fault, and a broadcast unit for, when an address of a node corresponding to a transmission destination address that a user frame received from a terminal outside the ring network fails to be stored in said learning data base, broadcast-transmitting a frame including said user frame accommodated as a payload and an address of the node itself, wherein the node is arranged as an end portion of the living communication path and comprises:

an existence confirmation signal transmission unit for periodically transmitting an existence confirmation signal to other ring network through the living communication path, and an existence confirmation signal reception unit for receiving an existence confirmation signal from said other ring network.

12. The node according to claim 11, wherein the erasure unit erases all the information stored by the learning data base when the failure occurrence determination unit determines that a failure occurs on the living communication path.

13. The node according to claim 11, wherein the erasure unit erases only an address of a contact node arranged as an end portion of the living communication path and an address of a terminal corresponding to the address among the information stored by the learning data base when the failure occurrence determination unit determines that a failure occurs on the living communication path.

14. The node according to claim 11, wherein the failure occurrence determination unit determines that a failure occurs on the living communication path when failing to receive a frame with an existence confirmation signal accommodated as a payload for a fixed time period.

15. The node according to claim 11, comprising:

an existence confirmation frame transmission unit for transmitting a frame with an existence confirmation signal received by the existence confirmation signal reception unit accommodated as a payload within a ring network to which the contact node belongs.

16. A computer readable storage device storing a program for a node for causing a computer which a node to be applied to a ring network system with a first ring network and a second ring network connected by a living communication path and a spare communication path comprises and which comprises a learning data base for storing a corresponding relationship between an address of a terminal outside the ring network and an address of a node within the ring network

- to execute failure occurrence processing of determining that a failure occurs on the living communication path and erasing processing of forcibly erasing information stored in the learning data base without waiting for a lapse of an aging time when determination is made that a failure occurs on the living communication path by said failure occurrence processing,
- to execute broadcast processing of when an address of a node corresponding to a transmission destination address that a user frame received from a terminal outside the ring network fails to be stored in said learning data base, broadcast-transmitting a frame including said user frame accommodated as a payload and an address of the node itself,
- wherein the computer that a node arranged as an end portion of the living communication path comprises to execute:
- existence confirmation signal transmission processing of periodically transmitting an existence confirmation signal to other ring network through the living communication path, and
- existence confirmation signal reception processing of receiving an existence confirmation signal from said other ring network.

17. The computer readable storage device according to claim 16, said program causes the computer to execute processing of erasing all the information stored by the learning data base in the erasing processing.

18. The computer readable storage device according to claim 16, said program causes the computer to execute processing of erasing only an address of a contact node arranged as an end portion of the living communication path and an address of a terminal corresponding to the address among the information stored by the learning data base in the erasing processing.

19. The computer readable storage device according to claim 16, which said program causes the computer to, when failing to receive a frame with an existence confirmation signal accommodated as a payload for a fixed time period in the failure occurrence processing, determine that a failure occurs on the living communication path.

20. The computer readable storage device according to claim 16, said program causes the computer to execute
- existence confirmation frame transmission processing of transmitting a frame with an existence confirmation signal received in the existence confirmation signal reception processing accommodated as a payload within a ring network to which the node itself belongs.

* * * * *